United States Patent [19]

Seto et al.

[11] Patent Number: 5,552,967
[45] Date of Patent: Sep. 3, 1996

[54] PORTABLE ELECTRONIC APPARATUS HAVING A HOUSING FOR CONTAINING CIRCUITS BOARD AND FUNCTIONAL COMPONENTS

[75] Inventors: Masaru Seto; Kazuya Shibasaki; Satoru Arai, all of Tokyo, Japan

[73] Assignee: Kabushiki Kaisha Toshiba, Kanagawa-ken, Japan

[21] Appl. No.: 216,923

[22] Filed: Mar. 23, 1994

[30] Foreign Application Priority Data

Apr. 30, 1993 [JP] Japan ..................................... 5-104786
Jul. 9, 1993 [JP] Japan ..................................... 5-170063

[51] Int. Cl.⁶ .................................................. H05K 9/00
[52] U.S. Cl. ........................... 361/818; 361/816; 361/796; 174/35 R; 257/659
[58] Field of Search ...................................... 361/752, 796, 361/800, 816, 818; 174/35 R; 357/659, 660; 439/108, 109

[56] References Cited

U.S. PATENT DOCUMENTS

| | | | |
|---|---|---|---|
| 4,599,680 | 7/1986 | Gibson et al. | 361/386 |
| 4,680,676 | 7/1987 | Petratos et al. | 361/424 |
| 4,850,657 | 7/1989 | Placke et al. | 312/213 |
| 4,864,523 | 9/1989 | Sasaki | 364/708 |
| 4,926,291 | 5/1990 | Sarraf | 361/384 |
| 4,951,241 | 8/1990 | Hosoi et al. | 364/708 |
| 5,045,971 | 9/1991 | Ono et al. | 361/386 |
| 5,051,868 | 9/1991 | Leverault et al. | 361/395 |
| 5,068,652 | 11/1991 | Kobayashi | 340/815 |
| 5,081,742 | 1/1992 | Kobayashi | 16/337 |
| 5,086,509 | 2/1992 | Inubushi et al. | 455/89 |
| 5,090,913 | 2/1992 | Kobayashi | 439/165 |
| 5,103,377 | 4/1992 | Kobayashi et al. | 361/394 |
| 5,111,361 | 5/1992 | Kobayashi | 361/394 |
| 5,132,876 | 7/1992 | Ma | 361/394 |
| 5,140,138 | 8/1992 | Tanaka | 235/1 D |
| 5,148,350 | 9/1992 | Chan et al. | 361/386 |
| 5,168,423 | 12/1992 | Ohgami et al. | 361/394 |
| 5,204,805 | 4/1993 | Takahashi et al. | 361/386 |
| 5,237,486 | 8/1993 | LaPointe et al. | 361/681 |
| 5,316,491 | 6/1994 | Satou et al. | 439/159 |
| 5,329,422 | 7/1994 | Sasaki | 361/686 |
| 5,373,104 | 12/1994 | Brauer | 174/52.1 |
| 5,373,458 | 12/1994 | Bishay et al. | 364/708 |

FOREIGN PATENT DOCUMENTS

| | | |
|---|---|---|
| 3936261C2 | 5/1990 | Germany . |
| 9109072 U | 10/1991 | Germany . |
| 2-162796 | 6/1990 | Japan . |
| 2-303093 | 12/1990 | Japan . |

OTHER PUBLICATIONS

IEEE Spectrum vol. 28, No. 5, May 1991, New York, US pp. 37–41 "Incredible Shrinking Computers".

Primary Examiner—Gerald P. Tolin
Assistant Examiner—Y. Whang
Attorney, Agent, or Firm—Limbach & Limbach

[57] ABSTRACT

A portable electronic apparatus comprising a box-shaped housing made of synthetic resin and a circuit unit incorporated in the housing. The circuit unit has a circuit board having circuit parts which generate noise while operating, a frame supporting the circuit board, and a shield formed of a metal plate and surrounding the circuit board and the frame. The frame is a molding made of synthetic resin or a cast product made of metal such as magnesium.

44 Claims, 32 Drawing Sheets

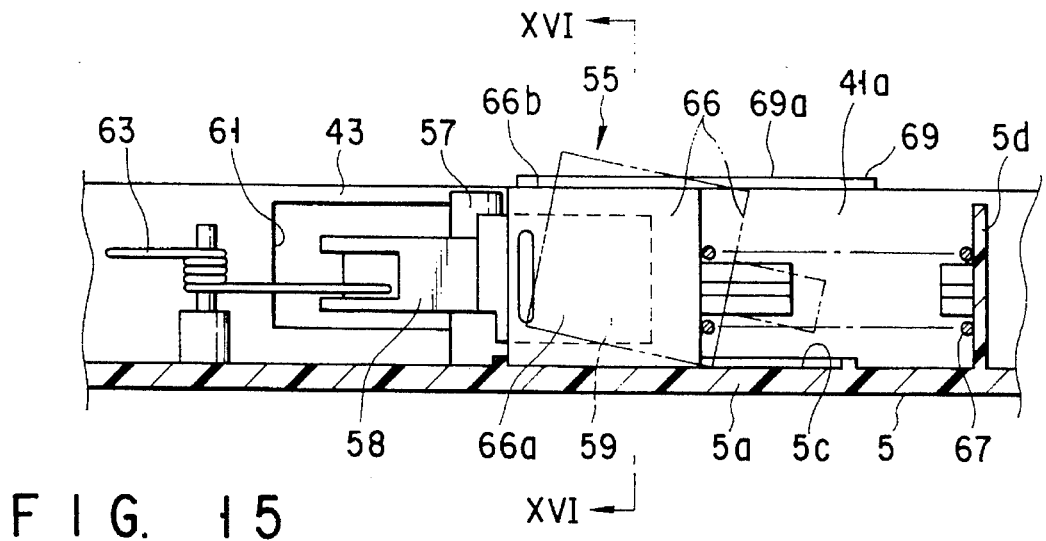
FIG. 15
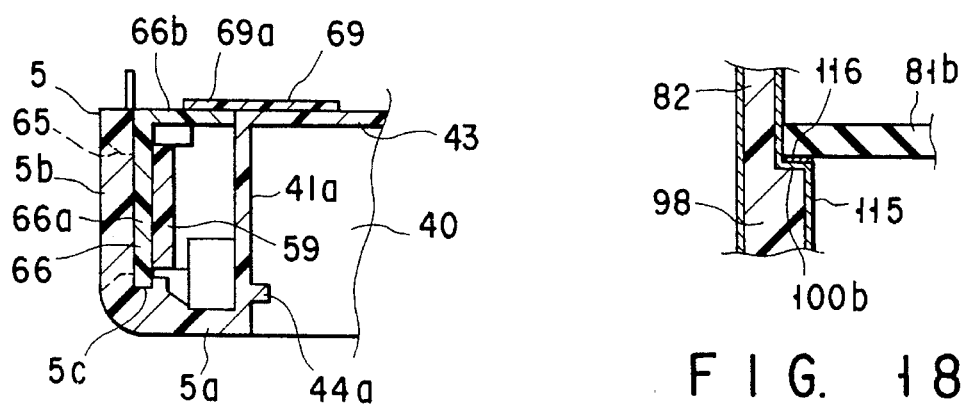
FIG. 16
FIG. 18
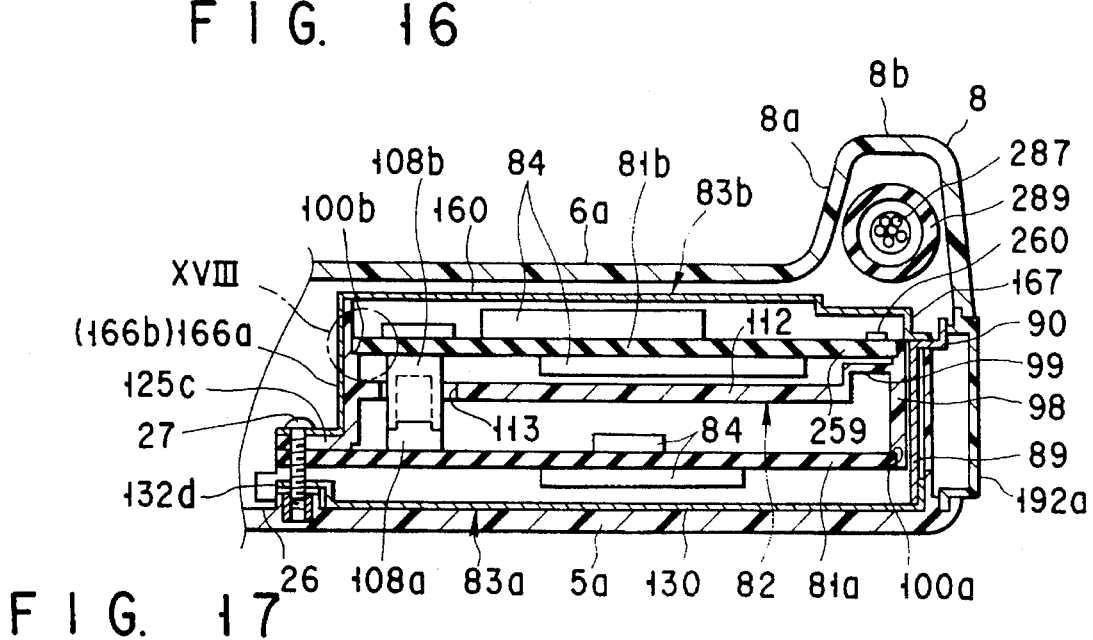
FIG. 17

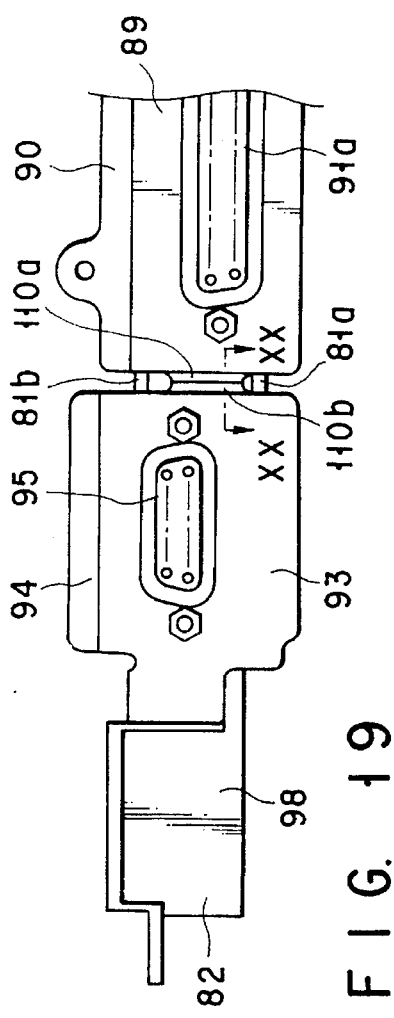
F I G. 19
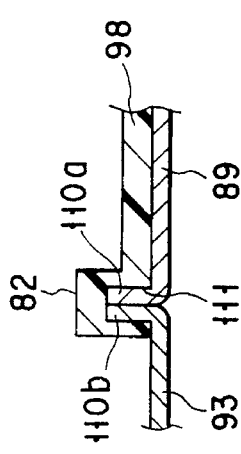
F I G. 20
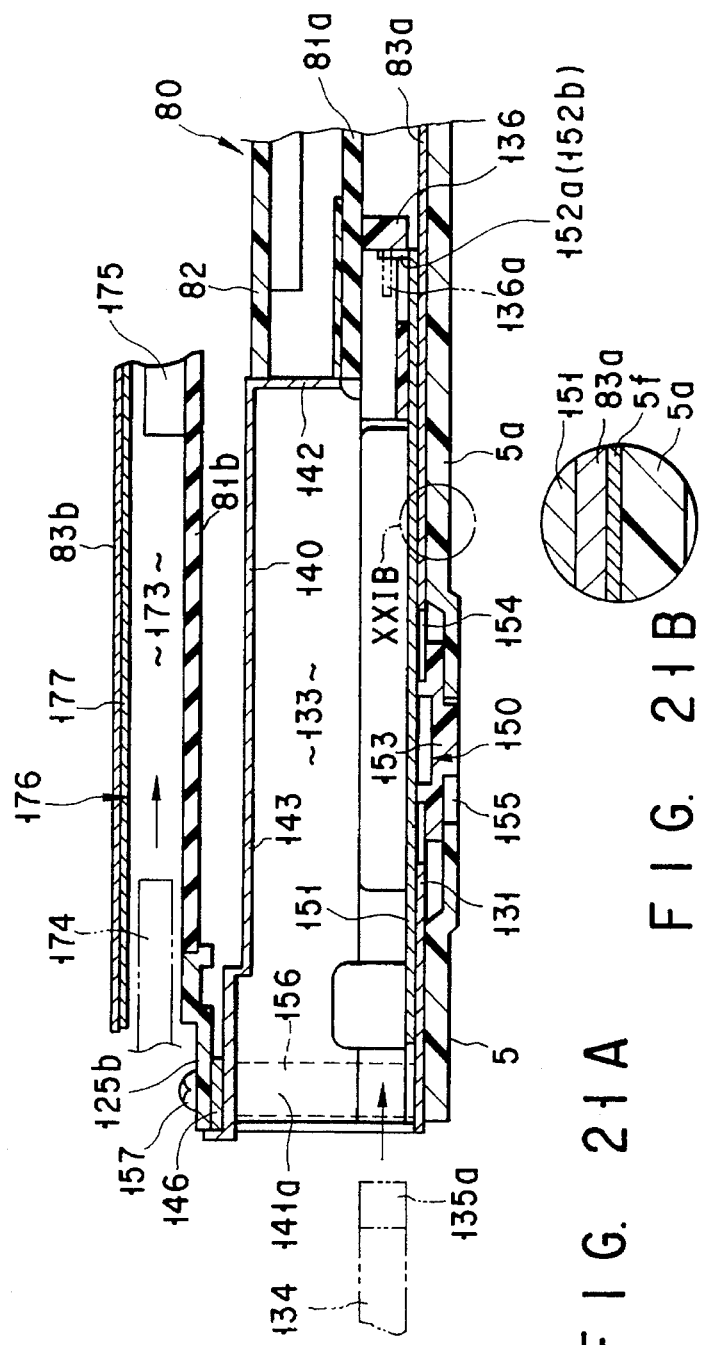
F I G. 21A
F I G. 21B

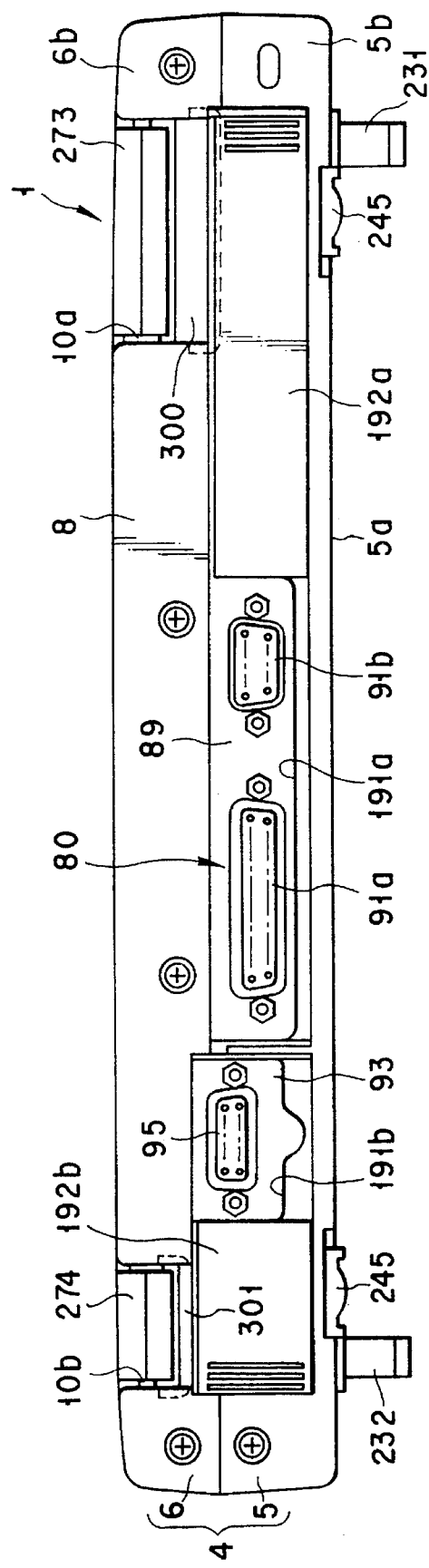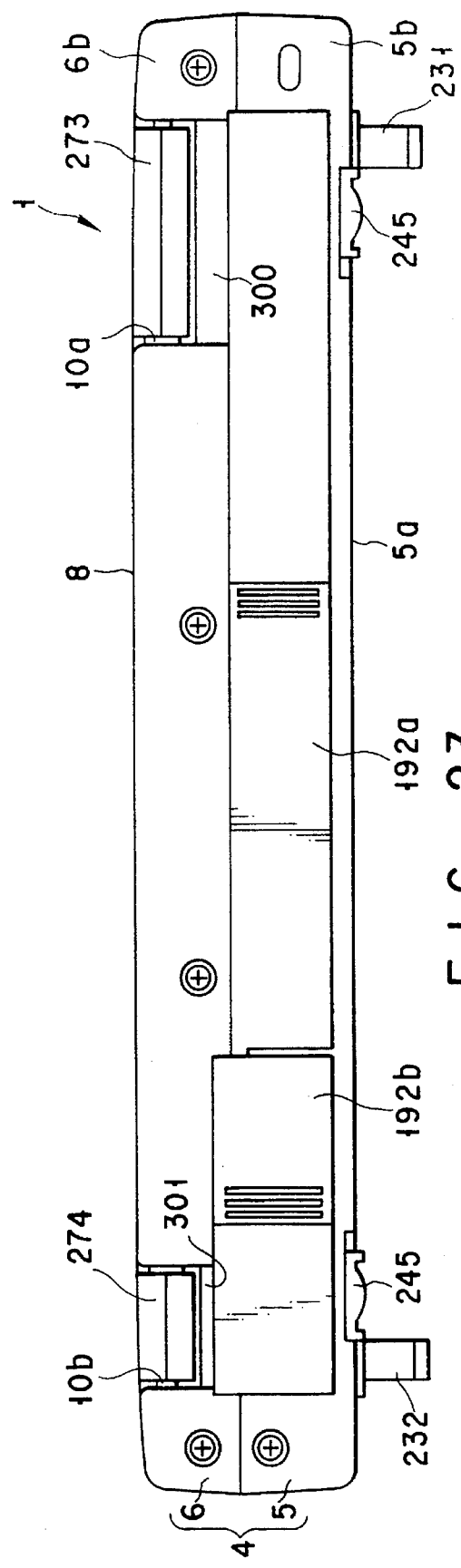

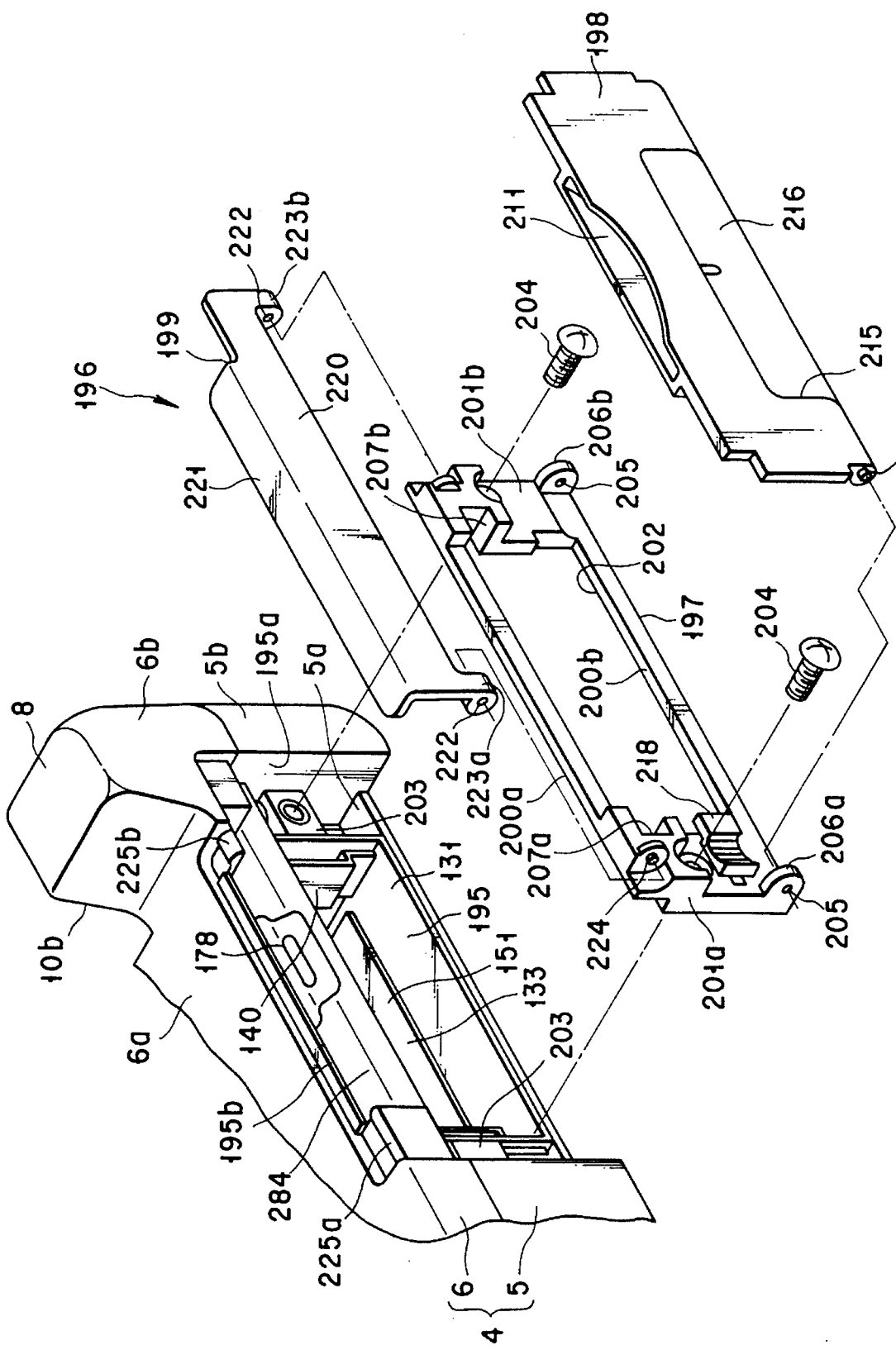

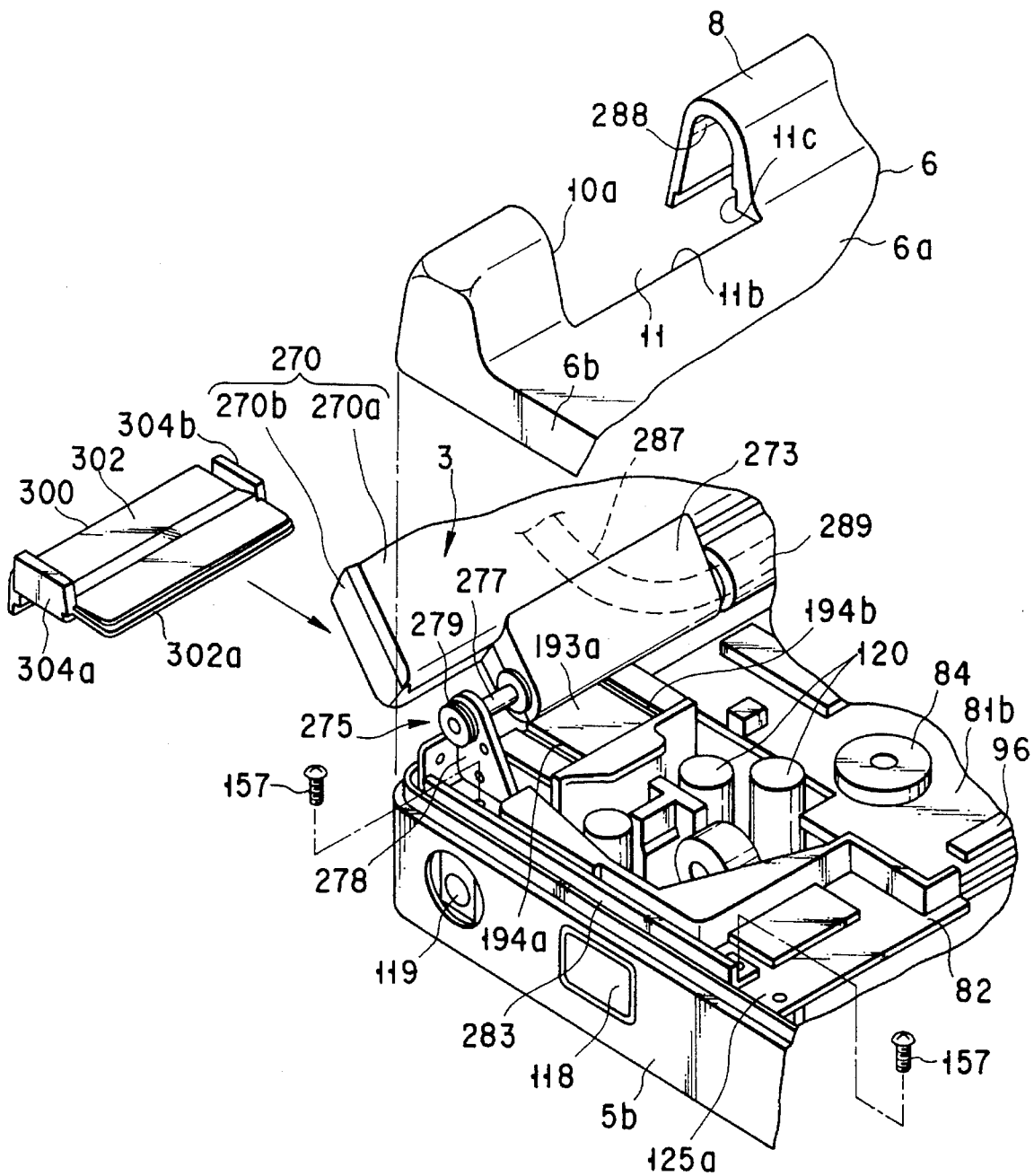
F I G. 35

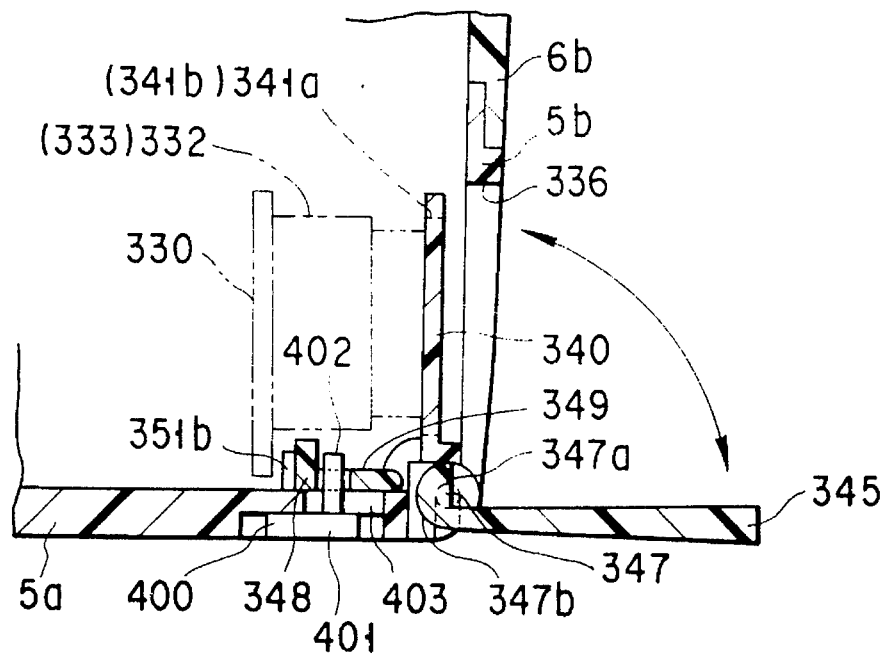
F I G. 53
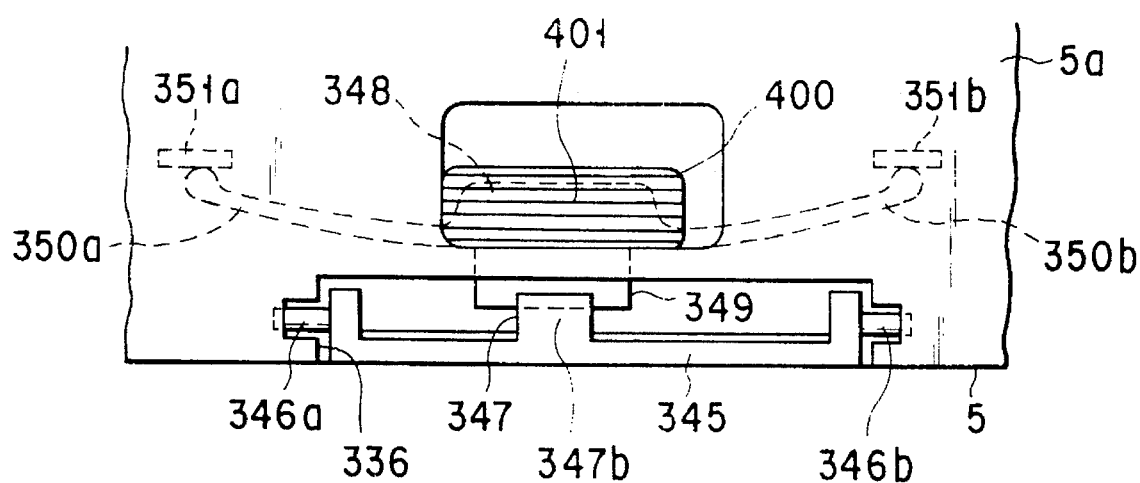
F I G. 54

PORTABLE ELECTRONIC APPARATUS HAVING A HOUSING FOR CONTAINING CIRCUITS BOARD AND FUNCTIONAL COMPONENTS

BACKGROUND OF THE INVENTION

1. Field of the Invention

The present invention relates to an electronic apparatus such as a portable computer or a portable word processor, and more particularly to the housing of the apparatus, designed to contain circuit board each having circuit parts mounted on it and also to contain various functional components such as a floppy disk drive and a hard disk drive.

2. Description of the Related Art

In recent years, a variety of notebook-type portable, high-performance computers have been provided. Each of these computers comprises a base unit which has a keyboard, and a display unit which is a plat panel type hinged to the base unit and rotatable between a closed position and an open position. The base unit further comprises a box-like housing made of synthetic resin. The housing contains functional components such as a floppy disk drive and a hard disk drive, and also contains circuit board each with various circuit parts mounted on it.

Recently it is demanded that the housing of portable computers be made as small as possible so that the computers may be easier to carry and handle. Particularly it is desirable that the housing be as small and shallow as possible. The size of the circuit board to incorporated into the housing is limited inevitably, but height of the housing is not much limited. Hence, a new type of a portable computer has been developed, which comprises a plurality of small circuit boards, not a single large one, are arranged one above another within a housing and electrically connected to one another. An example of such a computer is disclosed in U.S. patent application Ser. No. 08/107,948 filed Aug. 16, 1993, S. Youji et al.

Among the parts mounted on each of those circuit board are one which generate high-frequency noise while operating. As is known in the art, if the high-frequency noise leaks out of the housing, it will cause interference of electromagnetic waves or obstruction of communication. To prevent the noise from leaking from the housing, the housing has a shield frame which functions not only as support for the circuit boards but also as an electric-wave shield.

However, the shield frame must have passages for avoiding interference between the shield frame and the supports of the circuit boards and the parts thereof. To be more specific, the shield frame needs to have many bent and held-up portions and also many through holes. Consequently, the shape of the shield frame is much complicated.

Generally, the more complicated the shape of a shield frame is, the more complex the structure of a mold for forming the frame, and the longer the time required for producing the frame. As a result, the manufacturing cost of the frame will increase. Furthermore, the shield frame must be strong enough to support the circuit boards each having a number of parts mounted on it. The frame should, therefore, have a large wall thickness. Hence, the shield frame is unavoidably heavy and large, making it difficult to make the computer as light and small as is desired.

More and more types of portable computers are being provided, in which there can be installed a memory card for increasing data storage capacity, an interface card for achieving communication with external devices, or an application card storing an application program. Each of these portable computers has a card receptacle located within the housing. The card receptacle has an insertion port which opens to a slot made in one side of the housing, and contains a card connector. The card connector is mounted on a circuit board. Therefore, this circuit board opposes the card receptacle, and a connector section connecting the parts and wiring patterns on the board are exposed to the card receptacle.

If anything electrically conductive material happens to enter the card receptacle through the insertion port while a card is being inserted into the card receptacle or removed therefrom, it may move through the card receptacle and may reach the circuit board. Thus, the conductive material may contact the connector section, inevitably causing short circuiting between the circuit parts and the wiring patterns. The short circuiting will lead to malfunction and troubles in the portable computer.

A high-performance portable computer is designed to be used in combination with a variety of external devices. Known as such external devices are a mouse and a track ball, each being a kind of a pointing device, and also an external keyboard. In many cases, these external devices are connected to the portable computer in different ways, though they are designed to perform the same function, that is, the function of inputting data.

More precisely, pointing devices such as mouses are divided into two types. The first type is to be connected to the computer by means of a cable. The second type is to be connected directly to the connector attached to the computer. As for external keyboards, there are various types to be connected to the computer by different kinds of interface connectors. This is why the high-performance portable computer has a plurality of interface connectors of different specifications. In many cases these interface connectors are arranged in the same plane in the computer.

Thus, two or more external devices of the same function can be connected to the computer by means the interface connectors. It follows that the signals generated in these external devices may supplied to the computer at the same time and may therefore interfere with one another in the computer. Such signal interference occurs, if any occurring, will cause malfunction and troubles in the portable computer.

As is disclosed in U.S. Pat. No. 5,081,742 issued Jun. 21, 1992 to T. Kobayashi and U.S. Pat. No. 5,103,377 issued Apr. 7, 1992 to T. Kobayashi et al., the display unit of a portable computer is hinged to the housing and can be rotated between a closed position and an open position. At the closed position, the display unit covers the keyboard of the computer. At the open position, the unit stands upright at the rear of the keyboard. More specifically, the display unit has a pair of legs, and the housing has two leg-holding recesses. The legs are fitted in the recesses, respectively, and are rotatably connected to the housing by a hinge mechanism. The hinge mechanism has a hinge shaft which extends through the housing and both legs of the display unit, passing through the hole made in the side surface of the leg-holding recesses.

Each leg-holding recess has an opening open to the interior of the housing. The opening has a bottom opening portion and a side opening portion continuous with the bottom opening portion. The bottom opening portion is made in the bottom surface of the leg-holding recess, and the side opening portion is made in the side surface of the leg-holding recess. The opening closed by cover fastened to the inner surface of the housing by means of screws. The cover has a bottom wall covering the bottom opening portion, and a side wall covering the side opening portion. The side wall cooperating with the side opening portion to form the hole, and the hinge shaft passing through the hole.

Screws are required to fasten the covers to the housing, increasing the number of parts indispensable to the housing. In addition, the housing needs to have bosses for engagement with the screws, and has a structure more complex than otherwise. The increase in the number of necessary parts and the complex structure of the housing raises the manufacturing cost of the housing.

As disclosed in U.S. Pat. No. 5,111,361 issued May 5, 1992 to T. Kobayashi, a portable computer has a tilt mechanism which holds the keyboard in such an inclined position that an operator can operate the keyboard with ease. The tilt mechanism is mounted on the bottom of the rear part of the housing. It comprises a support, a slider and a stand. The support is formed on the bottom of the housing. The slider is supported by the support and can slide up and down. The stand is rotatably connected to the lower end of the slider. Rotatably coupled to the slider capable of moving vertically, the stand can be moved vertically, and can also be rotated back forth, with respect to the housing. The stand can be moved between a first position where it protrudes downwards from the bottom of the housing, and a second position where it is held parallel to the bottom of the housing.

To tilt up the keyboard of the computer, the operator first holds the rear of the housing upwards, then rotates the stand downwards from the second position, and finally pushes the stand upwards until the junction of the stand and the slider fits into the support. Once the junction has fitted into the support, the stand is held in the first position.

In order to move the stand from the first position into the second position, the operator pulls the stand downwards, releasing the junction of the stand and the slider from the support. Next, the operator rotates the stand forward so that the stand may be held parallel to the bottom of the housing. The stand is thereby fitted into a recess formed in the bottom of the housing. As a result, the stand is held in the second position.

Whether to set the stand into the first position or the second position, the operator needs not only to slide the stand but also to rotate the stand. The operator can move the stand into neither position, with a one-touch operation. Thus, the tilt mechanism needs to be modified to improve its operability.

As disclosed in U.S. Pat. No. 5,068,652 issued Nov. 26, 1991 to T. Kobayashi, a portable computer has an indicator for showing the condition in which the computer is operating. The housing of the computer has a projection having a rectangular cross section. A plurality of display holes are made in the corner defined by the front and the top of the projection. In these holes there are fitted display lenses for allowing passage of light. Each lens is exposed at both the front of the projection and the top thereof.

The projection contains light-emitting diodes for applying light to the display lenses. These diodes are located near the lenses so that they may apply light with high efficiency. The light-emitting diodes are mounted on a circuit board. The circuit board is arranged within the projection, extending substantially in parallel to the top of the housing. The circuit board is isolated from the main circuit board incorporated in the housing, and is designed exclusively to drive the light-emitting diodes.

The circuit board on which the light-emitting diodes are mounted is indispensable, exclusively for supporting these diodes. Furthermore, connectors and cables are required, electrically connecting this circuit board to the main circuit board. The number of necessary parts is unavoidably increases, raising the manufacturing cost of the portable computer. The more light-emitting diodes are arranged side by side in the projection, the longer will this circuit board which is arranged in the projection and supports these diodes, and the larger the space in the projection. This would hinder the downsizing of the housing.

The housing of a portable computer is compact as a whole so that the computer may be easy to carry and handle. Within the compact housing, functional devices such as a floppy disk drive and a hard disk drive, and circuit board each having various parts are arranged in high density. The functional devices are electrically connected to the circuit board by cables. In many cases the cables are placed in the gaps among the adjacent functional devices. Made slender and flexible, the cables can hardly be held straight and may bend themselves to project from those gaps. It usually takes much time and labor to install the cables in the housing of the portable computer.

SUMMARY OF THE INVENTION

In view of the foregoing, the first object of the present invention is to provide a portable electronic apparatus which has a shield frame having so simple a shape as to reduce the manufacturing cost of the apparatus and lighten the circuit unit thereof.

The second object of the invention is to provide a portable electronic apparatus in which neither lead wires nor connectors are required to connect circuit boards to the ground even if the shield frame supporting the circuit boards is made of synthetic resin, and which can therefore have a simple structure and in which noise can be prevented from leaking from the housing.

The third object of this invention is to provide a portable electronic apparatus in which, if anything electrically conductive material happens to enter the card receptacle, it can be easily removed from the card receptacle and prevented from damaging the circuit boards or circuit parts mounted on these boards, or from causing short circuiting between the circuit parts.

The fourth object of the invention is to provide a portable electronic apparatus to which a plurality of external devices of the same function cannot be connected, thereby to prevent signal interference which may cause malfunction or troubles in the apparatus.

The fifth object of this invention is to provide a portable electronic apparatus, wherein covers can be fastened to the housing, without using screws, thereby decreasing the number of parts and ultimately simplifying the structure of the housing.

The sixth object of the present invention is to provide a portable electronic apparatus having a tilt mechanism which is mounted on the housing and easy to operate to tilt up and down the housing.

The seventh object of the present invention is to provide a portable electronic apparatus which requires no circuit board for supporting a light source such as a light-emitting diode, thus not only simplifying the housing but also efficiently guiding the light from the light source, both upwards and forward with respect to the housing, and which can therefore indicate the condition in which the apparatus is operating.

The eighth object of the invention is to provide a portable electronic apparatus having a housing which is designed such that cables can easily be placed in the gaps among the adjacent functional devices incorporated in the housing, thereby to manufacture the apparatus with high efficiency.

To attain the first object of the invention, there is provided a portable electronic apparatus comprising: a box-shaped housing made of synthetic resin; and a circuit unit incorporated in the housing and having a circuit board, a frame supporting the circuit board; and a shield formed of a metal plate and surrounding the circuit board. The circuit board has circuit parts mounted on the circuit board and generating noise while operating. The frame is either a cast product or a molding.

The circuit board is supported by the frame, not by the shield. The shield need not have parts for supporting the circuit board, or passages for avoiding interference between the shield and the circuit board. The shield, therefore, can have a simple shape. The frame, which is either a cast product or a molding, can be formed more easily with high precision than if made by bending and cutting a metal plate, even if it is relative complex in shape. In addition, not supporting the circuit board, the shield need not be reinforced; it is thin, helping to lighten the circuit unit.

To achieve the second object of this invention, there is provided a portable electronic apparatus comprising: a housing made of an electrically conductive material; a circuit board incorporated in the housing and having circuit parts which generate noise while operating and also having a ground wiring pattern; a frame made of an electrical non-conductive material, supporting the circuit board, having a support portion contacting the ground wiring pattern, and covered, at least at the support portion, with an electrically conductive layer; and a shield secured to the frame, covering the circuit board, and contacting the ground wiring pattern and the housing.

with this apparatus, when the circuit board is secured to the frame, the wiring pattern contacts the conductive layer, thereby electrically connecting the circuit board to the frame. Since the shield connects the wiring pattern to the housing, the circuit board can be connected to the ground by the frame and the shield. Electrically connected to one another, the frame, the shield and the housing surround the circuit board. The noise generated by the circuit parts is therefore confined in the housing.

To achieve the third object of the present invention, there is provide a portable electronic apparatus comprising: a box-shaped housing having a card receptacle, for receiving a card-like electronic object and a side having a card slot communicating with the card receptacle; a circuit board incorporated in the housing and having circuit parts and a portion exposed to the card receptacle; a card connector located at that portion of the circuit board which is exposed to the card receptacle, for connecting the card-like electronic object to the circuit board; and a cover arranged at the card receptacle, partitioning the card receptacle from the remaining space in the housing, and having an opening exposing the card connector.

The card receptacle is entirely shielded by the cover, except that part connected to the card connector. Thus, even if anything electrically conductive material enters the card receptacle through the card slot, it is prevented from moving deep into the housing, or hence to the circuit board. Such conductive material can be easily removed from the card receptacle. Hence, the circuit parts are prevented from mutual short-circuiting.

In order to achieve the fourth object of this invention, there is provided a portable electronic apparatus comprising: a housing having sides; a plurality of interface connectors arranged on the sides of the housing, which are to be connected to external devices which perform similar functions and which have connectors of different types; and a connector cover covering some of the interface connectors and exposing the others of the interface connectors.

The connector cover prevents all interface connectors, to which external devices of the same function are to be connected, from exposed at the same time. Those external devices cannot be connected to the apparatus simultaneously. Hence, signal interference is prevented which may occur when many external device, if connected to the apparatus, are operated at the same time and which may cause malfunction or troubles in the apparatus.

To attain the fifth object of this invention, there is provided a portable electronic apparatus comprising: a display unit having leg; a box-shaped base unit comprising a bottom case having an opening in a top, and a top cover fitted in the opening made in the top of the bottom case, the top cover having leg-supporting portion supporting the leg of the display unit, and the leg-supporting portion having a bottom opening communicating with an interior of the base unit and side opening continuous to the bottom opening; a circuit unit contained in the base unit and having a circuit board and a frame supporting the circuit board, the frame having cover seat exposed at the bottom opening of the leg-supporting portion, respectively; a cover located in the leg-supporting portion, which has a bottom wall covering the bottom opening of the leg-supporting portion and side wall cooperate with the side opening to form a through hole, and which is clamped between the cover seat and the top cover; and a hinge mechanism coupling the display unit to the base unit, allowing the display unit to rotate, and having a hinge shaft extending through the through hole, thereby connecting the legs of the display unit to the base unit.

Once the top cover has been fitted in the opening made in the top of the bottom case, the cover covering the bottom opening and the side opening are clamped between the top cover and the cover seat. Therefore, no screws are required to fasten the cover to the housing, thus reducing the number of parts of the apparatus. In addition, since the housing need not have bosses for engagement with such screws, its structure is more simple than otherwise.

In order to accomplish the sixth object of the invention, there is provided a portable electronic apparatus comprising: a box-shaped housing having a bottom and a top opposing the bottom; input means arranged on the top of the housing, for inputting information; and tilting means arranged at a rear portion of the bottom, for inclining the input means at such an angle that the input means is operated easily. The tilting means comprises: a pair of openings made in the bottom of the housing; a pair of leg supports protruding toward the top of the housing through the openings, respectively; a pair of tilt legs incorporated in the leg supports, respectively, and capable of moving between an upper position where the tilt legs are fully inside the openings and a lower position where the tilt legs extend downwards through the openings; an elastic member biasing the tilt legs toward the lower position; and a pair of stoppers holding the tilt legs at the upper position and the lower position, respectively. Each stopper has a sliding knob exposed at the bottom of the housing and capable of sliding between a position where the stopper engages the tilt leg and a position where the stopper remains out of engagement with the tilt leg.

With this structure, the stoppers releases the tilt legs when an operator slides the stoppers with a finger tip to the leg-releasing positions. As long as each tilt leg stays in the upper position, it is biased by the elastic member and projects toward the lower position. When the stopper is slid in this condition to a leg-holding position, it engages the tilt leg, thus holding the same in the lower position. When each tilt leg remains in the lower position, it can be pushed into the upper position, provided that the stopper releases the tilt leg. In order to pull down the tilt legs from the housing, or to push them into the housing, it suffices to slide the stoppers. The tilt mechanism is easy to operate to tilt up and down the housing.

To achieve the seventh object of the invention, there is provided a portable electronic apparatus comprising: a top; a housing having a raised hollow portion which comprises a front side extending upwards from the top and having a first hole, and a top side horizontally extending from an upper end of the front side in a substantially horizontal direction and having a second hole; a circuit board incorporated in the housing, positioned substantially parallel to the top, and a support section located below the raised hollow portion; a lens arranged inside the raised hollow portion, having a first lens portion placed in a corresponding the first hole and a second lens portion placed in a corresponding the second hole; and a light source mounted on the support section of the circuit board, for applying light to the lens. The lens has a light-guiding section for guiding light from the light source to the first and second lens portions, the light-guiding section being a solid bar extending vertically and having a front face and a rear face which inclines to the front face such that any point in the rear face moves way from the front face as the point approaches the first and second lens portions.

The light emitted from the light source is guided via the light-guiding portion to both the first lens portion and the second lens portion. The light can be efficiently applied to both lens portions, despite that the lens is located far above the light source. Thus, the light source can be arranged on the circuit board. Of the light beams emitted from the light source, the beam traveling toward the rear side of the light-guiding portion is reflected from that rear side, and hence travels slantwise upward, reaching the first lens portion. Hence, the light can be efficiently applied from the light source—not only to the second lens portion located right above the light source, but also to the second lens portion.

To attain the eighth object of this invention, there is provided a portable electronic apparatus comprising: a housing having a bottom and side walls extending upwards from the bottom; a functional part contained in the housing and mounted on the bottom thereof, arranged near the side walls, and defining, jointly with the side walls, a cable passage which open at top; cables arranged in the cable passage; and a rigid cable guide inserted into the cable passage from above, thereby covering the cables and maintaining the cables straight.

With this structure, the cables, whether rigid or flexible, are held by the rigid cable guide and remain straight once placed in the cable passage. Furthermore, held by the cable guide, the cables do not bend or deform themselves, slipping out of the passage, while being arranged in the cable passage. Thus, the cables can easily be placed in the passage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a sectional view illustrating the positional relationship between the shutter and the lock lever, both incorporated in the bottom case;

FIG. 16 is a sectional view taken along line XVI—XVI in FIG. 15;

FIG. 17 is a sectional view showing the housing of the computer and the circuit unit incorporated in the housing;

FIG. 18 is an enlarged sectional view of the part XVIII of FIG. 17;

FIG. 19 shows the frame and the connector shield plate secured to the frame;

FIG. 20 is a sectional view taken along line X—X in FIG. 19;

FIG. 21A is a sectional view of the first card receptacle used in the circuit unit;

FIG. 21B is an enlarged sectional view of the part XXIB of FIG. 21A;

FIG. 22 is a back view of the portable computer, showing the tilt legs pulled downwards from the bottom case and the first and second connector covers placed in the opened position;

FIG. 23 is a back view of the portable computer, showing the tilt legs pulled downwards from the base unit and the first and second connector covers placed in the closed position;

FIG. 26 is an exploded view of the cover for opening and closing the first card receptacle;

FIG. 35 is a perspective view explaining how the first hinge mechanism is secured to the base unit, thus coupling the display unit to the base unit;

FIG. 53 is also a sectional view of the same part of the bottom case, showing the outer cover in its opened position; and FIG. 54 is a bottom view of the same part of the bottom case, as seen along the arrow I in FIG. 52.

DETAILED DESCRIPTION OF THE PREFERRED EMBODIMENTS

A notebook-type portable computer, which is the first embodiment of the invention, will be described with reference to FIGS. 1 to 49.

Figure 1:
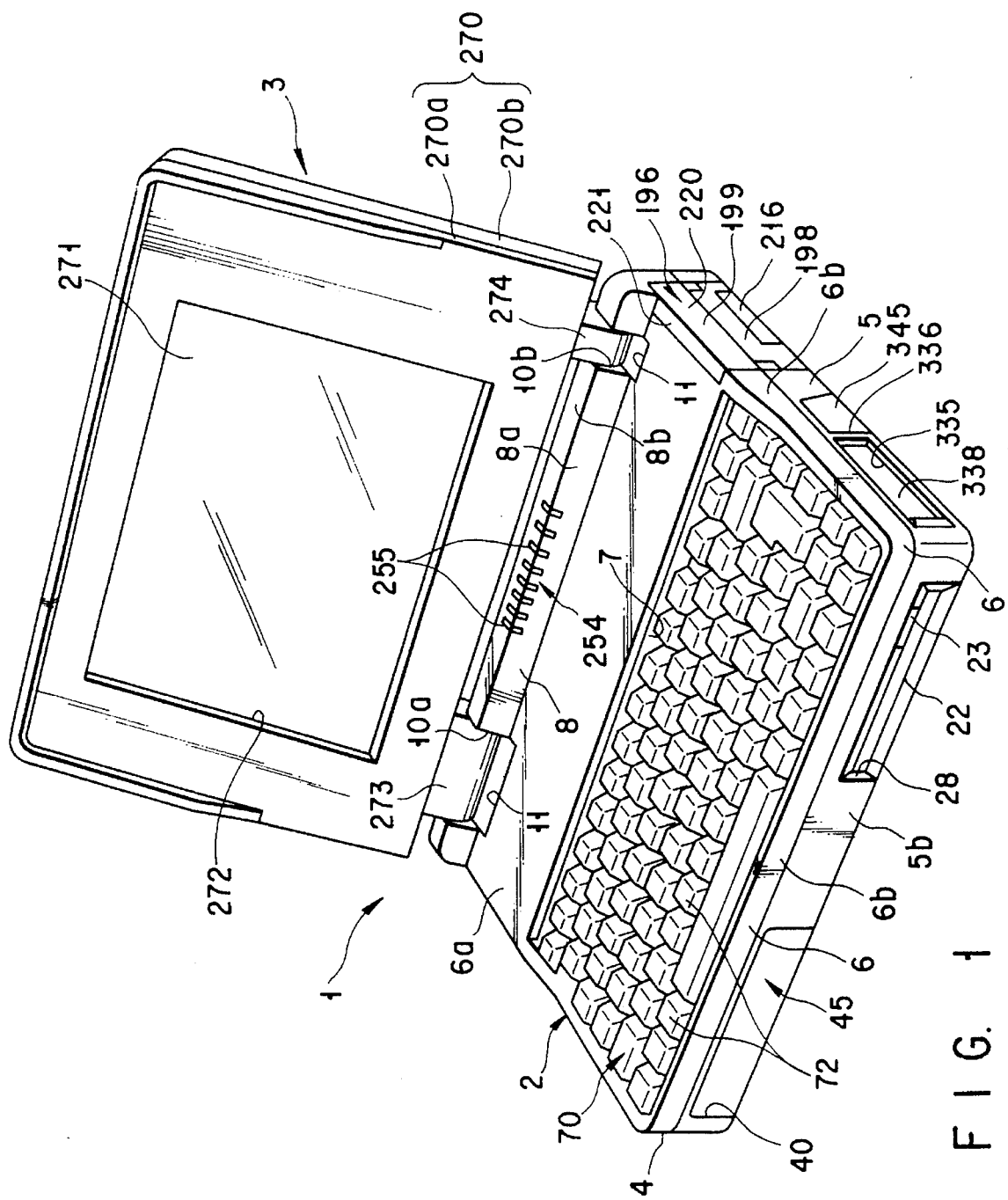
FIG. 1 is a perspective view of a portable computer.

FIG. 1 is a perspective view of the portable computer 1 having the size of an A4 paper sheet. The computer 1 comprises a base unit 2 which is a flat rectangular box, and a display unit 3 which is a flat panel type hinged to the base unit 2.

Figure 7:
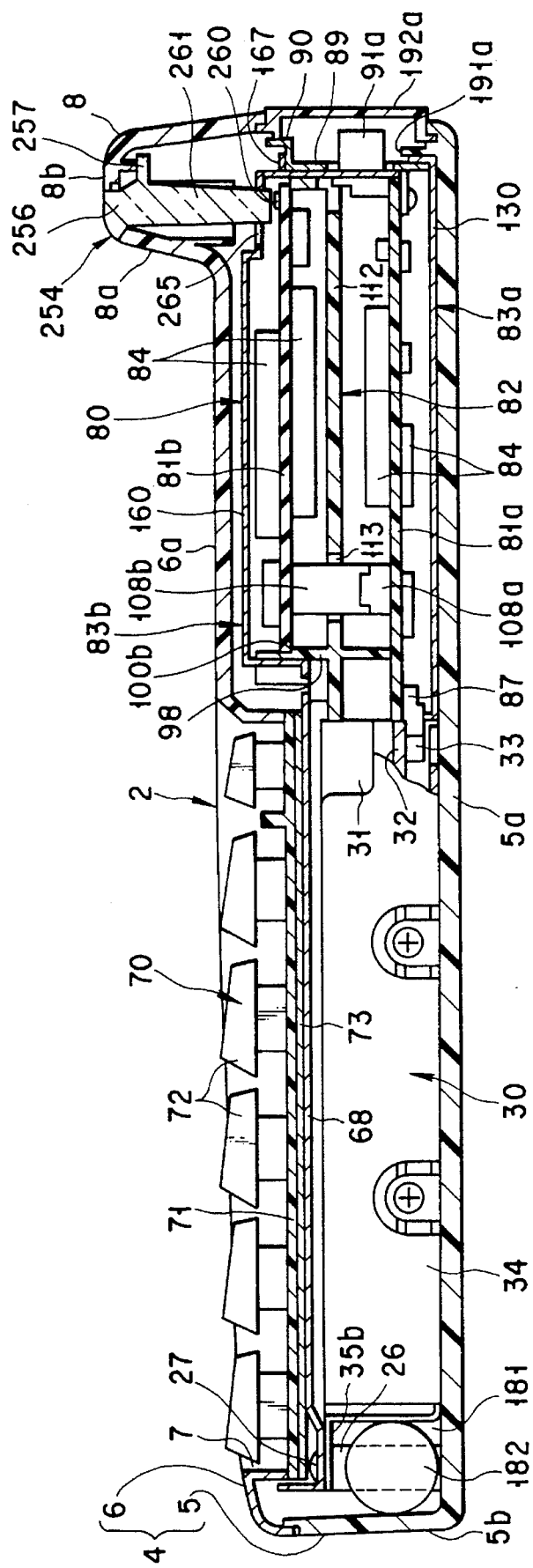
FIG. 7 is a sectional view of the base unit which is a main component of the computer.

As shown in FIG. 7, the base unit 2 comprises a housing 4 which is a shell. The housing 4 is composed of two parts, i.e., a bottom case 5 and a top cover 6. The bottom case 5 is opened at the top, and the top cover 6 covers the top of the bottom case 5. Both the case 5 and the cover 6 are made of synthetic resin such as ABS resin.

As shown in FIG. 7, too, the bottom case 5 has a flat rectangular bottom wall 5a and side walls 5b extending from the sides of the bottom wall 5a. The top cover 6 is comprised of a substantially flat top wall 6a and side walls 6b extending from the sides of the top wall 6a. The top wall 6a is substantially parallel to the bottom wall 5a. The side walls 6b of the top cover 6 are flush with the side walls 5b of the bottom case 5. The side walls 5b and 6b define the front, right and left sides and back of the housing 4.

Figure 38:
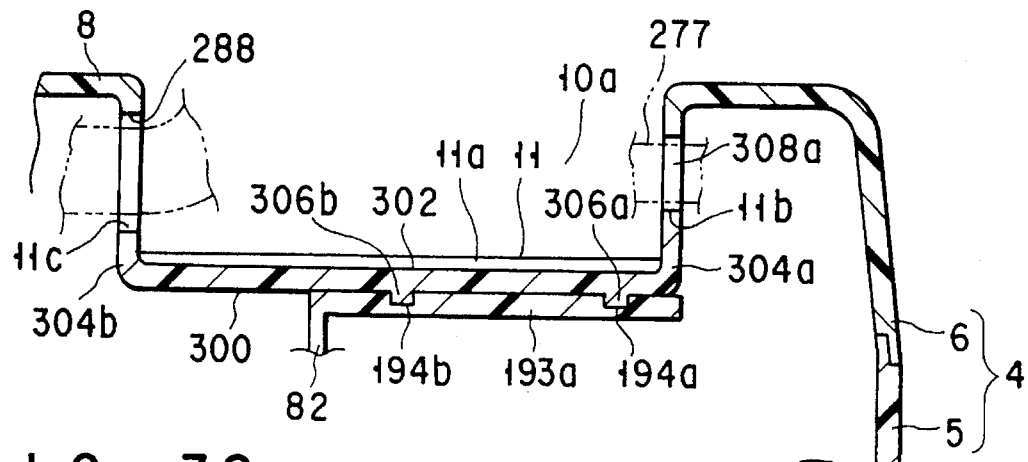
FIG. 38 is a sectional view, explaining how the first cover is connected to the base unit.

The wall 6a of the top cover 6 has a rectangular opening 7 in its front half, through which a keyboard will be exposed outward. The opening 7 is as large as the front half of the top wall 6a. As seen from FIGS. 1 and 7, the top wall 6a has a raised section 8 at the rear. The raised section 8 is as wide as the top cover 6. The section 8 has a front wall 8a rising upwards, and a top wall 8b continuous to the front wall 8a. As shown in FIG. 1, the raised section 8 has two leg-holding recesses 10a and 10b in the left and right portions of the section 8, respectively. Either leg-holding recess has an opening 11 communicating with the interior of the housing 4. As shown in FIGS. 35 and 38, the opening 11 consists of a bottom opening portion 11a and two side opening portions 11b and 11c, each continuous to the bottom portion 11a.

Figure 2:
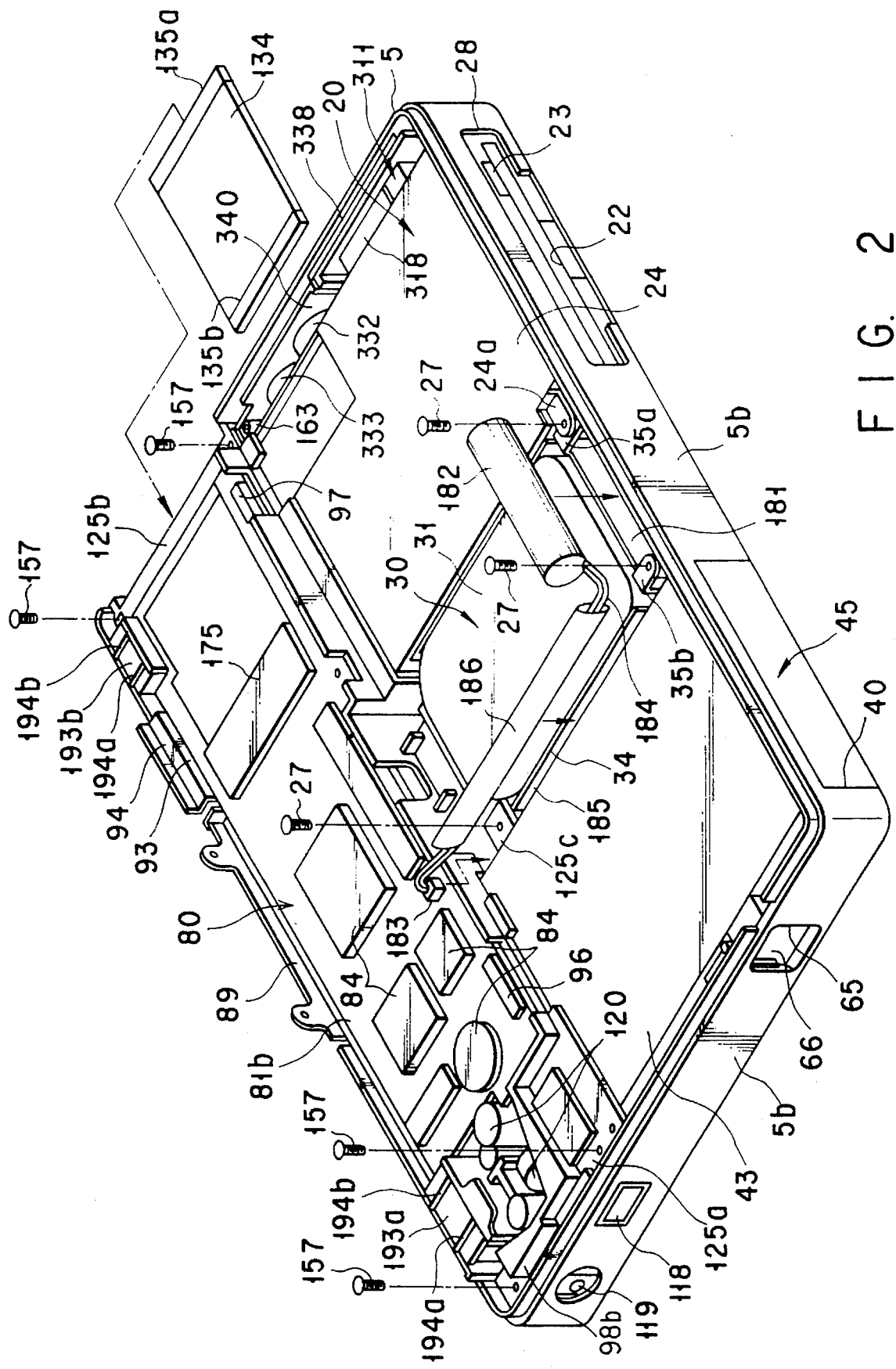
FIG. 2 is a perspective view of the bottom case of the computer, showing a circuit unit, a floppy disk drive and a hard disk drive, all incorporated in the bottom case.

As is shown in FIG. 2, a floppy disk drive 20 (hereinafter referred to as "FDD 20") and a hard disk drive 30 (hereinafter referred to as "HDD 30") are arranged side by side on the front half of the bottom case 5.

Figure 9:
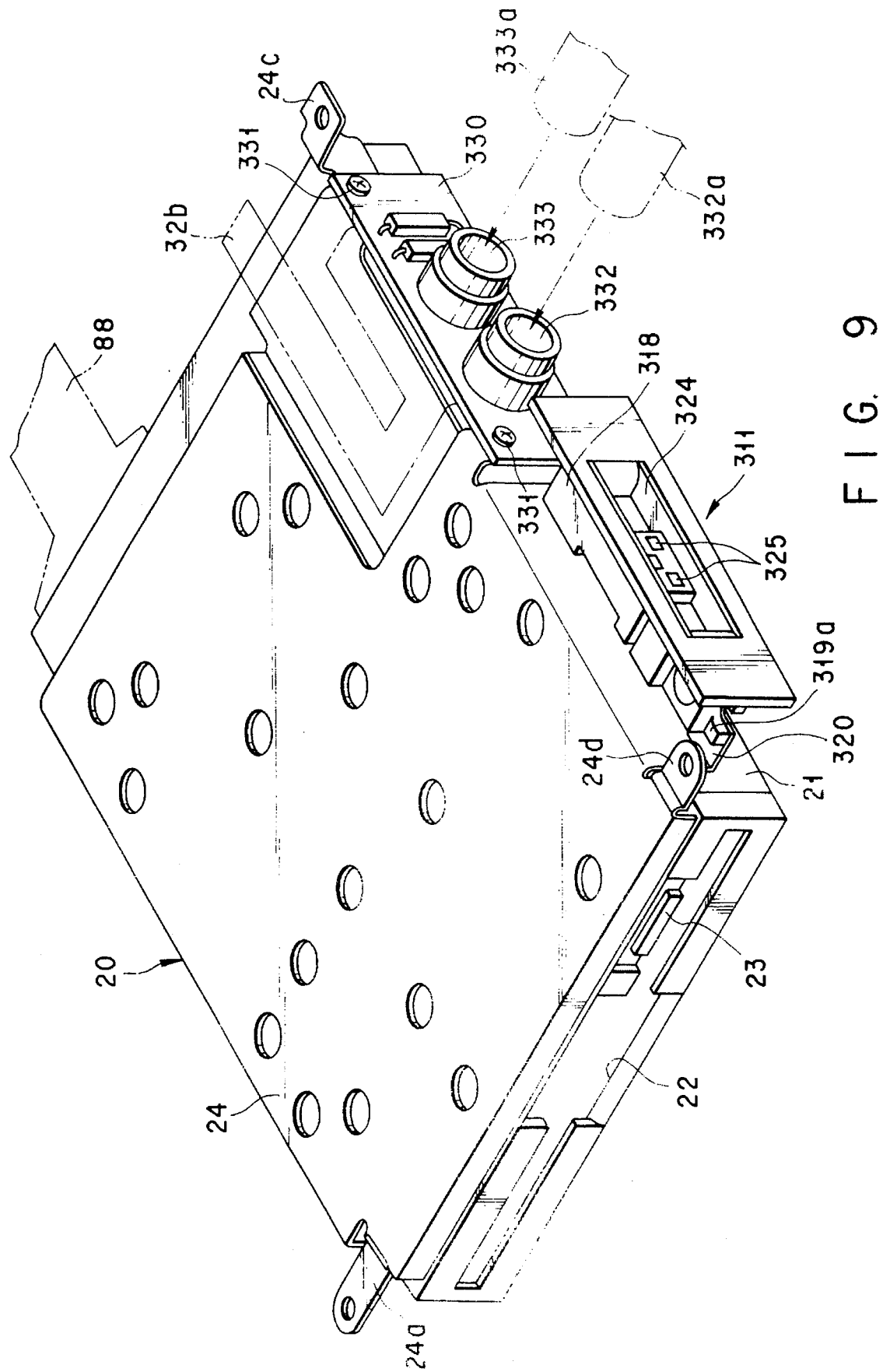
FIG. 9 is a perspective view of the floppy disk drive.

As illustrated in FIG. 9, the FDD 20 has a rectangular metal casing 21. The casing 21 has a slot 22 and a push button 23 in its front. Through the slot 22 a floppy disk is to be inserted into the casing 21 and ejected therefrom. The button 23 is pushed to eject a floppy disk out of the casing 21. A substantially rectangular bracket 24 made of metal covers the top of the casing 21 and has four tongues 24a to 24d at the corners. The tongues 24a to 24d contact the wall 5a of the bottom case 5. The FDD 20 is fixed on the bottom wall 5a, with the slot 22 and the push button 23 exposed at the front of the bottom case 5 and the tongues 24a to 24d fastened to the bosses 26 (FIG. 41) of the bottom wall 5a by means of screws 27. The bottom case 5 has an elongated opening 28 through which the slot 22 and the button 23 are exposed.

Figure 10:
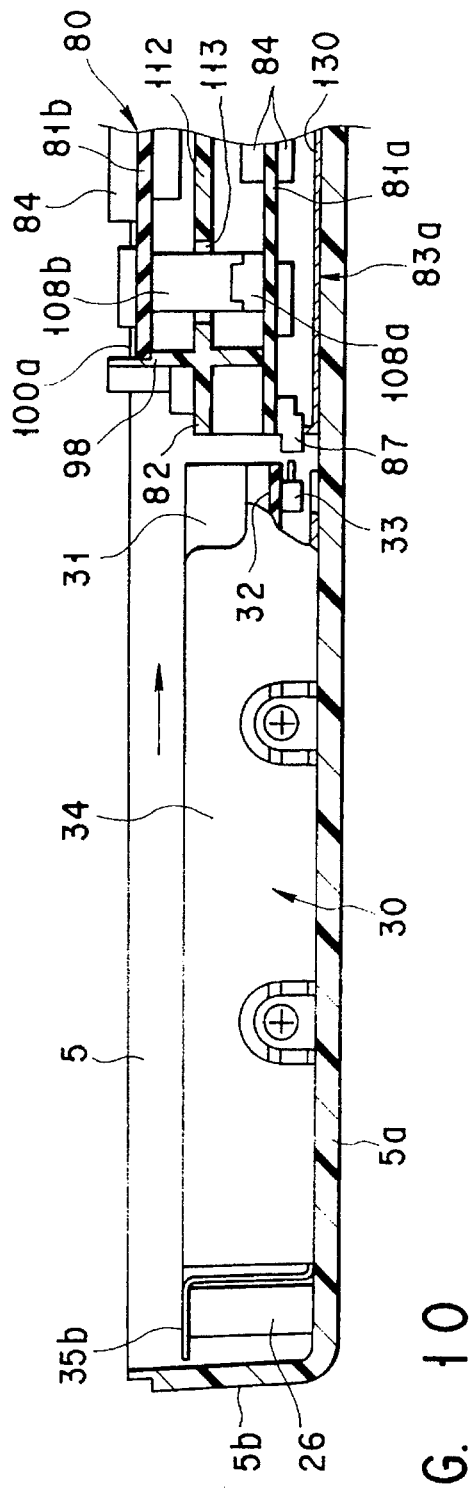
FIG. 10 is a sectional view of a part of the bottom case and the hard disk drive mounted in the bottom case.

As shown in FIGS. 7 and 10, the HDD 30 comprises a sealed housing 31 containing magnetic disks and magnetic heads, and a circuit board 32 secured to the lower surface of the housing 31. A HDD connector 33 is attached to the rear end of the circuit board 32 and is electrically connected to the circuit pattern which is formed on the board 32. The HDD connector 33 is exposed at the back of the HDD 30. The circuit board 32 is covered with a metal bracket 34, at its lower surface, its both sides and its front. As is best shown in FIG. 2, the bracket 34 has two members 35a and 35b protruding from its front. The member 35a is fastened by the screw 27 to the boss 26 of the bottom wall 5a, along with the tongue 24a of the FDD 20. The member 25b is fastened by the screw 27 to the other boss 26 of the bottom wall 5a.

Figure 11:
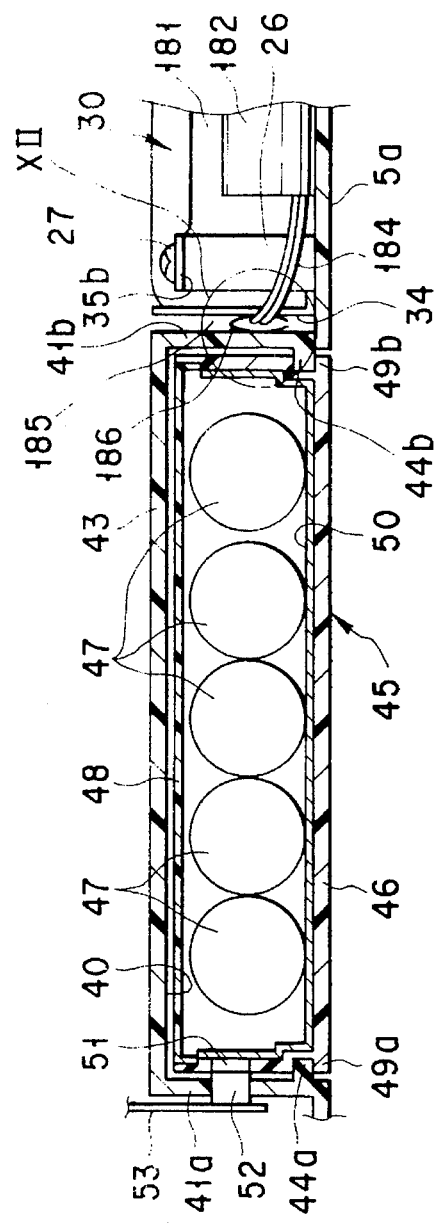
FIG. 11 is a sectional view the battery receptacle contained in the bottom case and the battery pack held in the receptacle.
Figure 12:
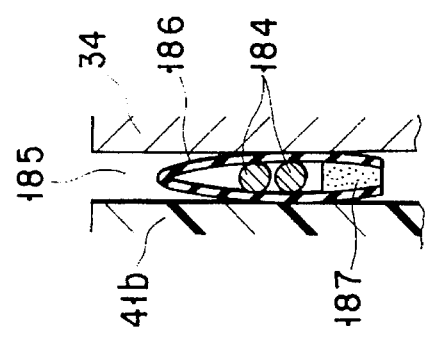
FIG. 12 is an enlarged sectional view of the part XII of FIG. 11.

As is seen from FIGS. 2 and 11, the bottom case 5 contains a battery receptacle 40. The receptacle 40 is located on the left side of the HDD 30 and opens at the front and lower surface of the bottom case 5. The receptacle 40 has a side walls 41a and 41b continuous to the bottom wall 5a, a rear wall 42 connecting the rear ends of the side walls 41a and 41b, and a top wall 43 connecting the upper ends of the side walls 41a and 41b. In other words, these walls 41a, 41b, 42, and 43 constitute the battery receptacle 40. The side walls 41a and 41b have guide projections 44a and 44b, respectively. Both projections 44a and 44b extend between the front and back of the battery receptacle 40.

A battery pack 45 is contained in the battery receptacle 40. The battery pack 45 is a power supply for driving the computer 1 when the computer 1 is disconnected from any commercial power supply. As shown in FIG. 11, the battery pack 45 comprises a rectangular case 46 made of synthetic resin and having an open top, a plurality of batteries 47 placed within the case 46, and a cover 48 adhered to the top of the case 46, thus covering the batteries 47. The batteries 47 are electrically rechargeable.

The battery pack 45 can be removed from the battery receptacle 40, at the front of the bottom case 5. The case 46 of the pack 45 has guide grooves 49a and 49b which are formed in the right and left sides of the case 46. These grooves 49a and 49b receive the guide projections 44a and 44b of the receptacle 40 as long as the battery pack 45 is inserted in the battery receptacle 40. The pack 45 is thereby held within the battery receptacle 40. Once the pack 45 has been inserted into the receptacle 40, the bottom and front of the case 46 are level with the wall 5a of the bottom case 5 and the front thereof, respectively, as is illustrated in FIGS. 2 and 11.

In the present embodiment, the inner surfaces of the case 46 are covered with a plated layer 50. The plated layer 50 prevents high-frequency noise, if generated, from leaking from the housing 4. The layer 50 is electrically connected to terminal 51. The terminal 51 is secured to the left side of the case 46 and protrude outward from therefrom. The terminal 51 remain electrically connected to contact 52 mounted on the battery receptacle 40, as long as the battery pack 45 is inserted in the receptacle 40. The contact 52 is formed on the side wall 41a of the battery receptacle 40 and connected, at one end, to a wiring board 53 arranged within the bottom case 5.

Therefore, the plated layer 50 is electrically connected to the wiring board 53 incorporated in the housing 4 when the battery pack 45 is inserted into the battery receptacle 40.

Figure 14:
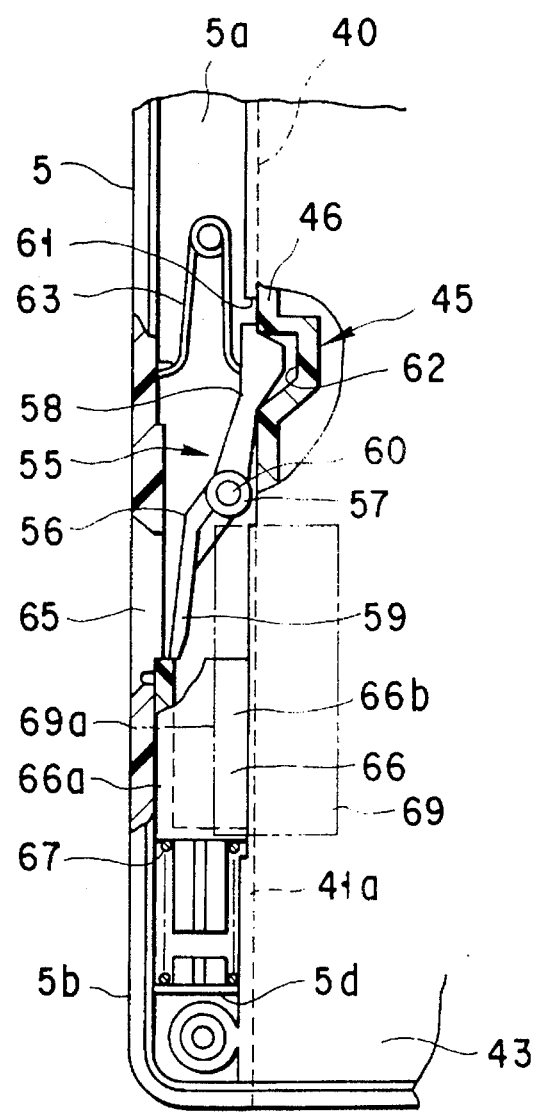
FIG. 14 is a sectional view showing the lock mechanism used in the battery pack.

As shown in FIG. 14, a lock mechanism 55 is arranged in the bottom case 5 and located at the front-left part thereof, for preventing the battery pack 45 from slipping out of the battery receptacle 40. The lock mechanism 55 has a lock lever 56 which can engage with the case 46 of the battery pack 45. The lock lever 56 is positioned between the left-side wall 5b of the bottom case 5 and the left-side wall 41a of the battery receptacle 40. The lever 56 comprises a hollow cylindrical support 57, an engagement member 58, and a pushing member 59. The members 58 and 59 extend from the circumferential surface of the support 57, in the opposite directions. The support 57 is rotatably connected to the bottom wall 5a of the case 5 by a pivot 60. Thus, the engagement member 58 and the pushing member 59 can be rotated around the pivot 60.

The side wall 41a of the battery receptacle 40 has a through hole 61. The hole 61 is so located that the engagement member 58 of the lock lever 56 opposes, via the hole 61, the left side of the case 46 of the battery pack 45. An engagement recess 62 is formed in the left side of the case 46. The recess 62 receives the distal end of the engagement member 58 when the battery pack 45 is inserted completely into the battery receptacle 40. The lock lever 56 is biased by a coil spring 63, such that the engagement member 58 always protrudes into the battery receptacle 40.

Protruding into the receptacle 40, the engagement member 58 elastically fits into the engagement recess 62 formed in the left side of the case 46, when the battery pack 45 is inserted completely into the battery receptacle 40. Then, the battery pack 45 is locked in the battery receptacle 40 and cannot be pulled therefrom.

As shown in FIGS. 2 and 14, an insertion hole 65 is formed in the left-side wall of the bottom case 5, exposing the pushing member 59 of the lock lever 56. Hence, a user of the computer can inserts a finger through the insertion hole 65 into the bottom case 5 to unlock the pack 45 from the receptacle 40. To release the battery pack 45 from the receptacle 40, the user inserts his or her finger into the case 5 through the insertion hole 65 and pushes the member 59 with the finger tip. The lock lever 56 is thereby rotated against the bias of the coils spring 63, moving the engagement member 58 out of the engagement recess 62. As a result, the battery pack 45 can be removed from the battery receptacle 40.

The lock mechanism 55 has a shutter 66 for closing and opening the insertion hole 65 of the bottom case 5. As can be understood from FIGS. 14 to 16, the shutter 66 is positioned in front of the lock lever 56 and between the left-side wall 5b of the bottom case 5 and the left-side wall 41a of the battery receptacle 40. The shutter 66 has a side wall 66a and a top wall 66b. The side wall 66a extends along the side wall 5b, and the top wall 66b extends toward the side wall 41a from the upper edge of the side wall 66a. The lower edge of the side wall 66a is loosely inserted in a guide groove 5c made in the bottom wall 5a of the case 5. The shutter 66 can therefore slide back and forth, between a first position where it closes the insertion hole 65 and a second position where it opens the insertion hole 65.

As shown in FIG. 15, a compression coil spring 67 is clamped between the shutter 66 and a spring holder 5d which is secured to the bottom wall 5a of the case 5 and which is located at the front of the bottom case 5. The compression coil spring 67 pushes the shutter 66 to the closing position, whereby the shutter 66 closes the insertion hole 65. As can be seen from FIGS. 14 to 16, the top wall 66b of the shutter 66 is continuous to the top wall 43 of the battery receptacle 40 and substantially flush therewith. Adhered to the top wall 43 is a guide plate 69 made of synthetic resin. The guide plate 69 has a projection 69a which extends above the shutter 66. The projection 69a contacts the top wall 66b of the shutter 66 and can slide thereon. The projection 69a and the bottom wall 5a of the case 5 clamp the shutter 66. Therefore, the shutter 66 will not be moved upward to a position indicated by the two-dot, one-dash line shown in FIG. 15, when the compression coil spring 67 pushes the shutter 66. Thus, the projection 69a prevents the shutter 66 from moving away from the bottom case 5.

Referring back to FIG. 7, a shield plate 68 made of metal extends horizontally above the FDD 20, the HDD 30 and the battery receptacle 40 and covers these components. The shield plate 68 is located in the front half of the housing 4 and fastened by screws to the boss 26 of the bottom case 5, together with the FDD 20 and the HDD 30.

As shown in FIGS. 1 and 7, a keyboard 70 is mounted on the front half of the housing 4. To be more precise, the keyboard 70 is placed on the upper surface of the shield plate 68. The keyboard 70 has a body 71 made of synthetic resin. The body 71 is a rectangular plate, on which a number of keys 72 are arranged in a prescribed manner. A reinforcing plate 73 is laid on the lower surface of the body 71. The plate 73 performs two functions, that is, to reinforce the body 71, and to prevent the switching noise generated by key operation, from leaking into the housing 4.

The edges of the body 71 and the edges of the reinforcing plate 73 are clamped between the shield plate 68 and the wall 6a of top cover 6. The keyboard 70 is thereby secured to the housing 4, and the keys 72 are exposed at the upper surface of the housing 4 through the rectangular opening 7 made in the wall 6a of the top cover 6.

Figure 3:
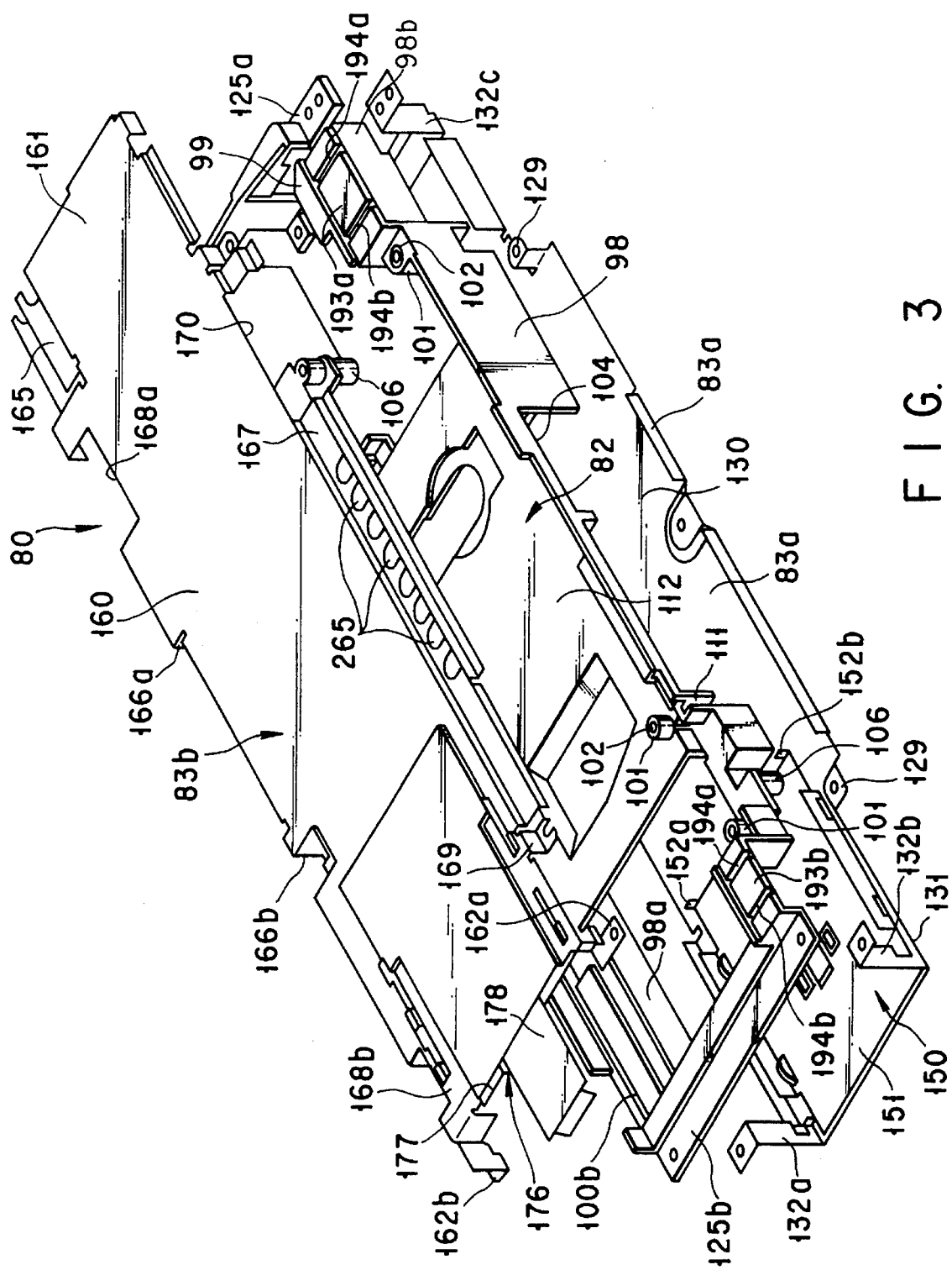
FIG. 3 is a perspective view of the circuit unit, showing the frame and the shield plates separated from one another.
Figure 4:
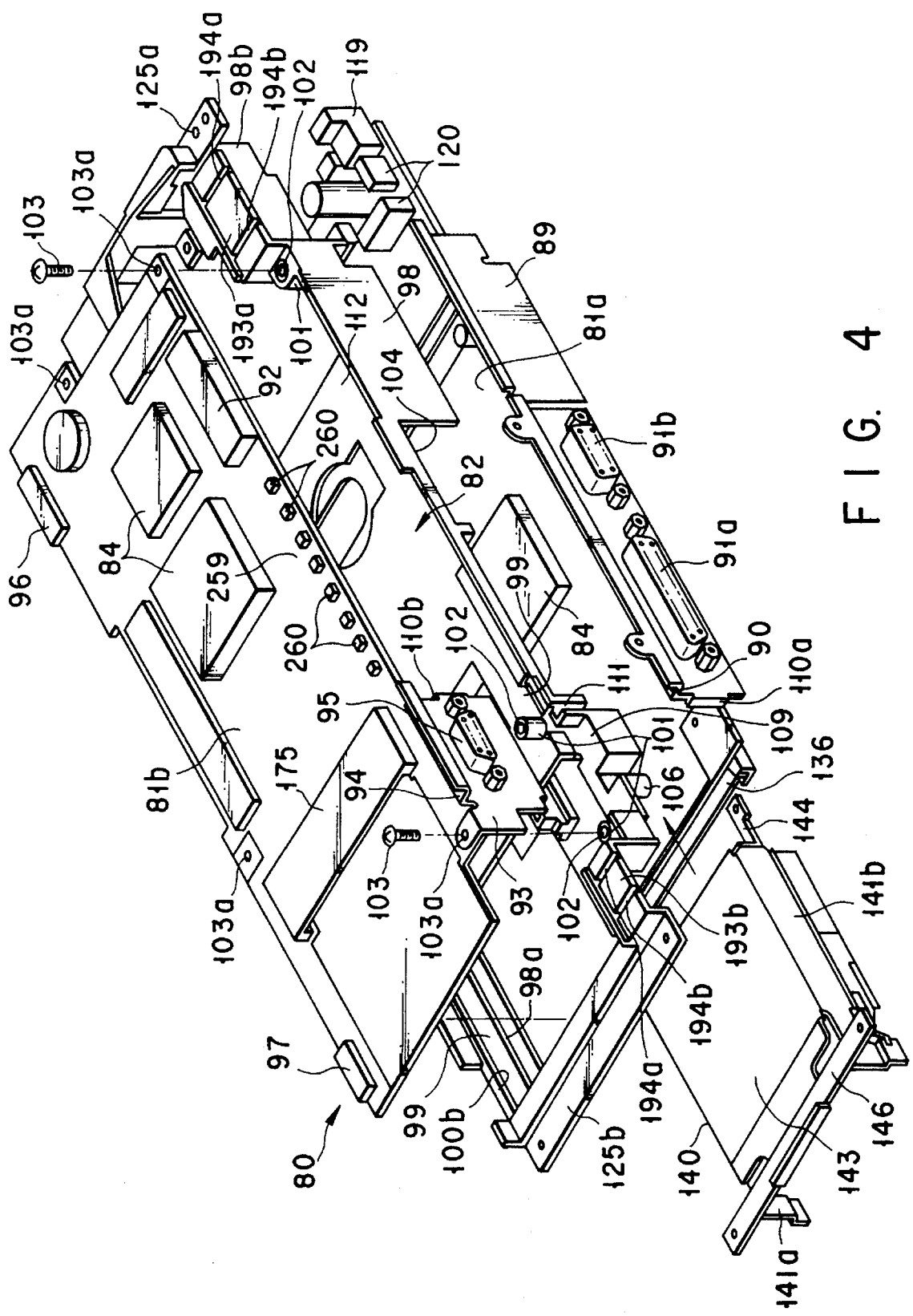
FIG. 4 is a perspective view of the circuit unit, showing the frame and the circuit boards separated from one another.
Figure 5:
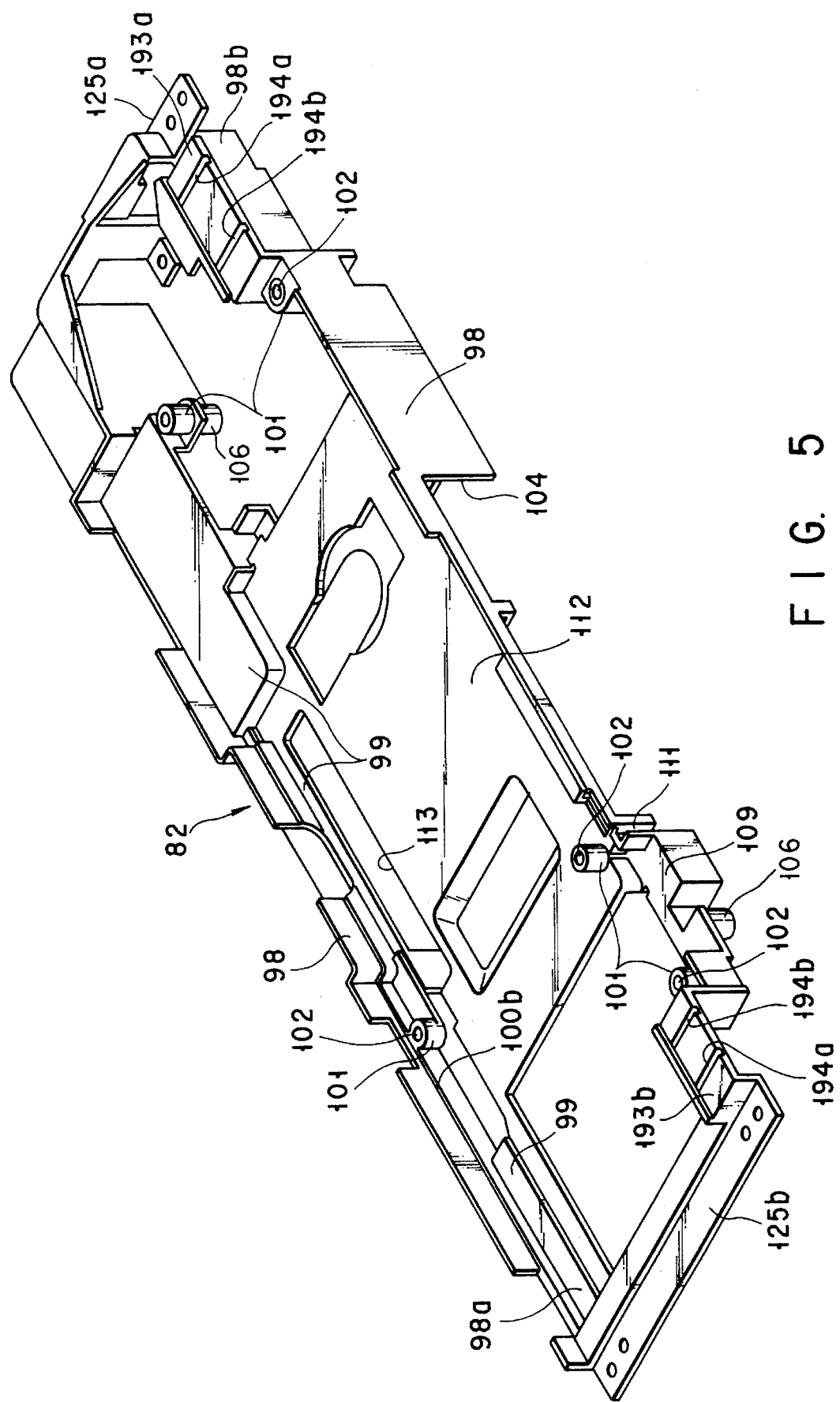
FIG. 5 is a perspective view of the frame.

As seen from FIG. 2, a circuit unit 80 is located in the rear half of the bottom case 5 and at the back of the FDD 20, the HDD 30 and the battery receptacle 40. The unit 80 extends fully from the left side of the bottom case 5 to the right side thereof. As shown in FIGS. 3 to 5, the circuit unit 80 comprises a first circuit board 81a, a second circuit board 81b, a frame 82, a first shield plate 83a, and a second shield plate 83b. The frame 82 supports both circuit boards 81a and 81b. The shield plates 83a and 83b hold, between them, the circuit boards 81a and 81b and the frame 82.

Figure 6:
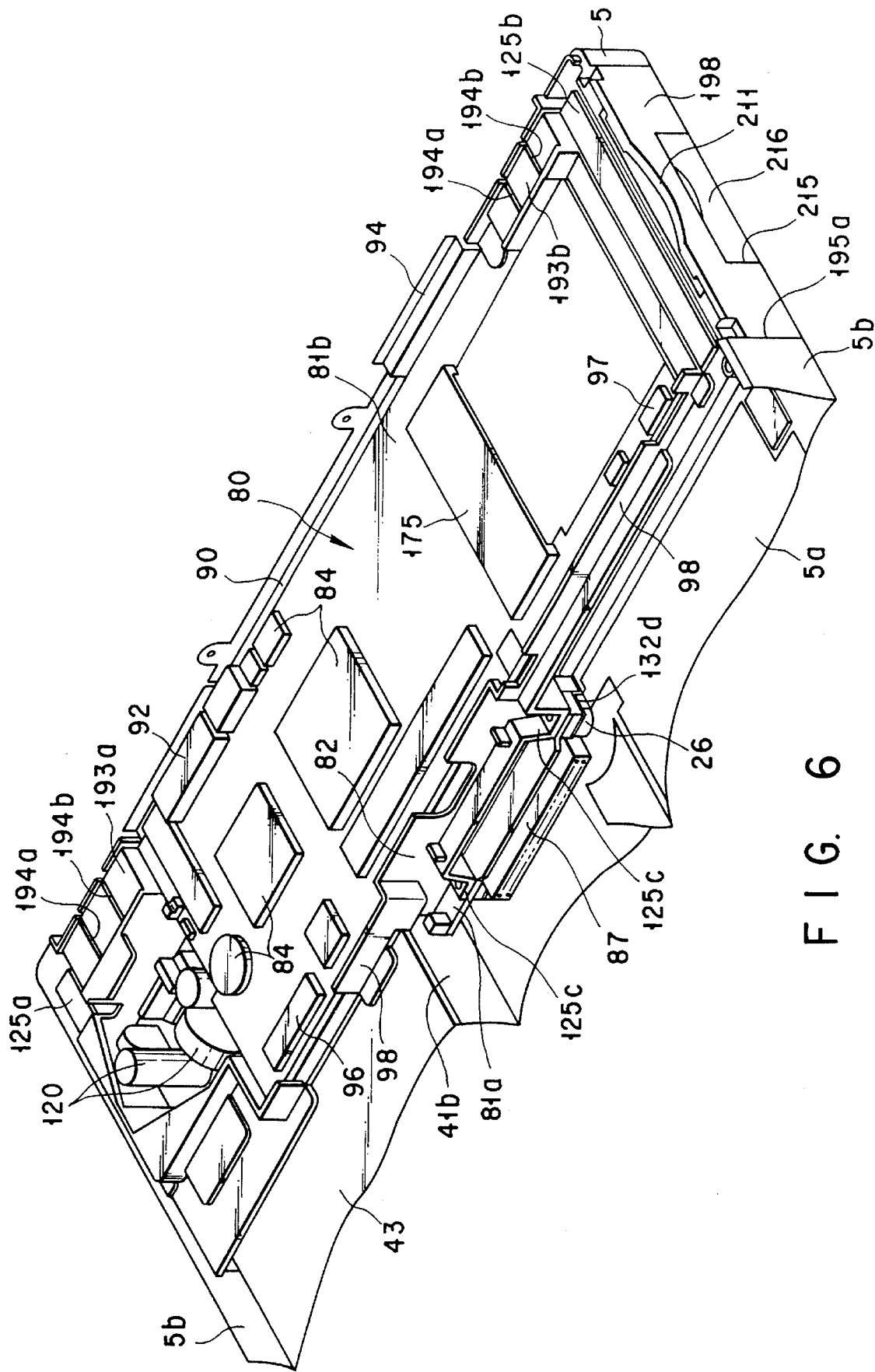
FIG. 6 is a perspective view showing the bottom case and the circuit unit incorporated in the bottom case.
Figure 13:
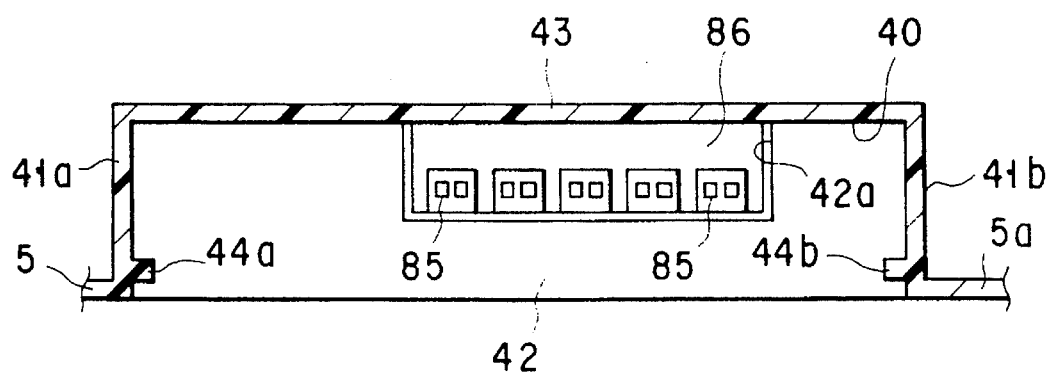
FIG. 13 is a sectional view of the battery receptacle.

The circuit boards 81a and 81b are substantially rectangular, each extending between the left and right sides of the bottom case 5. A number of circuit parts 84, mainly IC chips, are mounted on both surfaces of each of the circuit boards 81a and 81b. Among these circuit parts 84 are those which generate high-frequency noise and those which generate heat. In the present embodiment, the first circuit board 81a serves as a power-supply board. On the front portion of the first circuit board 81a, there are arranged a power-supply connector 86 and a first connector 87. As shown in FIG. 13, the power-supply connector 86 has contacts 85 which contact the positive and negative power-supply terminals of the battery pack 45. As shown in FIGS. 6 and 10, the first connector 87 is connected to the HDD connector 33.

As illustrated in FIG. 4, a pair of interface connectors 91a and 91b and a first connector shield 89 are secured to the rear portion of the first circuit board 81a. The interface connectors 91a and 91b provided for connection with expansion devices such as a printer and a CRT display. The first connector shield 89, which is a formed plate, shields the junctions between the interface connectors 91a and 91b, on the one hand, and the first circuit board 81a, on the other. The first connector shield 89 projects upwards from the rear edge of the first circuit board 81a and extends in the lengthwise direction thereof. The first connector shield 89 has a height substantially equal to the thickness of the circuit unit 80. A flange 90 extends from the upper edge of the shield 89 toward the back of the circuit unit 80.

The second circuit board 81b serves as system board. As shown in FIG. 4, mounted on the upper surface of the board 81b are: a display connector 92 for connecting the display unit 3 to the base unit 2; a keyboard connector 96 for connecting the keyboard 70 to the base unit 2; and an expansion connector 97. The keyboard connector 96 and the expansion connector 97 are positioned on the front-left portion and front-right portion of the circuit board 81b, respectively, and are hence spaced far apart from each other.

An interface connector 95 and a second connector shield 93 are fixed to the rear end of the second circuit board 81b. The interface connector 95 is provided for connection with expansion devices such as a modem and an acoustic coupler. The second connector shield 93 is positioned at the back of the board 81b and shields the junction between the connector 95 and the circuit board 81b. The shield 93 extends downwards from the left portion of the rear edge of the second circuit board 81b, for a distance substantially equal to the thickness of the circuit unit 80. A flange 94 extends from the upper edge of the shield 93 toward the back of the circuit unit 80.

The frame 82 supporting both circuit boards 81a and 81b is a member formed by injection molding; it has been made by filling heated and fluid thermoplastic resin in a mold and solidifying the resin. As shown in FIGS. 4 and 5, the frame 82 has a rectangular frame-shaped wall 98 and a flange 99. The wall 98 surrounds both circuit boards 81a and 81b. The flange 99 is connected to the inner surface of the wall 98. The frame 82 is, as a whole, a substantially elongated member which extends from the left to right side of the housing 4.

Each side of the wall 98 of the frame 82 extends not only horizontally but also vertically. As shown in FIG. 17, the wall 98 has rectangular cuts 100a and 100b in the upper and lower edges. These cuts 100a and 100b receive the edge portions of the circuit boards 81a and 81b, such that the boards 81a and 81b is removably connected to the frame 82. As seen from FIG. 5, the cuts 100a and 100b extend along the wall 98. The cut 100a is formed in the lower edges of the wall 98, whereas the cut 100b is formed in the upper edges of the wall 98.

Bosses 101 are located near the cuts 100b and, thus, above the flange 99, and are formed integral with the flange 99. Each boss 101 has a metal nut 102 embedded in it. Each nut 102 is used for two purposes, for engagement with a screw, but for reinforcing the frame 82. Each nut 102 is exposed at the upper surface of the boss 101. The second circuit board 81b is secured to the frame 82, with its edge portions fitted in the cuts 100b. As shown in FIG. 4, the board 81b has through holes 103a which are made in its edge portions and which are coaxial with the nuts 102. The board 81b is secured to the frame 82 by means of screws 103 which extend through the holes 103a and which are set in screw engagement with the nuts 102.

Bosses 106 are located near the cuts 100a and, thus, below the flange 99, and are are formed integral with the flange 99, and are located below the flange 99. Each boss 106 has a metal nut (not shown) embedded in it. The nut is exposed at the lower surface of the boss 106. The first circuit board 81a is secured to the frame 82, with its edge portions fitted in the cuts 100a. The board 81a has through holes (not shown) made in its edge portions and coaxial with the nuts. The first circuit board 81a is secured to the frame 82 by means of screws (not shown) which extend through the holes and which are set in screw engagement with the nuts.

The wall 98 has a cut 104 and some other cuts (not shown). The cut 104 receives those ends of the interface connectors 91a and 91b which are connected to the first circuit board 81a. The other cut exposes the power-supply connector 86. The cut 104 are covered with the first connector shield 89, which is located outside the wall 98 and which extends along the wall 98.

So secured to the frame 82 as described above, the first circuit board 81a and the second circuit board 81b extend parallel to the wall 5a of the bottom case 5, and are spaced apart in vertical direction. More specifically, the first circuit board 81a serving as power-supply board is located below the second circuit board 81b serving as system board.

As can be understood from FIG. 4, the circuit boards 81a and 81b are staggered in the horizontal direction. To be more specific, the right end portion of the second circuit board 81b protrudes from the right end of the first circuit board 81a, whereas the left end portion of the first circuit board 81a protrudes from the left end of the second circuit board 81b. Since the circuit boards 81a and 81b are so staggered, the wall 98 of the frame 82 has a projection 98a projecting from the right side toward the right side of the first circuit board 81a, and its left-side portion 98b projecting toward the left side of the second circuit circuit board 81b.

As shown in FIG. 7, a first relay connector 108a is attached to the upper surface of the first circuit board 81a, and a second relay connector 108b is attached to the lower surface of the second circuit board 81b. The relay connectors 108a and 108b will be connected to each other when the circuit boards 81a and 81b are secured to the frame 82. Therefore, once the relay connectors 108a and 108b have been mutually connected, the circuit boards 81a and 81b remain electrically connected.

As is illustrated in FIGS. 4 and 5, the wall 98 of the frame 82 has a cut 109, through which the interface connector 95 has an access to the second circuit board 81b. The cut 109 is located to the right of the cut 104 and is shielded from the outside by the second connector shield 93.

As long as both circuit boards 81a and 81b remain secured to the frame 82, the connector shields 89 and 93 are located in substantially the same plane, almost connected to each other at one side. Thus, the shields 89 and 93 cover both circuit boards 81a and 81b—at the back of the circuit unit 80.

As seen from FIG. 20, the connector shields 89 and 93 have integral flanges 110a and 110b, respectively. The flange 110a extends at right angles to the shield 89 and outward from that edge of the shield 89 which opposes the shield 93. Similarly, the flange 110b extends at right angles to the shield 93 and outward from that edge of the shield 93 which opposes the shield 89. The flanges 110a and 110b have a predetermined height. As shown in FIGS. 4 and 5, the wall 98 of the frame 82 has a vertical groove 111 located between the cuts 104 and 109. The groove 111 opens at the outer surface of the wall 98. The flanges 110a and 110b are fitted in the groove 111 and contact each other.

The frame 82 has a partition 112 located between the first circuit board 81a and the second circuit board 81b. The partition 112 has a through hole 113, in which the relay connectors 108a and 108b are connected together.

As can be seen from FIG. 18, the frame 82 is plated, in its entirety, with an electrically conductive layer 115. Hence, the edges of the cuts 100a and 100b are covered with the layer 115. A ground wiring pattern 116 is formed on the four edge portions of the first circuit board 81a, which are fitted in the cuts 100a. Also, a ground wiring pattern 116 is formed on the four edge portions of the second circuit board 81b, which are fitted in the cuts 100b. Hence, when both circuit boards 81a and 81b are fastened to the frame 82, the wiring patterns 116 contact the conductive layer 115 and the nuts 102, whereby the wiring patterns 116 and frame 82 are electrically connected to each other.

Referring back to FIG. 2, a power-supply switch 118, a power-supply connector 119, and various parts 120 of a power-supply circuit are mounted on the left end portion of the first circuit board 81a. These components 118, 119 and 120 are surrounded by the left-side portion 98b of the frame 82.

Referring to FIGS. 5 and 6, the frame 82 has three fastening sections 125a, 125b and 125c at its left end, its right end, an at its front-middle portion, respectively. The first fastening section 125a and the second fastening section 125b have substantially the same length as the width of the frame 82. As shown in FIG. 17, the third fastening section 125c is laid upon the front edge of the first circuit board 81a. As is best illustrated in FIG. 6, the third fastening section 125c straddling the first connector 87 and having its both legs located on the left and right sides of the first connector 87.

The first shield plate 83a, which is positioned beneath the frame 82, is a member formed by pressing a thin, electrically conductive plate. As shown in FIG. 3, the first shield plate 83a has a main part 130. The main part 130 is flat, covering the lower part of the first connector 87 and the first circuit board 81a. The main part 130 has an extension 131 at the right end, which extends to the right side of the first circuit board 81a and which is located below the right end portion of the second circuit board 81b and also below the second fastening section 125b of the frame 82. Tongues 132a and 132b are formed integral with the extension 131 of the main part 130. Both tongues 132a and 132b protrude upwards from the front and rear edges of the extension 131. The upper ends of the tongues 132a and 132b oppose the lower surface of the second fastening section 125b. Another tongue 132c is formed integral with, and extends upwards form, the left end of the first shield plate 83a. The upper end of the tongue 132c abuts on the lower surface of the first fastening section 125a. As shown in FIG. 17, a tongue 132d is formed integral with, and extends forward from, the front-middle portion of the first shield plate 83a. This tongue 132d opposes the the third fastening section 125c of the frame 82.

As is illustrated in FIG. 3, the first shield plate 83a has a plurality of supports 129 at its sides, which are integral with the main part 130. The supports 129 support the first circuit board 81a, the first connector shield 89, and the bosses 106 of the frame 82. The board 81a, the shield 89, and the frame 82 are fastened to the supports 129 by means of screws (not shown) which are applied from below. The ground wiring pattern 116 of the first circuit board 81a contacted to the supports 129. The first circuit board 81a is thereby electrically connected to the first shield plate 83.

As seen from FIG. 21A, the extension 131 of the first shield plate 83a forms a first card receptacle 133, jointly with the projection 98a protruding from the wall 98 of the frame 82 and also with the right end portion of the first circuit board 81a. The first card receptacle 133 is positioned on the right end portion of the circuit unit 80. The receptacle 133 contains an interface card 134, which may be frequency removed from the receptacle 133 and inserted thereinto. As shown in FIG. 2, the interface card 134 has two terminal sections 135a and 135b at its ends, respectively.

The right end portion of the first circuit board 81a has a portion exposed to the rear end of the first card receptacle 133. As shown in FIG. 21A, a card connector 136 is secured to the lower surface of that exposed portion of the circuit board 81a. The card connector 136 has many pins 136a. The terminal section 135a of the interface card 134 is removably fitted in the card connector 136. The terminal section 135a and the card connector 136 are so designed that they are coupled more firmly than the other terminal section 135b and an external device are coupled together.

A cover 140 made of electrically conductive plates is inserted in the first card receptacle 133. As shown in FIGS. 4 and 21A, the cover 140 consists of a pair of side walls 141a and 141b, a rear wall 142 connecting the rear edges of the side walls 141a and 141b, and a top wall 143 connecting the upper edges of the walls 141a, 141b and 142. Thus, the cover 140 is a box opening at the front and the bottom. A pair of supports 144 (only one shown in FIG. 2) are formed integral with the rear wall 142. They project horizontally from the rear wall 142 and extend over the upper surface of the first circuit board 81a. The support 144 have their free ends fastened to the first circuit board 81a by screws. Both supports 144 are thereby held in electric contact with the ground wiring pattern 116 formed on the the first circuit board 81a.

As can be understood from FIGS. 4 and 21A, a metal support plate 146 is welded to the right end portion of the top wall 143. The support plate 146 has its both end portions clamped between the second fastening section 125b of the frame 82, on the one hand, and the tongues 132a and 132b, on the other hand. The cover 140 is, therefore, held in electrical connection with the frame 82 and also with the first shield plate 83a. The side walls 141a and 141b of the cover 140 have their lower edges placed in contact with the extension 131 of the first shield plate 83a. The rear wall 142 has its lower edge set in contact with the exposed portion of the first circuit board 81a. The cover 140 shields the entire first card receptacle 133, except for the card connector 136. The cover 140 partitions the receptacle 133 from both circuit boards 81a and 81b and also from the interior of the housing 4.

As shown in FIGS. 3 and 21A, the first card receptacle 133 contains an ejector 150 for ejecting the interface card 134 out of the receptacle 133. The ejector 150 has a sliding plate 151 which is mounted on the extension 131 of the first shield plate 83a and which can slide thereon to the card connector 136 and away therefrom. The sliding plate 151 has a pair of hooks 152a and 152b at its end which opposes the card connector 136. The hooks 152a and 152b are so formed as to catch and hold the distal end portion of the interface card 134.

As is seen from FIG. 21A, a lever 153 is attached to the lower surface of the sliding plate 151. The lever 153 is slidably held in a guide hole 154 made in the extension 131. The lever 153 is exposed at the bottom of the bottom case 5, through an opening 155 formed in the wall 5a of the bottom case 5.

The first shield plate 83a is mounted on the wall 5a of the bottom case 5, along with both circuit board 81a and 81b and also with frame 82. As is illustrated in FIGS. 3 and 21A, the tongues 132a and 132b of the first shield plate 83a and the fastening sections 125a and 125b of the frame 82 are fastened together by screws 157 to bosses 156 formed on the rear half of the wall 5a. As can be understood from FIG. 17, the tongues 132d of the first shield plate 83a and the third fastening section 125c are fastened jointly by the screw 27 to the boss 26 formed on the wall 5.

The second shield plate 83b has been formed by pressing a thin electrically conductive plate. As shown in FIG. 3, the second shield plate 83b has a flat main part 160 located above the second circuit board 81b and covers the same. The main part 160 has an extension 161 at the left end, which extends to the left side of the second circuit board. The extension 161 is located above and covers the components 118, 119 and 120 which are mounted on the left end portion of the first circuit board 81a.

A pair of tongues 162a and 162b are formed integral with the right end of the second shield plate 83b. The tongue 162a is fastened by the screw 157 to the boss 156 on the rear half of the wall 5a, together with the fastening section 125b of the frame 82. On the other hand, the tongue 162b is fastened by a screw to a boss 163 formed on the wall 5a.

A fastening member 165 is formed integral with the extension 161 of the second shield plate 83b. The member 165 is mounted on the upper surface of the first fastening section 125a and fastened to the boss 156 by the screw 157. As is seen from FIGS. 3 and 17, a pair of supports 166a and 166b are formed integral with the front-middle portion of the second shield plate 83b and extend downward therefrom. Both supports 166a and 166b have their distal ends fastened by the screws 27 to the upper surface of the third fastening section 125c of the frame 82.

As shown in FIGS. 3 and 7, a flange 167 is formed integral with, and extends backward from the rear end portion of the second shield plate 83b. The flange 167 is located above the flange 90 of the first connector shield 89 and the flange 94 of the second connector shield 93. Hence, both shield plates 83a and 83b cooperate with the connector shields 89 and 93, thereby shielding both circuit boards 81a and 81b and the frame 82, all around these components 81a, 81b and 82. As a result, the high-frequency noise generated by the circuit parts 84 mounted on both surfaces of each of the circuit boards 81a and 81b is prevented from leaking.

As is illustrated in FIG. 3, the flange 167 has a notch 170, through which the display connector 92 is exposed. The second shield plate 83b has a pair of notches 168a and 168b, through which the keyboard connector 96 and the extension connector 97 are exposed. The plate 83b also has a terminal 169, which is fixed by a screw to the upper surface of the second circuit board 81b. The terminal 169 is connected to the wiring pattern 116 formed on the the board 81b, thus electrically connecting the second shield plate 83b to the second circuit board 81b.

As can be understood from FIGS. 7, 17 and 21A, the first shield plate 83a of the circuit unit 80 is laid on the wall 5a of the bottom case 5. The wall 5a and the bosses 26, 156 and 163 are plated with a conductive layer 5f (FIG. 21B). The plated layer 5f contacts the first shield plate 83a and the tongue 162b of the second shield plate 83b. The circuit unit 80 is thereby electrically connected to the bottom case 5.

Referring to FIG. 21A, a second card receptacle 173 is formed between the right end portion of the second shield plate 83b and the upper surface of the right end portion of the second circuit board 81b. The second card receptacle 173 is positioned above the first card receptacle 133. Thus, two card receptacles 133 and 173 are arranged, one above the other, in the right end portion of the circuit unit 80.

An extension card 174, such as a modem card, is removably inserted in the second card receptacle 173. A card connector 175 is arranged on the rear end portion of the second card receptacle 175 and connected to the upper surface of the second circuit board 81b. The card 174 has its distal end removable fitted in the card connector 175.

The second card receptacle 173 contains an ejector 176 for ejecting the extension card 174 out of the receptacle 173. The ejector 176 has a sliding plate 177 which contacts the lower surface of the second shield plate 83b and which can slide thereon to the card connector 175 and away therefrom. The sliding plate 177 has a pair of hooks (not shown) which are so formed as to catch and hold the distal end portion of the extension card 174. As shown in FIG. 3, the sliding plate 177 has a projection 178 at that end facing away from the card connector 175. The projection 178 extends outward from the second card receptacle 173. A user of the portable computer 1 can pinch the projection 178 with finger tips, and can then move the sliding plate 177 back and forth.

With the circuit unit 80 held in the bottom case 5 as described above, the first connector 87 mounted on the first circuit board 81a opposes the HDD 30 and the HDD connector 33 as illustrated in FIGS. 7 and 10. In this embodiment, the HDD 30 can be moved toward the circuit unit 80 in the direction of the arrow shown in FIG. 10, sliding on the wall 5a of the bottom case 5. When the HDD 30 so slide on the wall 5a, the HDD connector 33 will be connected to the first connector 87. As a result, a space 181 is formed between the HDD 30 and the side wall 5b which constitutes the front of the bottom case 5. Contained in this space 181 is a sub-battery 182 for supplying power required to set the computer 1 in resume mode.

While remaining in connection with the circuit unit 80, the HDD 30 is located adjacent to the side wall 41b of the battery receptacle 40. A wire passage 185 is formed between the HDD 30 and the side wall 41b. The passage 185 is a gap opening at the top of the bottom case 5 and extends straight between the front and back of the bottom case 5.

Referring to FIG. 2, the sub-battery 182 has flexible lead wires 184. As shown in FIG. 11, the lead wires 184 extend through the wire passage 185 to the first circuit board 81a. The wires 184 are connected, at their free ends, to a connector 183, which in turn is connected to the first circuit board 81a. Hence, the connector 183 connects the flexible lead wires 184 to the first circuit board 81a. As seen from FIG. 12, the lead wires 184 are wrapped with a cable guide 186. The guide 186 is a flat straight sheath made by bending a thin plate of hard synthetic resin. Both lead wires 184 extend straight through the cable guide 186. The mutually abutting edges of the guide 168 are bonded together with adhesive 187. The lead wires 184 are thereby held firmly in the cable guide 186, extending straight through the cable guide 186. Held straight in the guide 186, the lead wires 184 can be laid in the wire passage 185 with ease. This helps to facilitate the assembling of the base unit 2.

Once the circuit unit 80 is secured to the bottom case 5, the power-supply connector 86 mounted on the first circuit board 81a is exposed to the battery receptacle 40 via a hole 42a made in the rear wall 42 of the receptacle 40—is illustrated in FIG. 13.

As shown in FIG. 22, as long as the circuit unit 80 remains fixed to the bottom case 5, the interface connectors 91a, 91b and 95 are positioned at the rear end of the bottom case 5, each closer to the middle portion of the case 5 than to the left or right end portion thereof. Therefore, as seen from FIG. 32, a space 188 is provided between each end portion of the back of the circuit unit 80 and the side wall 5b of the bottom case 5.

Referring to FIG. 22, a pair of openings 191a and 191b are formed in the back of the bottom case 5. The first interface connector 91a and the second interface connector 91b are exposed to outside through these openings 191a and 191b, respectively. The openings 191a and 191b are adjacent to each other, both located closer to the middle portion of the case 5 than to the left or right end portion thereof. Two connector covers 192a and 192b are attached to the back of the housing 4. The first cover 192a can open and close the opening 191a, whereas the second cover 192b can open and close the opening 191b. As shown in FIG. 7, both covers 192a and 192b are loosely held between the bottom case 5 and the top cover 6 and can slide back and forth.

As mentioned above, both holes 191a and 191b are positioned near the middle portion of the bottom case 5. The connector covers 192a and 192b are made to slide in the opposite directions, each between a first position where it close the holes 191a and 191b as shown in FIG. 23 and a second position where it opens the holes 191a and 191b as shown in FIG. 22. The covers 192a and 192b are located most close to each other while they stay in the cover-closing position.

While the circuit unit 80 remains fixed to the bottom case 5, the left and right portions of the frame 82 are located beneath the leg-holding recesses 10a and 10b of the top cover 6. Cover seats 193a and 193b, which are substantially flat, are mounted on the left and right portions of the frame 82 and are, thus, positioned right below the leg-holding recesses 10a and 10b. Both seats 193a and 193b are arranged right above the space 188. Positioning grooves 194a and 194b are made in the upper surface of the seat 193a and that of the seat 193b, respectively. Either positioning groove extends in the depth direction of the base unit 2.

Figure 25:
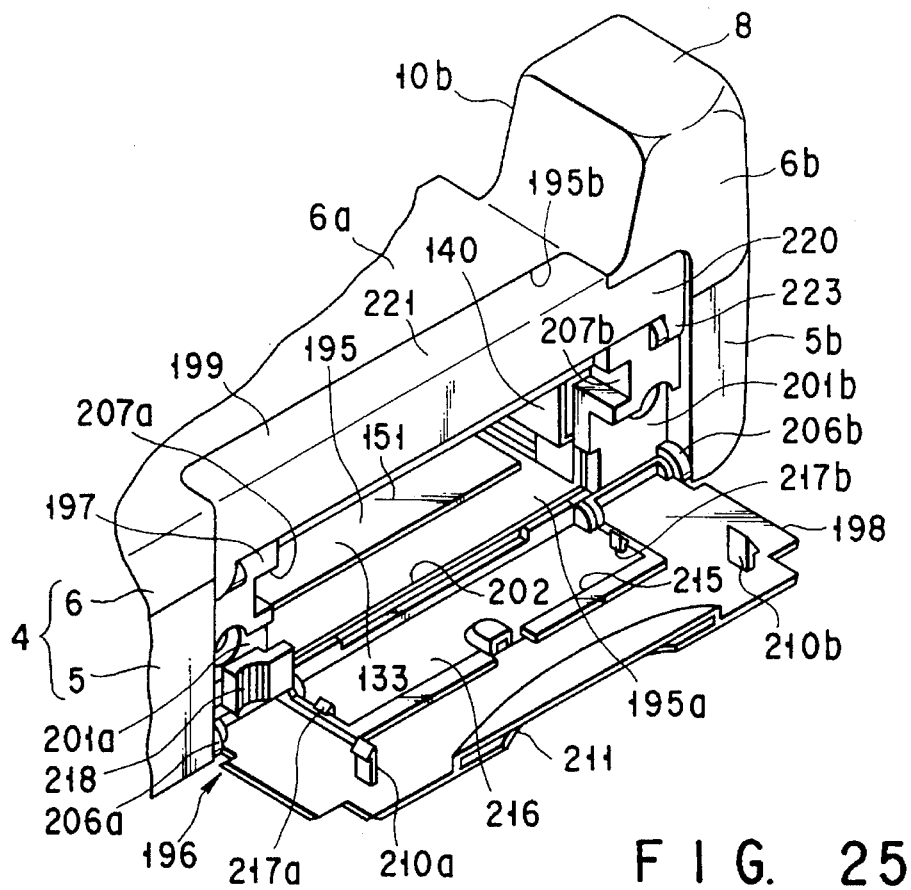
FIG. 25 is a perspective view of a part of the base unit, illustrating the first card receptacle with its cover opened.

As is shown in FIGS. 25 and 26, the rear half of the housing 4 has an opening 195 which allows access to both card receptacles 133 and 173 provided in the circuit unit 80. The opening 195 consists of a side opening 195a cut in the right side of the housing 4 and a top opening 195b made in the wall 6a of the top cover 6 and continuous to the side opening 195a. A cover 196 is attached to the bottom case 5 of the housing 4, for opening and closing the opening 195. The cover 196 comprises a support 197, a first cover member 198, and a second cover member 199 as shown in FIG. 26. The support 197 is secured to the bottom case 5. Both cover members 198 and 199 are rotatably connected to the support 197. The support 197 is shaped like a rectangular frame, consisting of two parallel horizontal beams 200a and 200b and two parallel vertical beams 201a and 201b connecting the horizontal beams 200a and 200b. These beams 200a, 200b, 201a, and 201b define a first card port 202 which communicates with the first cad receptacle 133. The vertical beams 201a and 201b are fastened to bosses 203 formed integral with the bottom case 5, by screws 204. The vertical beam 201a has a projection 206a having a hole 205 and a recess 207a. Similarly, the vertical beam 201b has a projection 206b having a hole 205 and a recess 107b.

The first cover member 198 is used open and close the first card port 202, and is a substantially rectangular plate. Two pins 209 (only one shown in FIG. 26) project from the lower end of the first cover member 198. The pins 209 are loosely fitted in the holes 205 of the projections 206a and 206b. The first cover member 198 can thereby be rotated around the common axis of the pins 209, between a position where it open the first card port 202 and a position where it closes the first card port 202. When the first cover member 198 is rotated to the port-closing position, the first cover member 198 is located level with the side wall 5b of the bottom case 5, constituting part of the right side of the housing 4.

Referring to FIG. 25, a pair of hooks 210*a* and 210*b* protrude from the inner surface of the first cover member 198. The hooks 210*a* and 210*b* are so positioned and so shaped as to slip into the recesses 207*a* and 207*b* of the support 197 when the first cover member 198 is rotated into the port-closing position. Once the hooks 210*a* and 210*b* have been fitted in the recesses 207*a* and 207*b*, the first cover member 198 is held in the port-closing position. The first cover member 198 has, at its upper edge, a finger rest 211 which has a groove and which is used to open the first cover member 198.

The first cover member 198 has a second card port 215. The second card port 215 communicates with the first card port 202 and hence with the first card receptacle 133. The second card port 215 opens to the card connector 136 as long as the first cover member 198 is closed. The second card port 215 is an elongated slot much narrower than the first card port 202. The port 215 is used to insert a thin card into the first card receptacle 133, without opening the first cover member 198.

A cover 216 is hinged to the first cover member 198, for opening and closing the second card port 215. The cover 216 is a long rectangular plate having almost the same size as the second card port 215. The cover 216 has two pins (not shown) which protrude from its lower left and right ends and which are loosely fitted in the holes (not shown) made in the first cover member 198. Hence, the cover 216 can be rotated between a position where it closes the second card port 215 and another position where it opens the port 215. When the cover 216 is rotated to the cover-closing position as shown in FIG. 25, two hooks 217*a* and 217*b* projecting from the inner surface of the cover 215 catch those portions of the first cover member 198 which define the left and right edges of the second card port 215. The cover 216 is thereby held in the closed position. While closed, the cover 216 remains flush with the first cover member 198.

Figure 27:
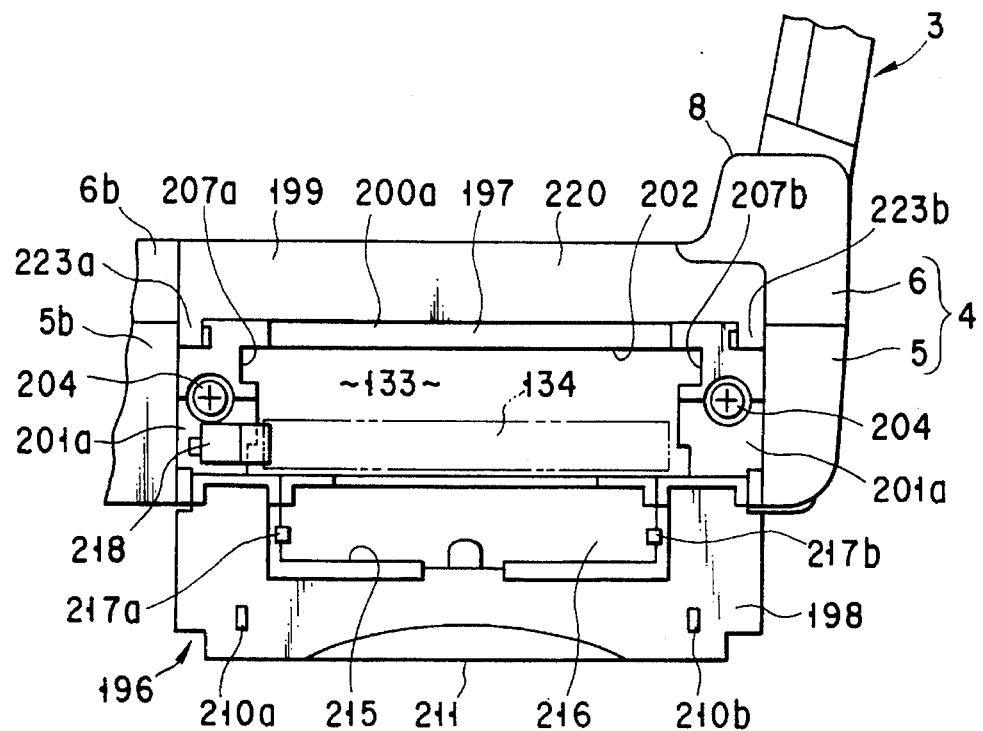
FIG. 27 is a side view of said part of the base unit, showing the first card receptacle with its cover opened.
Figure 28:
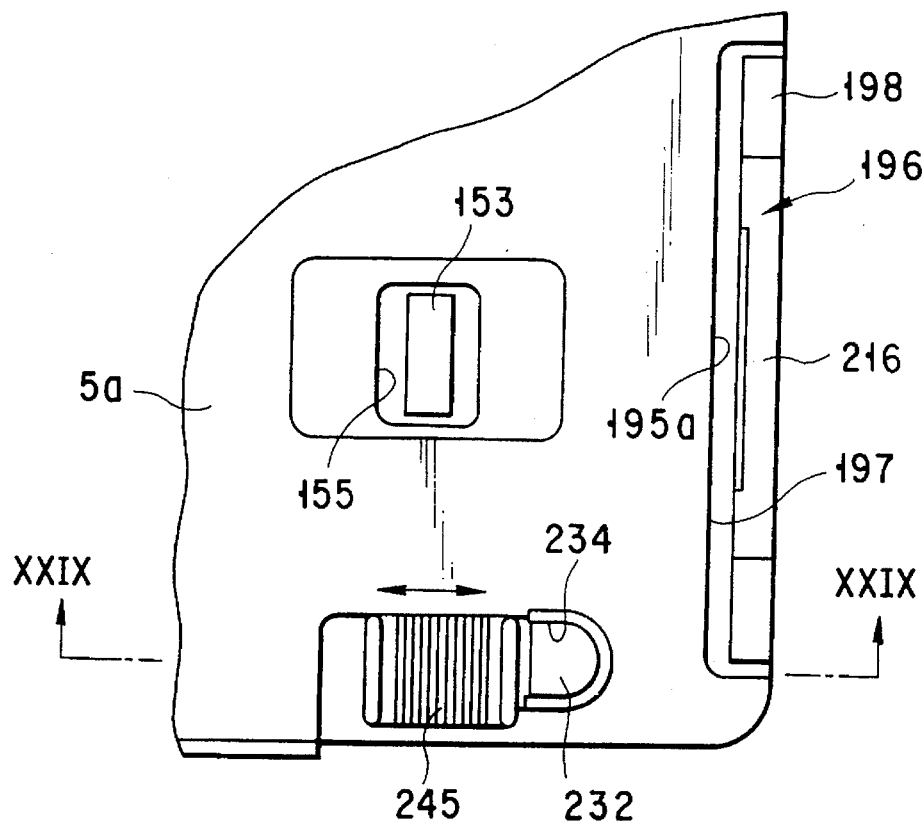
FIG. 28 is a bottom view of that part of the bottom case which has one of the tilt legs.

As illustrated in FIGS. 25, 26 and 27, a card stopper 218 is attached to the vertical beam 201*a* of the support 197. The stopper 218 can slide back and forth between a first position where it protrudes into the first card port 202 and a second position where it retreats from the port 202. When the card stopper 218 is moved to the first position, with the interface card 134 inserted in the first card port 202, it engages the proximal end of the card 134 as shown in FIG. 27. Thus, the stopper 218 prevents the card 134 from being pulled out of the first card receptacle 133 when an external device is pulled to be released from the terminal section 135*b* of the card 134.

The second cover member 199 is used to open and close the entrance to the second card receptacle 173. The cover member 199 comprises a side wall 220 for covering the upper part of the side opening 195*a*, and a top wall 221 integral with the side wall 220, for covering the top opening 195*a*. Both the side wall 220 and the top wall 221 are elongated plates, each extending along the right side of the housing 4. Two bosses 223*a* and 223*b*, each having a hole 222, are formed on the lower-front and lower-rear corners of the side wall 220, respectively. Loosely fitted in the holes 222 of the bosses 223*a* and 223*b* are the projections 224 (only one shown) which protrude from the upper ends of the vertical beams 201*a* and 201*b*. The second cover member 199 can therefore rotate around the common axis of the holes 222, between a position where it closes the openings 195*a* and 195*b* and a position where it opens these openings 195*a* and 195*b*.

As long as the second cover member 199 is closing the openings 195*a* and 195*b*, the top wall 221 and side wall 220 remain in line with the top wall 6*a* and side wall 6*b* of the top cover 6, respectively. The top wall 221 contacts the projections 225*a* and 225*b* which are formed integral with the top wall 6*a* and which extend into the opening 195*a*. Thus, the top wall 221 prevents the top wall 6*a* from bending upwards. While the second cover member 199 is closing the openings 195*a* and 195*b*, the top wall 221 abuts, at its inner surface, on the projections 225*a* and 225*b*. Therefore, the second cover member 199 is held, continuously closing the openings 195*a* and 195*b*.

Figure 24:
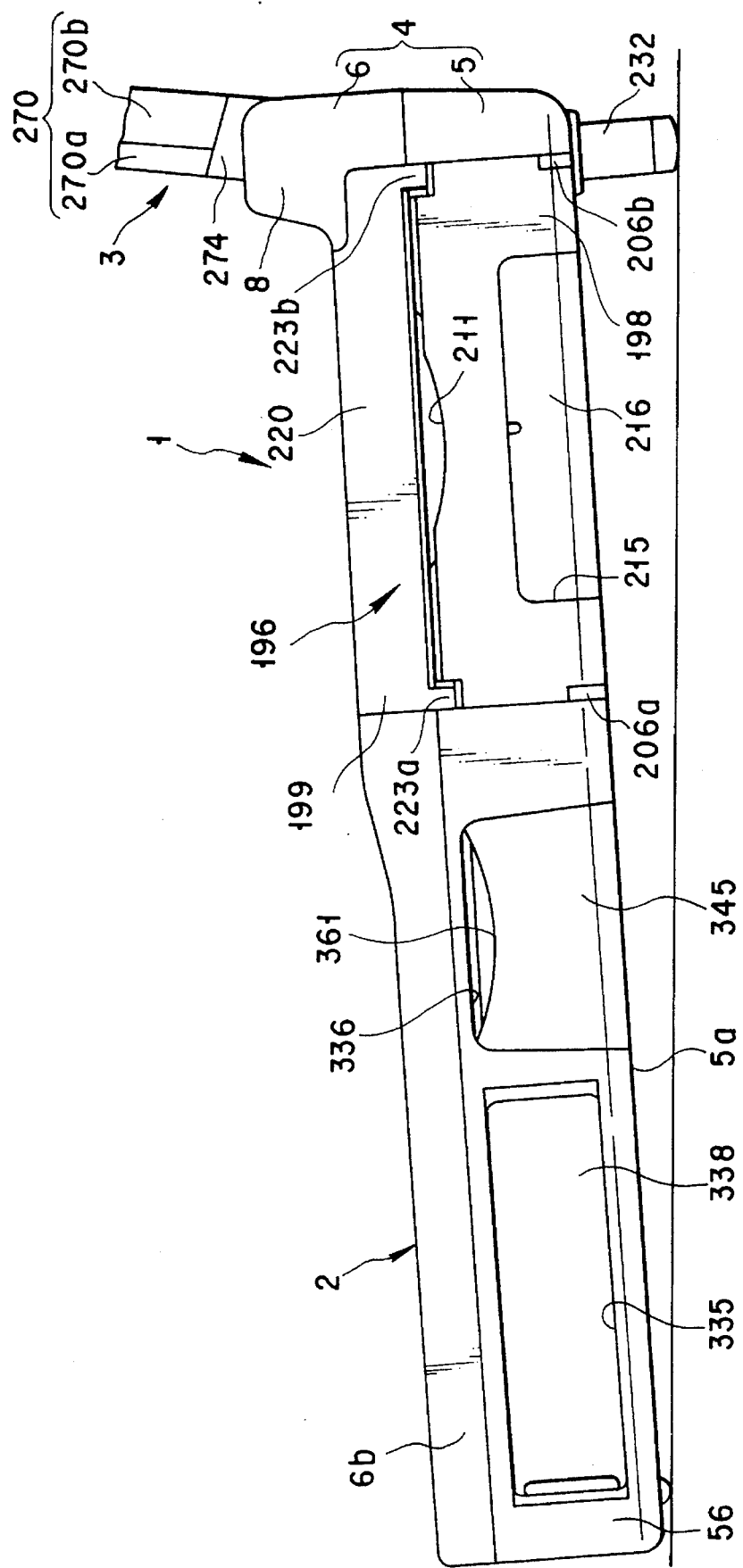
FIG. 24 is a side view of the computer, showing the base unit thereof, which is tilt up by the tilt legs pulled downwards from the bottom case.

Referring to FIGS. 22, 23, and 24, the housing 4 of the computer 1 has a pair of tilt legs 231 and 232. The legs 231 and 232 are used to incline the housing 4 such that the housing 4 is positioned with its front lowered. The tilt legs 231 and 232 can be pushed into the space 188 defined by the left and right sides of the circuit unit 80 and the side wall 5*b* of the bottom case 5. The legs 231 and 232 can be pulled downward from the bottom wall 5*a* of the bottom case 5 and held protruding therefrom, thereby to incline the housing 4. The legs 231 and 232 are attached to the housing 4 in the same way. How the right tilt leg 232 is connected to the housing 4 will be described.

Figure 32:
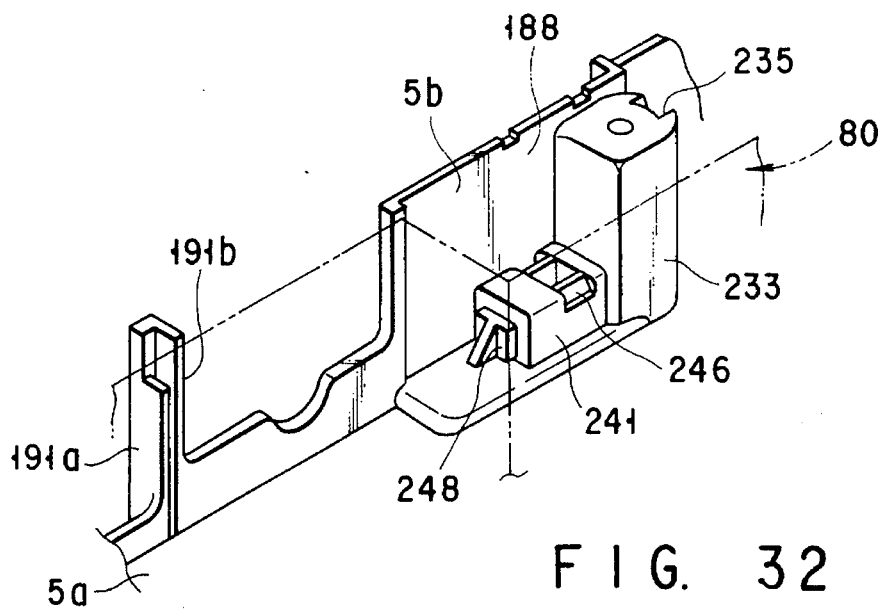
FIG. 32 is a perspective view of that portion of the bottom case which contains one of the title legs.

As shown in FIG. 32, a leg support 233 is formed integral with the bottom wall 5*a* of the bottom case 5. The leg support 233 is a hollow cylinder extending from the wall 5*a* toward the wall 6*a* of the top cover 6. The upper end of the leg support 233 is closed. As seen from FIG. 29, the support 233 has a hole 234 open to the bottom wall 5*a* and a guide groove 235 extending vertically. The guide groove 235 has its lower end located above the bottom wall 5*a*.

The tilt leg 232 is slidably inserted in the leg support 233. The leg 232 has a stopper 236, which protrudes into the guide groove 235. The stopper 236 prevents the leg 232 from slipping out of the leg support 233 when it abuts on the lower end of the guide groove 235 as the tilt leg 232 is pulled down. The tilt leg 232 can be moved between an upper position where it is fully inserted in the leg support 233 and a lower position where it extends downward through the hole 234.

A compression coil spring 238 (i.e., an elastic member) is set in the gap between the upper end of the tilt leg 232 and the upper end of the leg support 233. The coil spring 238 biases the tilt leg 232 downwards. So biased, the tilt leg 232 is pushed down from the leg support 233 and protrudes downward from the bottom wall 5*a* of the bottom case 5, until the stopper 236 abuts on the lower end of the guide groove 235.

The tilt leg 232 has a first recess 240*a* and a second recess 240*b*, both opening at one side of the leg 232. The recesses 240*a* and 240*b* are spaced apart in the lengthwise direction of the tilt leg 232.

Figure 29:
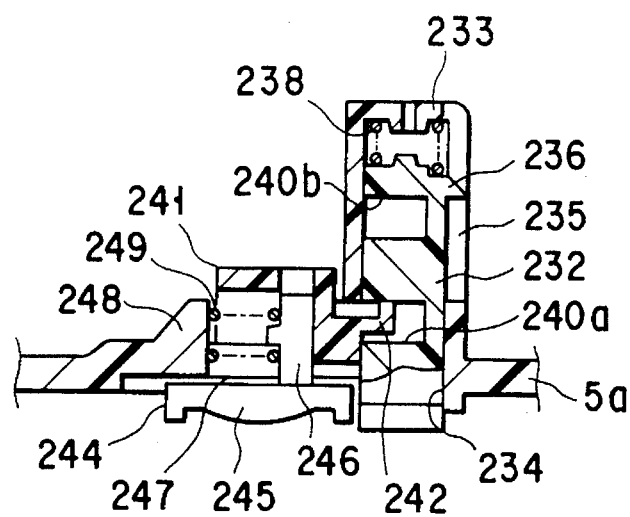
FIG. 29 is a sectional view taken along line XXIX—XXIX in FIG. 28.

As seen from FIG. 29, a leg stopper 241 is mounted on the bottom wall 5*a* and located adjacent to the leg support 233. The leg stopper 241 has a projection 242 which extends through the leg support 233. The stopper 241 can fit into the recess 240*a* or 240*b* formed in the side of the tilt leg 232, so as to hold the tilt leg 232 at either the lower position or the upper position.

The leg stopper 241 has a sliding knob 244. The knob 244 has a finger rest 245 which is exposed at the lower surface of the bottom wall 5*a*, and a claw 246 which connects the finger rest 245 to the leg stopper 241. The claw 246 extends into the bottom case 5 via a guide hole 247 made in the bottom wall 5*a*. The guide hole 247 extends in the widthwise direction of the bottom case 5 and is located on the left side of the hole 234 of the leg support 233. A spring seat 248 is formed integral with the bottom wall 5a and is located at that end of the guide hole 247 which opposes the tilt leg 232. A compression coil spring 249 is placed in the gap between the spring seat 248 and the sliding knob 244. The coil spring 249 biases the sliding knob 244 and also the leg stopper 241, always pushing them toward the tilt leg 232. So biased, the leg stopper 241 remains fitted in either the recess 240a or 240b or the projection 242. Both the leg stopper 241 and the leg support 233 are contained in the space 188 between the side wall 5b and the circuit unit 80.

Figure 30:
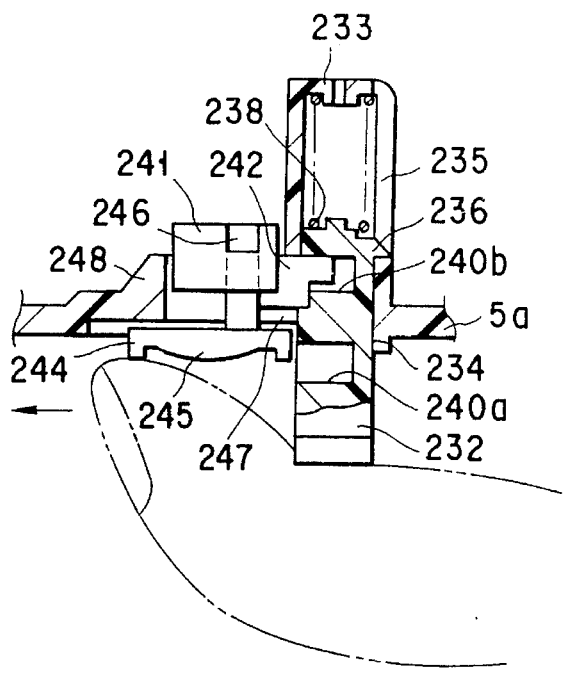
FIG. 30 is a sectional view taken along line XXIX—XXIX in FIG. 28, showing the tilt leg pulled downwards.
Figure 31:
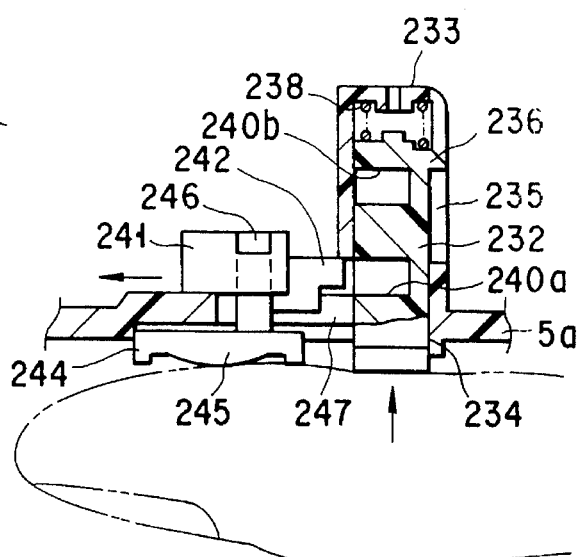
FIG. 31 is a sectional view taken along line XXIX—XXIX in FIG. 28, showing the tilt leg pushed upwards.

To protrude the tilt leg 232 from the bottom case 5, the user of the computer 1 places a finger on the bottom finger rest 245 exposed at the lower surface of the bottom wall 5a, and pushes the sliding knob 244 away from the tilt leg 232. Then, as shown in FIG. 31, the projection 242 of the leg stopper 241 moves out of the lower recess 240a of the tilt leg 232. As a result, the leg 232 projects downwards. At this time, the user releases the finger rest 245, whereby the leg stopper 241 and the sliding knob 244 return to their initial positions. Subsequently, the projection 242 fits into the upper recess 240b of the tilt leg 232. The tilt leg 232 is thereby locked at the lower position where it protrudes downward from the bottom wall 5a as illustrated in FIG. 30.

Although not explained, the other tilt leg 231 is pulled down to protrude from the bottom case 5, exactly in the same way as the tilt leg 232.

To push the tilt leg 232 into the bottom case 5, the user of the computer 1 places a finger on the finger rest 245, and pushes the sliding knob 244 away from the tilt leg 232. The projection 242 of the leg stopper 241 is thereby pulled from the upper recess 240b of the tilt leg 232. Then, the user pushes the tilt leg 232 up into the leg support 233.

Once its projection 242 has been pulled from the upper recess 240b, the leg stopper 241 is located between the tilt legs 231 and 232 and near the hole 234 of the leg support 233. To push the tilt leg 232 upwards into the leg support 233, the user places the cushion and tip of a finger on the lower end of the leg 232 and the finger rest 245, respectively. Then the user straightens up the finger, sliding the sliding knob 244 away from the tilt leg 232 and, at the same time, pushing the tilt leg 232 up into the leg support 233. Thus, the user needs to use only one finger to simultaneously slide the knob 244 and push the leg 232 into the support 233. The tilt mechanism is easy to operate.

When the user detach the finger tip from the finger rest 245 after pushing the tilt leg 232 into the leg support 233, both the leg stopper 241 and the sliding knob 244 return to their initial positions, whereby the projection 242 fits into the lower recess 240a of the tilt leg 232. As a result of this, the tilt leg 232 is locked within the leg support 233 as is illustrated in FIG. 29.

Although not explained, the other tilt leg 231 is pulled upwards into the bottom case 5, in the same way as the tilt leg 232.

Figure 33:
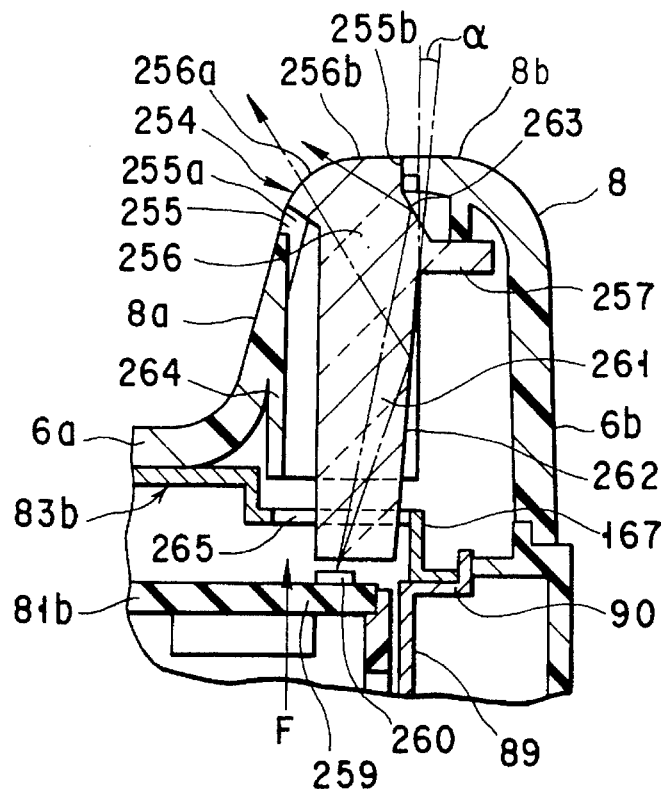
FIG. 33 is a sectional view explaining how an indicator is mounted in the base unit.

As shown in FIGS. 7 and 33, the top cover 6 has an indicator 254 for displaying the operating condition of the computer 1. The indicator 254 has eight holes 255. As seen from FIG. 1, the holes 255 are spaced apart at regular intervals in the lengthwise direction of the raised section 8 formed integral with the top cover 6. Each hole 255 consists of a first part 255a and a second part 255b which are formed in the front wall 8a and top wall 8b of the section 8, respectively. The parts 255a and 255b are continuous to each other. In other words, each hole 255 is formed partly in the front wall 8a and partly in the top wall 8b.

A lens 256 is fitted in each hole 255, pushed thereinto from inside the raised section 8 of the top cover 6. The lens 256 is made of semitransparent synthetic resin having a specific transmittance. The lens 256 consists of a front part 256a and a top part 256b which are fitted in the parts 255a and 255b of the hole 255. As can be understood from FIG. 34, the eight lens 256 fitted in the eight holes 255, respectively, are connected by a bridge 257. The bridge 257 is secured to the inner surface of the top wall 8b of the raised section 8 by means of an adhesive or the like.

The raised section 8 with the holes 255 is positioned right above the rear end portion of the second circuit board 81b. As illustrated in FIGS. 4 and 33, the second circuit board 81b has a light-source support 259 on the rear-upper surface which faces the raised section 8. Eight light-emitting diodes 260 are arranged on the support 259, spaced apart at regular intervals in the lengthwise direction of the raised section 8. The diodes 260 serve as light source for the indicator 254. The eight lenses 256 are located right above the eight light-emitting diodes 260, respectively. A light-guiding section 261 is formed integral with each of the lenses 256 and extends toward the light-emitting diode 260. The section 261 is a solid bar having a front face and a rear face which oppose each other; it is so positioned that its lower end located near the light-emitting diode 260. The section 261 therefore guides light from the diode 260 to the lens 256 secured above the light-emitting diode 260. The rear face of the light-guiding section 261 is substantially flat and includes a first inclining surface 262 which inclines backward to a vertical plane at an angle α of 2° to 3°. The rear surface of the lens 256 is inclines forward to the vertical plane, forming a second inclining surface 263. The second inclining surface 263 is positioned above the first inclining surface 262 and slightly below the front part 256a of the lens 256, and opposes the front part 256a thereof.

Figure 34:
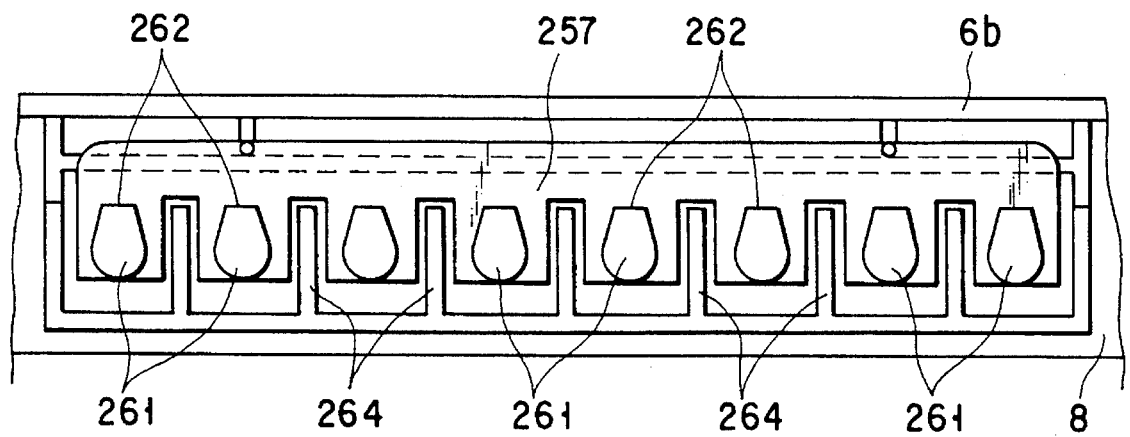
FIG. 34 is a view showing the indicator, seen from below along the arrow F in FIG. 33.

As seen from FIG. 34, the raised section 8 contains integral partitions 264, which are located among the lenses 256 and among the light-guiding sections 261 connected to the lenses 256. Each partition 264 prevents optical interference between the adjacent lenses 256 and also that between the adjacent light-guiding sections 261.

Referring to FIGS. 3 and 33, the rear end portion of the second shield plate 83b has eight through holes 265, which are arranged at regular intervals in the lengthwise direction of the second shield plate 83b and through which the light-emitting diodes 260 are exposed. Fitted in these holes 265 are the lower end portions of the light-guiding sections 261.

In the indicator 254 having the structure described above, the light emitted from each diode 260 passes through the light-guiding section 261, reaches the lens 256, and is hence applied outward from the computer 1. Some beams of the light emitted from the diode 260 travel to the first inclining surface 262. The beams are reflected by the surface 262 to the front part 256a of the lens 256 since the surface 262 inclines backward to said vertical plane.

Furthermore, some other beams of the light emitted from the diode 260 travel to the second inclining surface 263. These beams are reflected by the surface 263 to the front part 256a, too, since the surface 263, continuous to the first inclining surface 262 and located above the surface 262, inclines forward to the vertical plane.

Hence, the light each light-emitting diode 260 emits can be efficiently applied, not only to the top part 256b of the lens 256, but also to the front part 256a thereof. The front part 256a of each lens 256 of the indicator 254 can therefore emits such intense light that the user can clearly know the condition in which the computer 1 is operating.

Referring back to FIG. 1, the display unit 3 comprises a box-like housing 270 and a liquid crystal display 271 contained in the housing 270. The housing 270 is formed of a front panel 270a and a rear panel 270b, connected to each other. The front panel 270a has a display window 272, which exposes the liquid crystal display 271.

The housing 270 has a first leg 273 and a second leg 274, both provided for connecting the display unit 3 to the base unit 2. The legs 273 and 274 are spaced apart from each other, located at the lower-left and lower-right portions of the housing 270, respectively. The legs 273 and 274 are inserted in the leg-holding recesses 10a and 10b of the top cover 6 and coupled to the housing 4 by a first hinge mechanism 275 and a second hinge mechanism 276. The hinge mechanisms 275 and 276 are made of metal which have high electrical conductivity.

As shown in FIG. 35, the first hinge mechanism 275 has a hinge shaft 277 protruding from the left side of the first leg 273. The hinge shaft 277 is fastened to a bracket (not shown) contained in the first leg 273. The outward end portion of the shaft 277 is rotatably supported by a coupling bracket 278. A wave washer 297 is mounted on the shaft 277 and interposed between the coupling bracket 278 and the outward end of the shaft 278 which is thicker than the other portion of the shaft 278. The wave washer 297 impart friction between the hinge shaft 277 and the the coupling bracket 278, to prevent free rotation of the hinge shaft 277.

Figure 37:
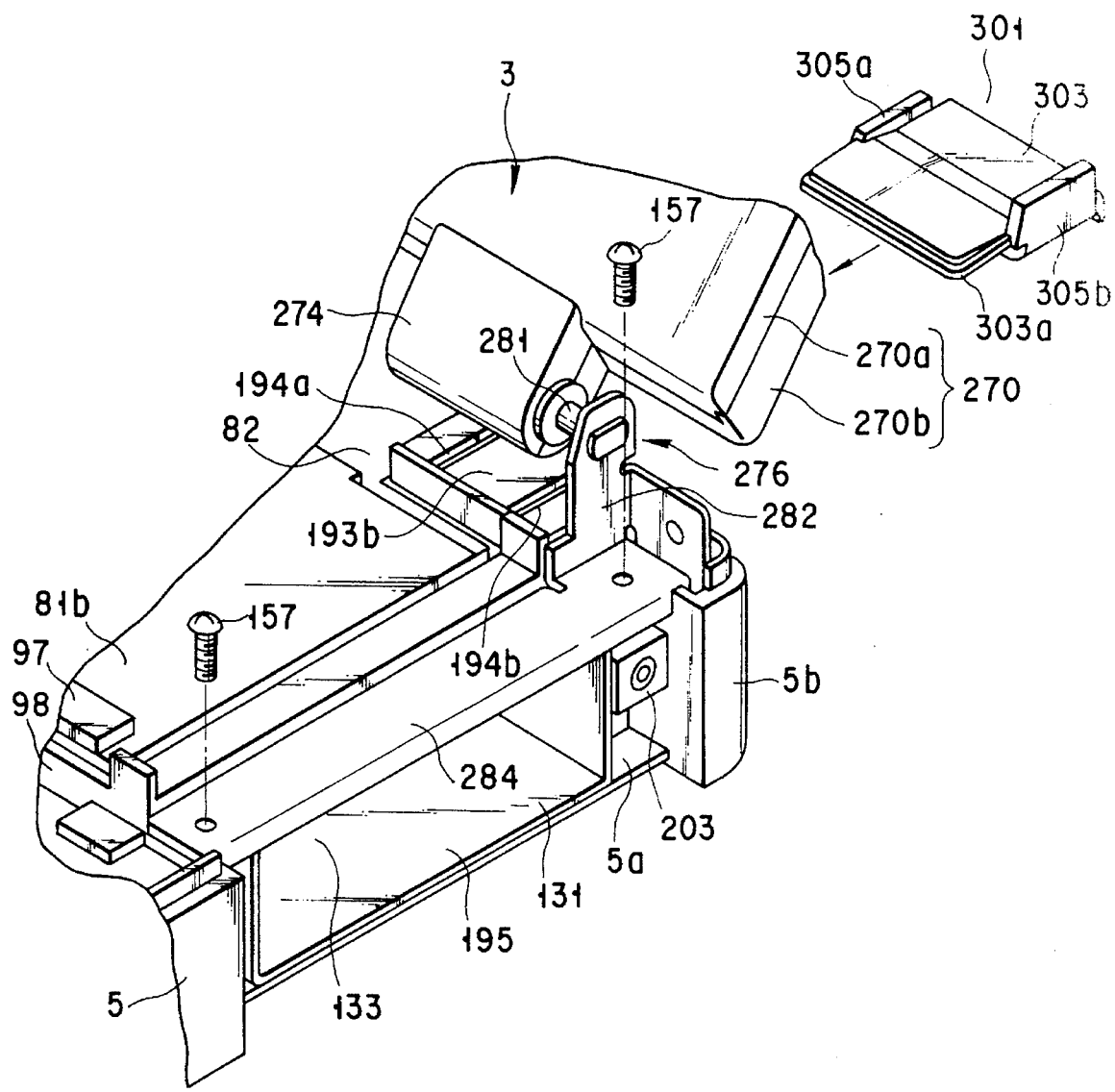
FIG. 37 is a perspective view explaining how the second hinge mechanism is secured to the base unit, thereby coupling the display unit to the base unit.

As can be understood from FIG. 37, the second hinge mechanism 276 has a hinge shaft 281 protruding from the right side of the second leg 274. The hinge shaft 281 is fastened to a bracket (not shown) contained in the second leg 274. The outward end portion of the hinge shaft 281 is rotatably supported by a coupling bracket 282.

Figure 36:
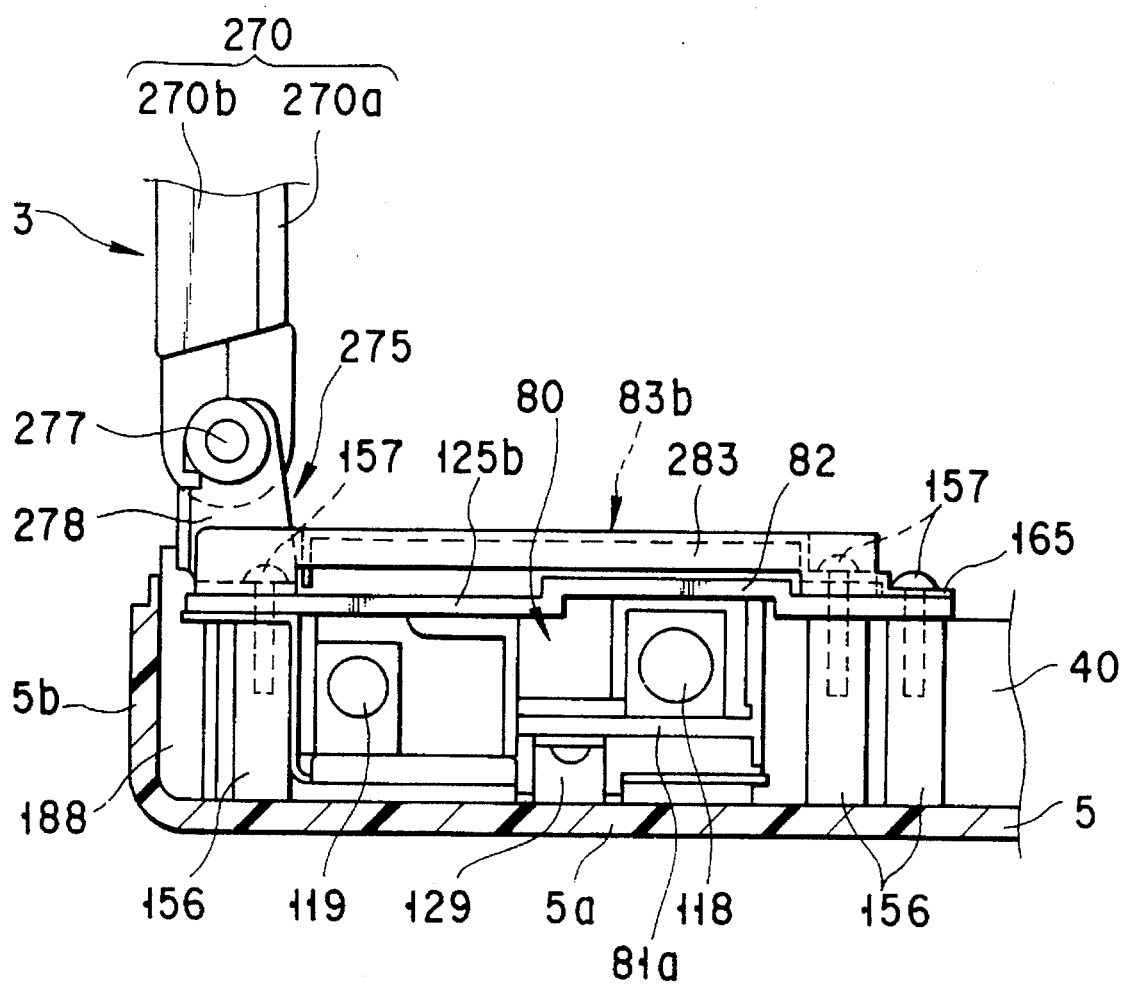
FIG. 36 is a sectional view explaining how the first hinge mechanism is connected to the base unit.

The coupling brackets 288 and 282 have elongated stays 283 and 284, respectively. Both stays 283 and 284 extend toward the front of the base unit 2 and have a length almost equal to the front-to-back width of the frame 82 of the circuit unit 80. The stays 283 and 284 are located beneath the second shield plate 83b and laid upon the upper surfaces of the fastening sections 125a and 125b of the frame 82. The stays 283 and 284 contact, at their lower surfaces, the layer 115 plated on the partition 112 and covering the frame 82. As shown in FIG. 36, the stays 283 and 284 are fastened to the bosses 156 on the rear half of the bottom wall 5a. More precisely, their front and rear ends are fastened by screws 157 to the bosses 156, together with the frame 82. The front end portions of the stays 283 and 294 extend forward, almost reaching the keyboard 70.

Figure 8:
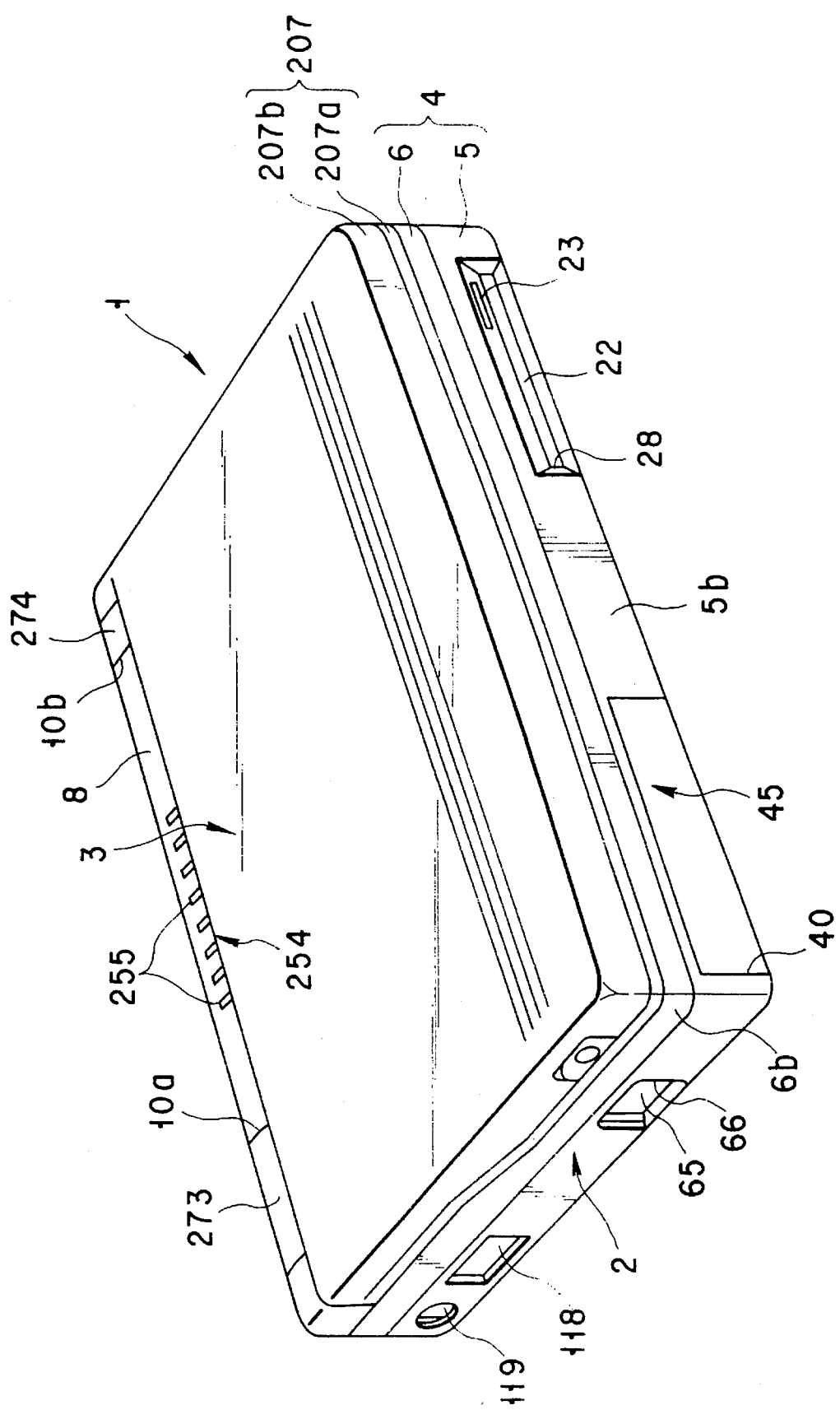
FIG. 8 is a perspective view of the computer, with the display unit set in the closed position.

Thus, the display unit 3 can be rotated around the shaft 277 of the first hinge mechanism 275, and the shaft 281 of the second hinge mechanism 276. The display unit 3 can be rotated through about 180°, so as to assume three positions. In the first position, the display unit 3 covers the keyboard 70 from above. In the second position, the display unit 3 stands upright so that the display 271 faces the user of the computer 1. In the third position, the display unit 3 is tilt backward, extending from the rear edge of the keyboard 70, almost in the horizontal direction. While the display unit 3 remains in the first position as shown in FIG. 8, the housing 270 has its upper surface located flush with the raised section 8 of the housing 4, and its front, left and right sides placed on the same level as those of the housing 4. In this condition, the base unit 2 and the display unit 3 form a rectangular box, and the computer 1 is compact and quite portable.

As described above, the coupling brackets 278 and 282 have the elongated stays 283 and 284, respectively, which have a length almost equal to the front-to-back width of the frame 82 of the circuit unit 80. The stays 283 and 284 are secured, at their front and rear ends, to the bottom case 5, jointly with the frame 82. Therefore, the left and right ends of the frame 82 are clamped between the bottom wall 5a of the bottom case 5 and the stays 283 and 284. Thus, the stays 283 and 284 firmly connect the frame 82 to the bottom case 5, preventing the frame 82 from lifting from the bottom case 5.

As the display unit 3 is rotated from the first position toward the second position, a force is applied to the coupling bracket 278 of the first hinge mechanism 275 and the coupling bracket 282 of the second hinge mechanism 276, to move the brackets 278 and 282 upwards from the bottom case 5. The force is transferred to the frame 82 and distributed therein, because both brackets 278 and 282 have a length almost equal to the front-to-back width of the frame 82, and their front ends almost reach the keyboard 70. In other words, that force does not concentrate on a portion of the bottom case 5 supporting the brackets 278 and 282 or on a portion of the frame 82. This helps to prevent damage to, or deforming of, the bottom case 5 and the frame 82.

Furthermore, the display unit 3 can be grounded to the housing 4, merely by fastening the stays 283 and 284 to the frame 82, since the stays 283 and 284 contact the plated conductive layer 115.

The top cover 6 of the housing 4 is laid over the bottom case 5, with the display unit 3 coupled to the case 5 and the frame 82 and already rotated to the third position. The top cover 6 covers the brackets 278 and 282 of the hinge mechanism 275 and 276, and also the parts of the shafts 277 and 281 thereof. Both legs 273 and 274 of the display unit 3 are thereby located inside the leg-holding recesses 10a and 10b of the top cover 6.

As illustrated in FIG. 35, a cable 287 connected to the drive circuit (not shown) incorporated in the liquid crystal display 271 is led into the first leg 273 at the right side thereof and hence into the raised section 8 through a cable passage 288 made in the right side of the leg-holding recess 10a. The cable 287 is connected, at its distal end, to the display connector 92 mounted on the second circuit board 81b. That portion of the cable 287 which passes through the passage 288 into the raised section 8 is protected by a sheath 289 made of hard synthetic resin. The sheath 289 performs two functions. The first function is to prevent the cable 287 from slipping into the gap between the bottom case 5 and the top cover 6 while the top cover 6 is being amounted on the case 5. The second function is to guide the cable 287 into the raised section 8.

Figure 39:
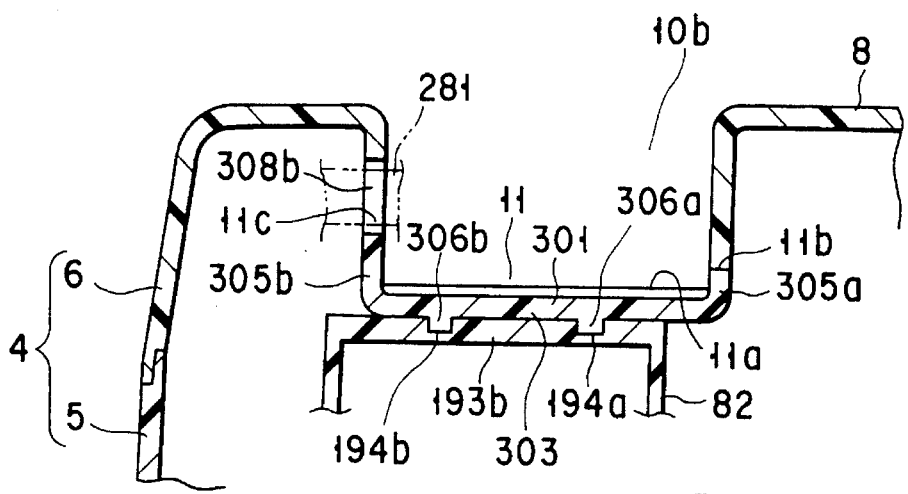
FIG. 39 is a sectional view, explaining how the second cover is connected to the base unit.

The openings 11 of the leg-holding recesses 10a and 10b are covered with a first cover 300 and a second cover 301, respectively. As is seen from FIG. 38, the first cover 300 consists of a bottom wall 302 covering the bottom portion 11a of the opening 11, and side walls 304a and 304b, both fitted in the side portions 11b and 11c of the opening 11. As shown in FIG. 39, the second cover 301 consists of a bottom wall 303 covering the bottom portion 11a of the opening 11, and side walls 305a and 305b, both fitted in the side portions 11b and 11c of the opening 11. As shown in FIGS. 35 and 37, the bottom walls 302 and 303 have a projection 302a and a projection 303a, respectively, which extend from inside the top cover 6 to the edges of the bottom portions 11a. The bottom walls 302 and 303 are mounted on the cover seats 193a and 193b, respectively.

Positioning projections 306a and 306b protrude downward from the bottom wall 302, which are fitted in positioning grooves 194a and 194b made in the upper surface of the cover seat 193a, thus positioning the first cover 300 with respect to the first cover seat 193a. Similarly, positioning projections 306a and 306b protrude downward from the bottom wall 303, which are fitted in positioning grooves 194a and 194b formed in the upper surface of the cover seat 193b, thus positioning the second cover 301 with respect to the second cover seat 193b.

The first cover 300 and the second cover 301 are fixed to the cover seats 193a and 193b when the top cover 6 is connected to the bottom case 5. To be more specific, when the top cover 6 is connected to the bottom case 5, the projections 302a and 303a are held at the edges of bottom portion 11a of the opening 11, and the side walls 304a, 304b, 305a and 305b are fitted into the side portions 11b and 11c of the opening 11. As a result, the cover 300 is firmly clamped between the top cover 6 and the cover seat 193a, and the cover 301 is firmly clamped between the top cover 6 and the cover seat 193b.

The covers 300 and 301 cover the bottom portion 11a and the side portion 11b, from inside the top cover 6, and the bottom walls 302 and 303 are substantially flush with the top wall 6a of the top cover 6. The side wall 305a of the first cover 300 defines a through hole 308a, jointly with the side portion 11b of the opening 11, as is illustrated in FIG. 38. Similarly, the side wall 305b of the second cover 301 defines a through hole 308b, jointly with the side portion 11c of the opening 11, as is shown in FIG. 39. Through these holes 308a and 308b, the hinge shafts 277 and 281 extend into the raised section 8 of the housing 4.

Clamped between the top cover 6 and the cover seats 193a and 193b, both covers 300 and 301 are fixed to the housing 4. No screws are required to fasten the covers 300 and 301 to the housing 4. This helps to reduce the number of parts of the computer 1.

Figure 40:
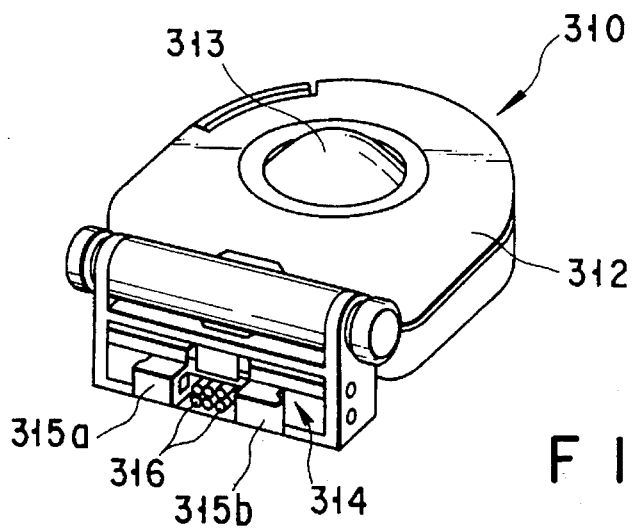
FIG. 40 is a perspective view of a track ball which may be connected to the portable computer.
Figure 43:
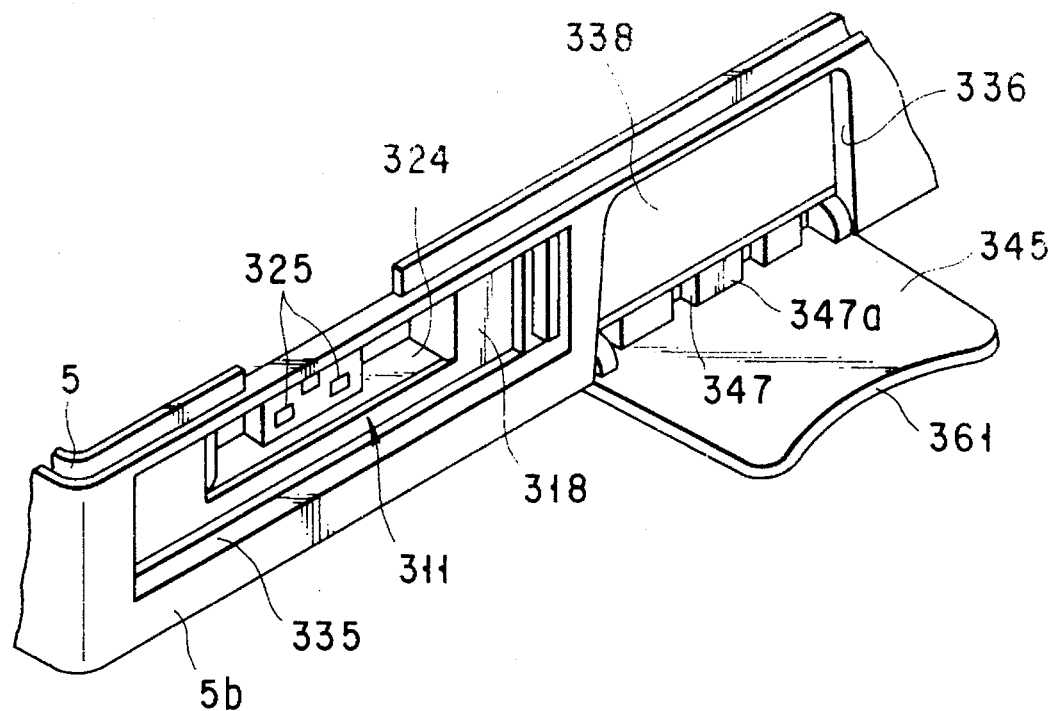
FIG. 43 is a perspective view showing the first and second card slots, both opened.
Figure 44:
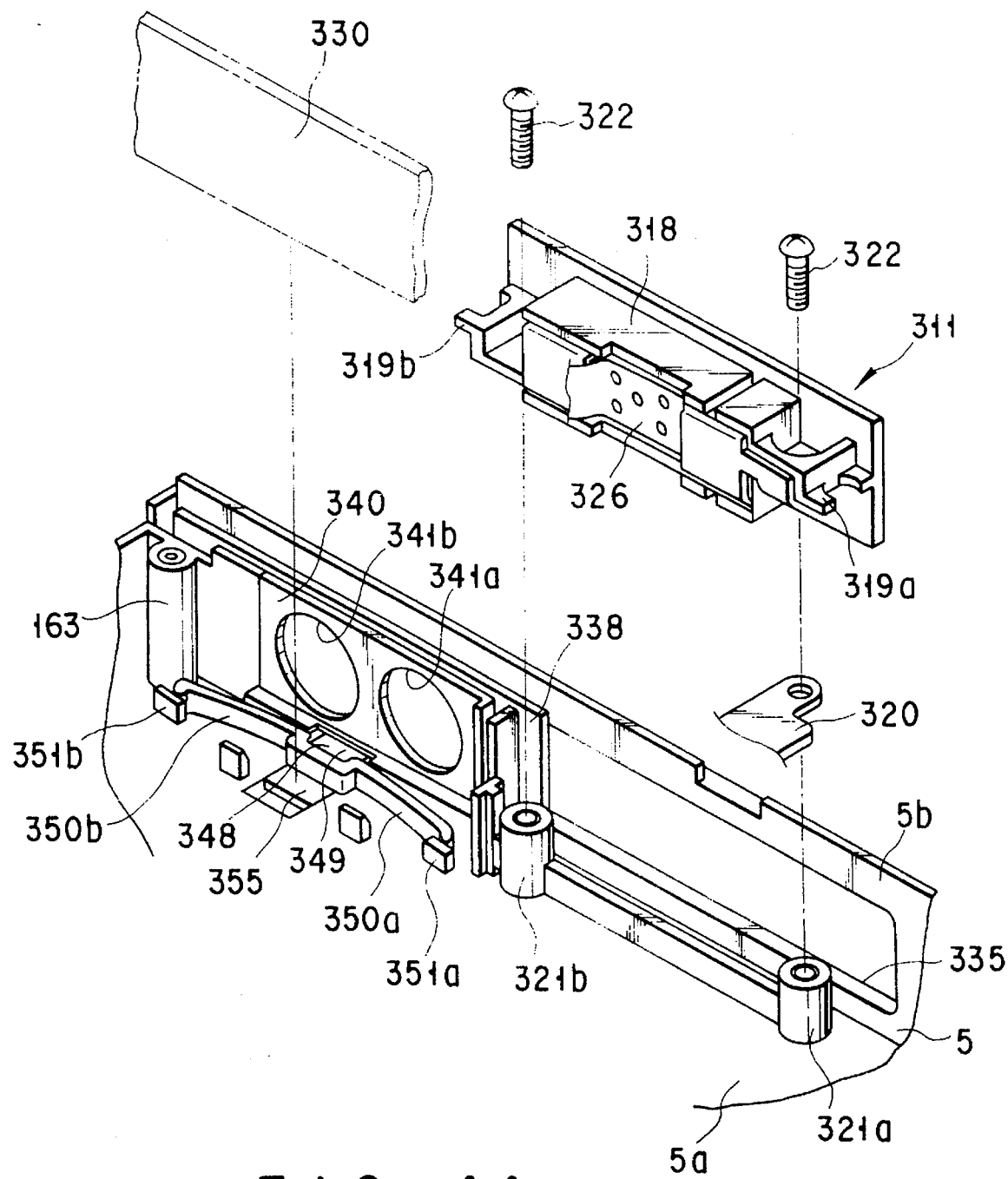
FIG. 44 is an exploded view, explaining how the third interface connector is secured to the bottom case.

Referring to FIGS. 43 and 44, a third interface connector 311 is arranged at the front-right portion of the bottom case 5, for connecting a track ball 310 which is an external device, or a pointing device for designating any desired position on the screen of the liquid crystal display 271. As shown in FIG. 40, the track ball 310 has a casing 312 and a ball 313. The ball 313 is loosely fitted in the casing 312; it can be rotated with a finger tip, thereby to move a cursor or the like to a desired position on the screen of the display 271.

A ball connector 314 is provided at one end of the casing 312. The connector 314 can be removably connected to the third interface connector 311. The ball connector 314 has a pair of projections 315a and 315b. Contacts 316 are arranged between the projections 315a and 315b.

Figure 41:
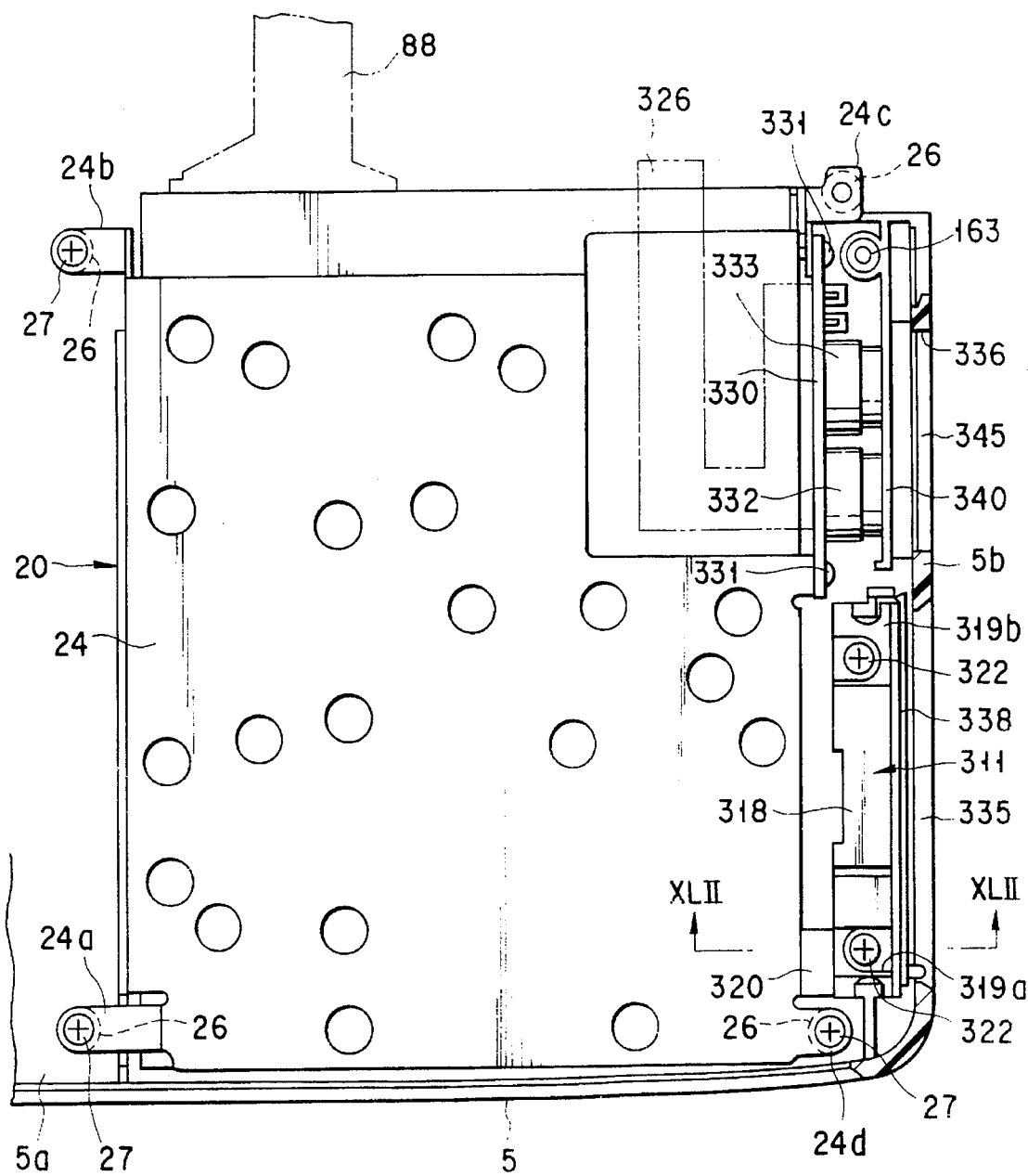
FIG. 41 is a partially sectional view, explaining how the fourth and fifth interface connectors are secured to the floppy disk drive.
Figure 42:
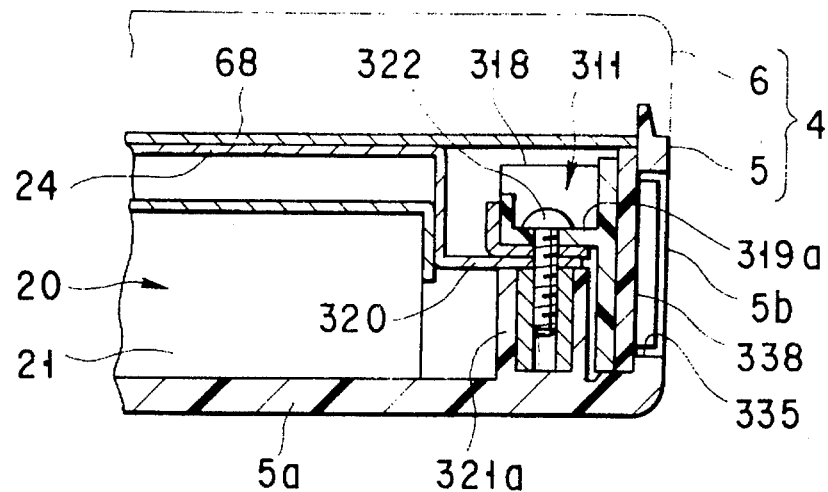
FIG. 42 is a sectional view taken along line XLII—XLII in FIG. 39.

As is illustrated in FIG. 44, the third interface connector 311 has a body 318 made of synthetic resin. The body 318 is shaped like an elongated box extending in the depth direction of the bottom case 5. It has flanges 319a and 319b at the both ends. As shown in FIG. 41, the body 318 is located between the FDD 20 and the side wall 5b, i.e., the right side of the bottom case 5. The flanges 319a and 319b of the body 318 are fastened by screws 322 to bosses 321a and 321b raised from the bottom wall 5a of the bottom case 5.

Referring to FIG. 43, the body 318 of the interface connector 311 has a recess 324 into which both projections 315a and 315b of the ball connector 314 can removably fitted. The recess 324 opens to the side wall 5b which defines the right side of the bottom case 5. A receptacle 325 is mounted on the bottom of the recess 324 to receive the contacts 316 of the ball connector 314. As shown in FIG. 44, the receptacle 325 is connected by a flexible connector 326 to the extension connector 97 of the circuit unit 80.

As is shown in FIGS. 9 and 41, the rear half of the FDD 20 is positioned at the rear of the third interface connector 311. A connector substrate 330 is fastened by screws 331 to the right side of the bracket 24 of the FDD 20. A fourth interface connector 332 and a fifth interface connector 333 are connected to the connector substrate 330, arranged side by side. The fourth interface connector 332 is provided to connect a mouse, another external device, to the base unit 2. The fifth interface connector 333 is used to connect an external keyboard to the base unit 2. The interface connectors 332 and 333 are cylindrical members, each having a plurality of pin holes. They differ in shape from the third interface connector 311 described above. The interface connectors 332 and 333 are connected to the flexible connector 326 and placed close to the inner surface of the wall 5b, or the right side of the bottom case 5.

As shown in FIG. 9, relay connectors 332a and 333a, each shaped like a cylinder, extend from the mouse and the external keyboard and are removably connected to the fourth and fifth interface connectors 332 and 333, respectively. Hence, the track ball 310, the mouse, and the external keyboard can be connected to the interface connectors 311, 332, and 333, though they differ in structure employed to connect them to the base unit 2.

Referring to FIG. 43 again, the side wall 5b (i.e., the right side of the bottom case 5) has two openings 335 and 336, both rectangular and located side by side and extending in the depth direction of the bottom case 5. The first opening 335 exposes the recess 324 of the third interface connector 311 and the receptacle 325 mounted in the recess 324. The second opening 336, formed partly in the bottom wall 5a of the bottom case 5, exposes the fourth interface connector 332 and the fifth interface connector 333.

Figure 45:
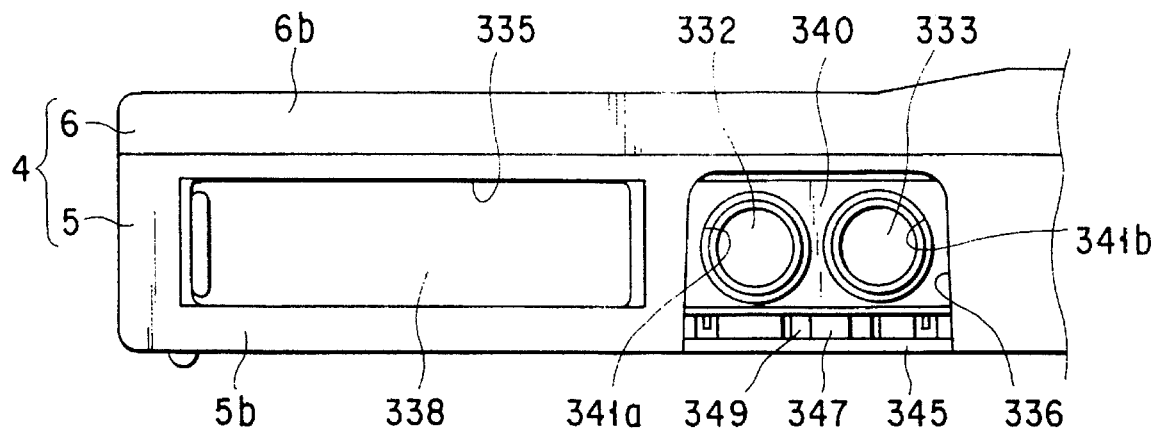
FIG. 45 is a side view of a part of the base unit, illustrating the first and second connector ports which are closed and opened, respectively.
Figure 46:
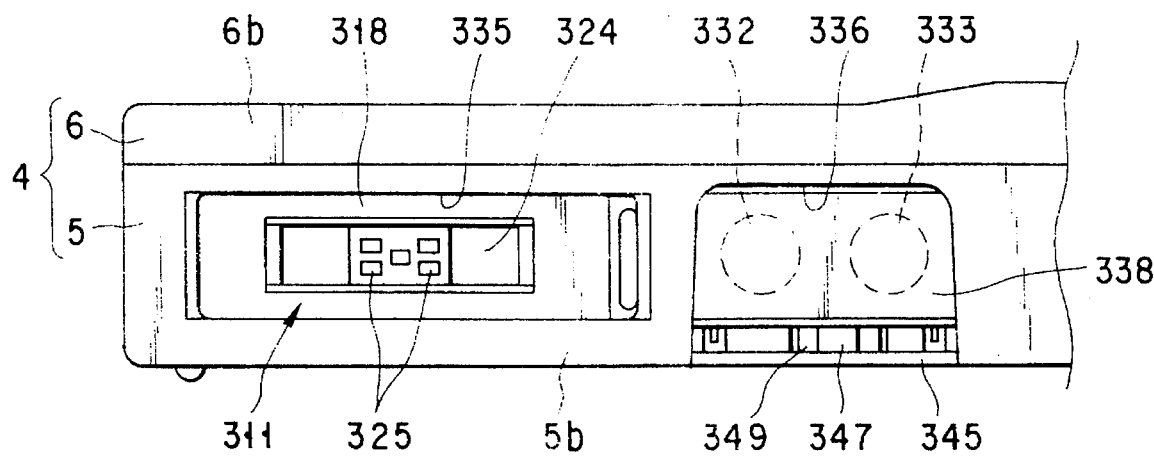
FIG. 46 is a side view of a part of the base unit, illustrating the first and second connector ports which are opened and closed, respectively.

A third connector cover 338 is provided on the bottom case 5; it is a rectangular plate just large enough to shut the first opening 335 which is larger than the second opening 336. The third connector cover 338 can be slid on the inner surface of the wall 5b of the bottom case 5, between a first position and a second position. In the first position, it closes the opening 335 and opens the opening 336, as is illustrated in FIG. 45. In the second position, it opens the opening 335 and closes the opening 336, as is illustrated in FIG. 46. Thus, the cover 338 opens the opening 335 and closes the opening 336, or vice versa. While the cover 338 stays in the first position, it is slidably held between the inner surface of the wall 5b and the side of the body 318 of the interface connector 311.

As illustrated in FIG. 44, the bottom case 5 contains a guide wall 340. The guide wall 340 cooperates with the side wall 5b, holding the third connector cover 338. The wall 340 is continuous to the third interface connector 311 and located in the gap between the side wall 5b and the fourth and fifth interface connectors 332 and 333. The guide wall 340 has two connector holes 341a and 341b, arranged side by side. The holes 341a and 341b are aligned with the fourth interface connector 332 and the fifth interface connector 333, respectively. Thus, when the third connector cover 338 is slid to the second position, it enters the gap between the wall 5b and the guide wall 340, covering the interface connectors 332 and 333 from the side, making it impossible to connect the mouse or the external keyboard to the computer 1 as long as the track ball 310 is connected thereto.

Figure 47:
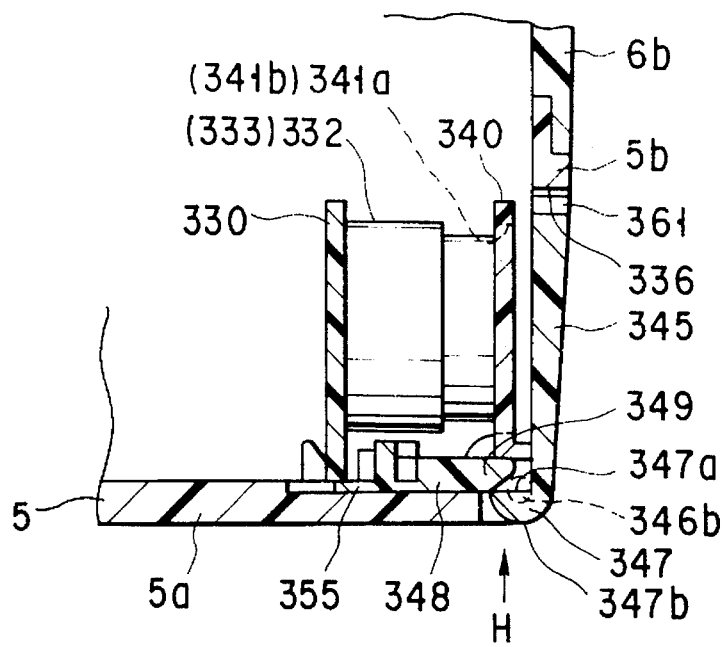
FIG. 47 is a sectional view of a part of the bottom case, illustrating an outer cover in its closed position.
Figure 48:
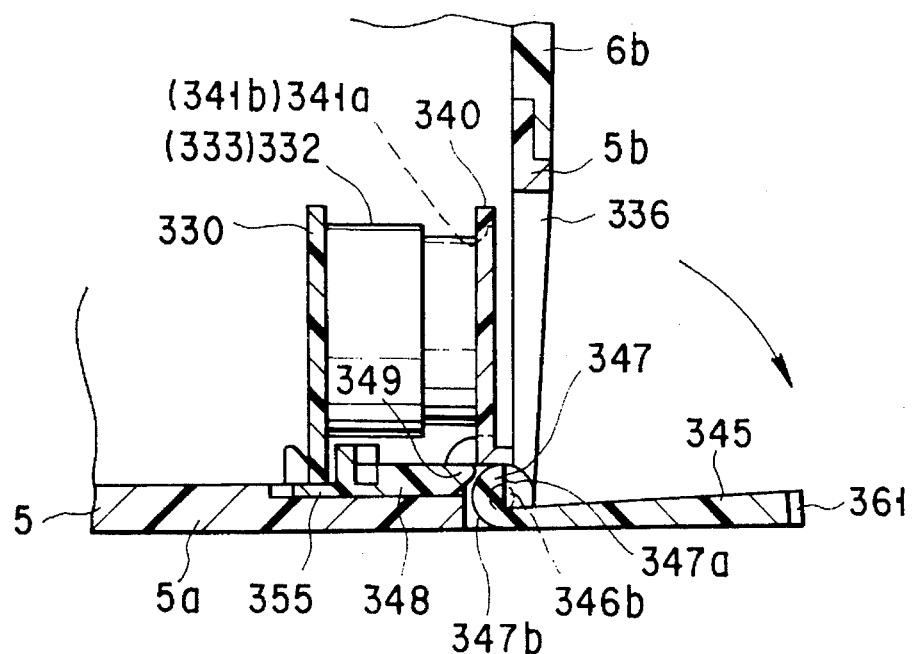
FIG. 48 is also a sectional view of the same part of the bottom case, showing the outer cover in its opened position.
Figure 49:
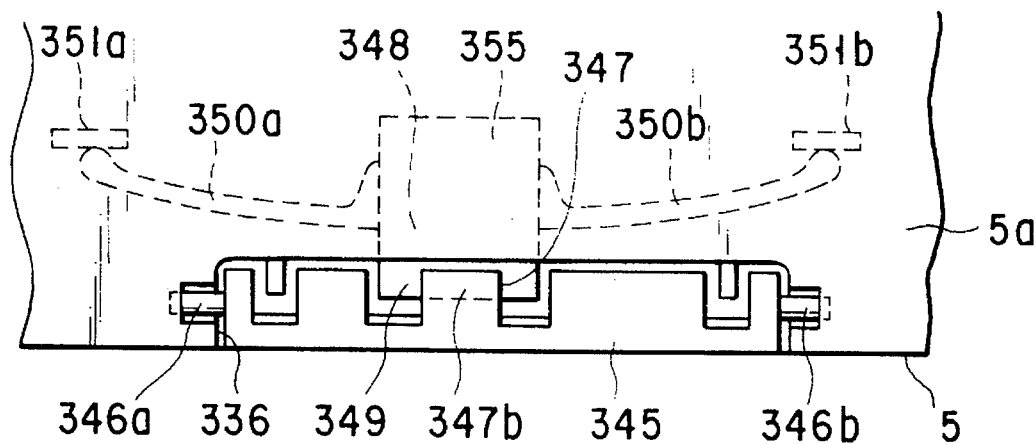
FIG. 49 is a bottom view of the same part of the bottom case, as seen along the arrow H in FIG. 47.
Figure 50:
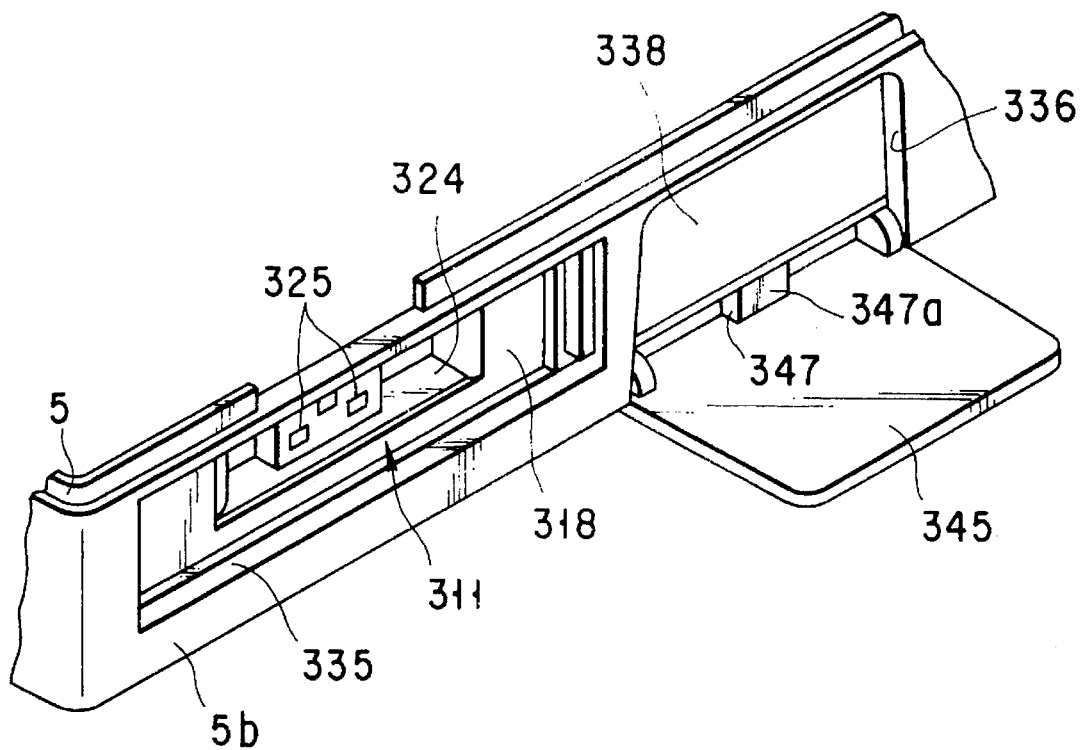
FIG. 50 is a perspective view of a part of a computer according to a second embodiment of the invention, illustrating two card-insertion openings uncovered.
Figure 51:
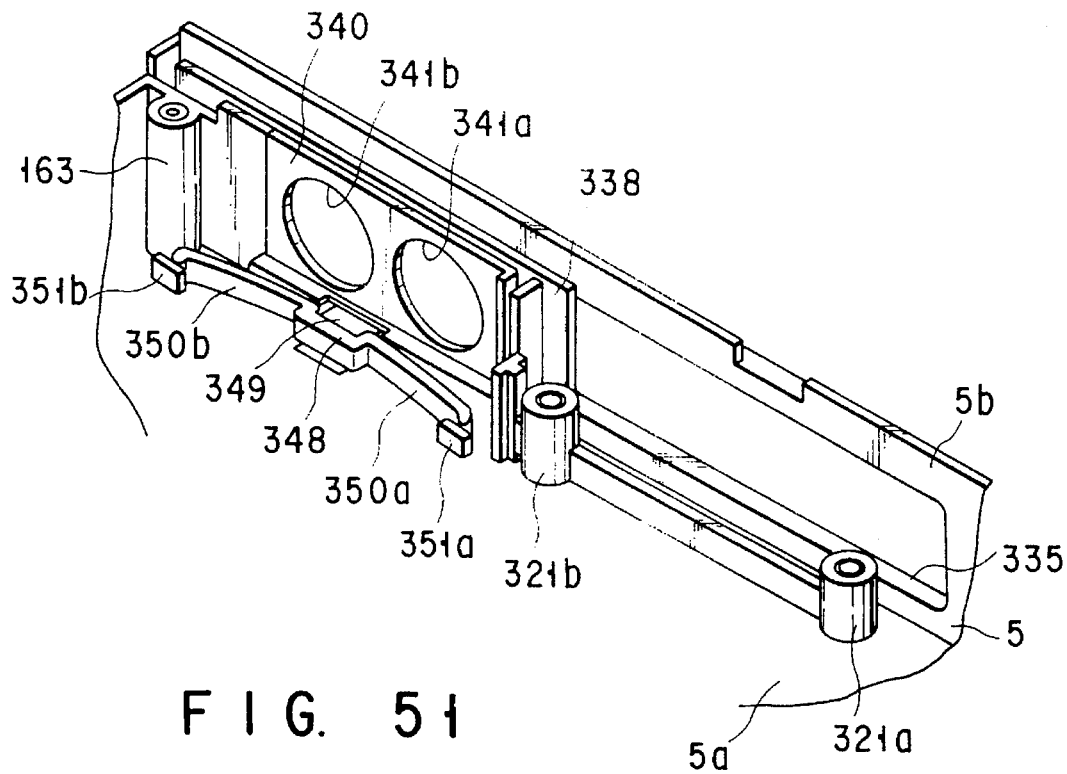
FIG. 51 is a perspective view showing a means holding an outer cover in the closed position.

As seen from FIG. 43, an outer cover 345, which is a rectangular plate, is hinged to the bottom case 5, for opening and closing the second opening 336. The outer cover 345 has its lower end abuts on the bottom wall 5a of the bottom case 5, as is illustrated in FIGS. 47, 48 and 49. Two shafts 346a and 346b project horizontally from the lower corners of the cover 345. These shafts 346a and 346b are loosely fitted in the holes which are made in the bottom wall 5a and which opens at the sides of the second opening 336. The outer cover 345 can, therefore, be rotated between a first position where it closes the second opening 336 and a second position where it opens the second opening 336. While remaining in the first position, the outer cover 345 is has its outer surface set in flush with that of the side wall 5b of the bottom case 5; it constitutes a side of the bottom case 5, jointly with the side wall 5b. A notch 361, gently curving, is formed in the upper edge of the outer cover 345. Into the notch 361 the user of the computer 1 may put a finger tip and then pull the outer cover 345 from, or push the same onto, the right side of the housing 4. Thus pulled or pushed, the outer cover 345 is rotated around the shafts 346a and 346b, thereby opening or closing the second opening 336.

As shown in FIGS. 47 and 48, an engagement projection 347 protrudes inwards from the lower end portion of the outer cover 345, and is located between the shafts 346a and 346b. The projection 347 has a flat pushing surface 347a, which is positioned substantially level with the upper surface of the bottom wall 5a as long as the outer cover 345 stays in the first position and, hence, closes the second opening 336. The projection 347 has a cam surface 347b which is continuous to the pushing surface 347a. The cam surface 347b is arcuate, located at the lower end of the second opening 336.

The bottom case 5 has a holding means for holding the outer cover 345 in the first position, so that the cover 345 closes the second opening 336. The holding means has an engagement member 348 made of synthetic resin. As shown in FIGS. 44 and 49, the member 348 has a pushing projection 349 and a pair of arms 350a and 350b, all formed integral. The pushing projection 349 extends into the second opening 336, penetrating the lower end portion of the guide wall 340. The arms 350a and 350b are connected to the projection 349 and can bend elastically. Both arms 350a and 350b are arcuate, extending along the guide wall 340, and have their distal ends abutting on the arm rests 351a and 351b.

The arms 350a and 350b are elastically deformed since they are compressed between the lower end portion of the guide wall 340 on the one hand, and the arm rests 351a and 351b on the other hand. Therefore, the arms 350a and 350b exerts a force on the engagement member 348, which pushes the guide wall 340. The pushing projection 349, which protrudes from the member 348, is always projects into the second opening 336.

Referring to FIG. 47, the pushing projection 349 abuts on the pushing surface 347a of the outer cover 345 while the cover 345 is closing the second opening 336. The outer cover 345 is thereby pushed downwards, applying a force on the outer cover 345. The outer cover 345 is biased to rotate upwards about the shafts 346a and 346b, and thus remains in the first position, closing the second opening 336.

The engagement member 348 has a tongue 355. The Tongue 355 opposes the pushing projection 349. As seen from FIGS. 47 and 48, the tongue 355 is slidably held between the bottom wall 5a and the connector substrate 330, whereby the engagement member 348 is held on the bottom wall 5a.

To open the outer cover 345, the user puts a finger tip into the notch 361 and pulls the outer cover 345 from the right side of the housing 4. Then, as shown in FIG. 48, the distal end of the pushing projection 349 is released from the pushing surface 347a of the engagement projection 347. Simultaneously, the cam surface 347b of the projection 347 touches the distal end portion of the pushing projection 349. Subsequently, the cam surface 347b pushes the projection 349 away from the guide wall 340 as the outer cover 345 is further rotated. As a result, the engagement member 348 and the outer cover 345 released from each other, whereby the outer cover 345 is further rotated to the second position, where it opens the second opening 336.

To close the outer cover 345, the user pushes the cover 345 upward with a finger tip. Then, the outer cover 345 is rotated, with the cam surface 347b of the engagement projection 347 kept in contact with the pushing projection 349. When the cam surface 347b moves away from the pushing projection 349, the bias of both arms 350a and 350b is applied to the engagement member 348. Thus biased, the member 348 pushes the pushing surface 347a of the engagement projection 347. The outer cover 345 is thereby further rotated upward to the first position, where it closes the second opening 336.

To connect the track ball 310 to the computer 1, the user pushes the third connector cover 338 toward the second position, thereby opening the first opening 335. Then, as shown in FIG. 46, the third interface connector 311 is exposed through the first opening 335. Next, the user inserts the ball connector 314 into the first opening 335, thus fitting the projections 315a and 315b of the ball connector 314 into the recess 324 of the third interface connector 311. The track ball 310 is thereby supported by the base unit 2. At the same time, the contacts 316 of the ball connector 314 are connected to the receptacle 325 of the third interface connector 311. As a result, the track ball 310 is electrically connected to the computer 1.

At this time, the third connector cover 338 enters the gap between the guide wall 340 and the side wall 5b, covering the fourth and fifth interface connectors 332 and 333 from the side. Thus, it is no longer possible to connect the mouse to the fourth interface connector 332 or the external keyboard to the fifth interface connector 333.

To connect the mouse or the external keyboard to the computer 1, the user opens the outer cover 345, thereby exposing the second opening 336 made in the right side of the housing 4. Then, he or she slides the third connector cover 338 to the first position, thus opening the second connector opening 336. The fourth and fifth interface connectors 332 and 333 are thereby exposed through the second opening 336 as is illustrated in FIG. 45.

In this condition, the user inserts the connector 332a extending from the mouse into the fourth interface connector 332, or inserts the connector 333a extending from the external keyboard into the fifth interface connector 333, whereby either the mouse or the external keyboard is connected to the computer 1. At this time the third connector cover 338 enters the gap between the side wall 5b of the bottom case 5 and the body 318 of the third interface connector 311 and conceals the connector 311 from outside. Hence, the track ball 310 can no longer be connected to the third interface connector 311.

As described above, the third connector cover 338 closes the interface connector 311, while opening the interface connectors 332 and 333; alternatively does it open the interface connector 311, while closing the interface connectors 332 and 333. Thus, the track ball 310 cannot be connected to the computer 1, simultaneously with the mouse or the external keyboard. It follows that the user is prohibited from connecting the mouse or the external keyboard to the computer 1 until the track ball 310 is disconnected from the computer 1, and from connecting the track ball 310 to computer 1 until the mouse and/or the external keyboard are disconnected from the computer 1. Thus, the signals generated in the track ball 310 cannot be applied to the computer 1, simultaneously with the signals generated in the mouse or the external keyboard. Nor can the signals generated in the mouse or the external keyboard be applied to the computer 1, simultaneously with the signals generated in the track ball 310. No interference between a signal form the track ball 310 and the a signal from the mouse or the external keyboard occurs in the portable computer 1, and the computer 1 neither malfunctions nor make errors.

As has been indicated, as long as the third interface connector 311 is used, the fourth and fifth interface connectors 332 and 333, both remaining not used, are covered by the third connector cover 338 and are shielded from outside. Thus, both interface connectors 332 and 333 are protected from dust and conductive material, and are prevented from being short-circuited.

As has been explained, the housing 4 has the outer cover 345 for opening and closing the second opening 336, in addition to the third connector cover 338. Hence, if the third connector cover 338 is slid to the first position, while the outer cover 345 remains in the closed position, then these covers 338 and 345 will cover the third, fourth and fifth interface connectors 311, 332 and 333. Once the covers 338 and 345 have covered the interface connectors 311, 332 and 333, dust or conductive material cannot stick to the connector 311, 332 or 333. Free from contact with conductive material, the connectors 311, 332 and 333 are prevented from being short-circuited.

In the portable computer 1, the frame 82 supporting both circuit boards 81a and 81b, the first shield plate 83a surrounding the first circuit bard 81a, and the second shield plate 83b surrounding the second circuit board 81b are separated from one another. Therefore, neither the first shield plate 83a or the second shield plate 83b, both formed metal plates, needs to have passages for avoiding interference among the circuit parts 84, 118, 119 and 120. The shield plates 83a and 83b have a simple shape and can, thus, be made at low cost. The frame 82, which supports the circuit boards 81a and 81b, has a complicated shape. Despite its complex shape, the frame 82 can be produced with high precision and yet at low cost, because it is made of synthetic resin and formed by injection molding. Neither much labor nor much time is required to form the shield plates 83a and 83b, as well as the frame 82. As a result, the circuit unit 80 comprising these parts 82, 83a and 83b can be provided at low price.

Moreover, the shield plates 83a and 83b need not support the circuit boards 81a and 81b, respectively. Rather, they only need to cover the circuit boards 81a and 81b. Load on each shield plate is small. The shield plates 83a and 83b can therefore be made thin. This helps to lighten the circuit unit 80 and, ultimately, the computer 1 as a whole.

As indicated above, once the circuit boards 81a and 81b have been secured to the frame 82, the first and second connector shields 89 and 93 are placed substantially flush with each other and cooperate with the shield plates 83a and 83b to cover the circuit boards 81a and 81b. Thus, neither shield plate needs to be bent around the rear edge of the frame 82. This is another reason why the shield plates 83a and 83b have a simple shape and a small size.

As has been described, the connector shields 89 and 93 have two flanges 110a and 110b, respectively, which extend at right angles from the opposing edges of the shields 89 and 93 and are set in plane contact with each other. Thus, the connector shields 89 and 93 contact each other in an increased area, and their mutual electrical connection is reliable. As a result of this, the high-frequency noise generated by the circuit parts 84 mounted on the circuit boards 81a and 81b does not leaks outside at the butt between the first and second connector shields 89 and 93.

As explained above, the ground wiring pattern 116 is formed on the four edge portions of the first circuit board 81a, and the other ground wiring pattern 116 is formed on the four edge portions of the second circuit board 81b. These patterns 116 contact the conductive layer 115 plated on the frame 82 once the edges of the circuit boards 81a and 81b have been fitted into the cuts 100a and 100b of the frame 82. The patterns 116 are also in contact with the first and second shield plates 83a and 83b, respectively. The plates 83a and 83b contact the plated layer 5f of the bottom case 5 once after the circuit unit 80 has been mounted in the bottom case 5. Both circuit boards 81a and 81b are therefore grounded via the frame 82 and the shield plates 83a and 83b. Neither lead wires nor connectors are required for connecting the circuit boards 81a and 81b to the ground.

Furthermore, since the circuit boards 81a and 81b, each having high-frequency noise sources, are surrounded by the shield plates 83a and 83b and the plated layer 5f, the high-frequency noise emanating from the boards 81a and 81b is reliably confined within the housing 4. The noise will cause neither interference of electromagnetic waves nor obstruction of communication.

FIGS. 50 to 54 show a portable computer 1 according to a second embodiment of the present invention. The second embodiment differs from the first embodiment in the mechanism for opening and closing an outer cover 345. The components identical to those of the first embodiment are designated at identical reference numerals in FIGS. 50 to 54, and will not be described in detail.

Figure 52:
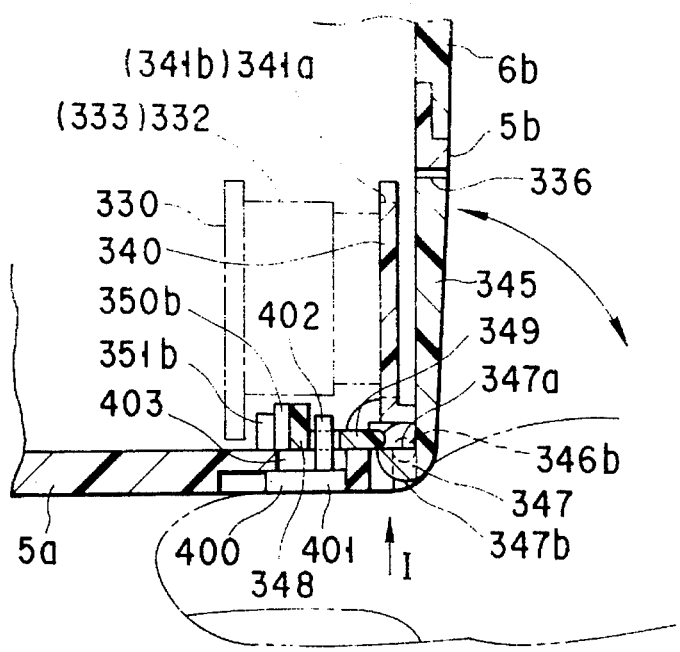
FIG. 52 is a sectional view of a part of the bottom case of the second embodiment, illustrating the outer cover in its closed position.

As shown in FIGS. 52, 53 and 54, an engagement member 348 has a sliding knob 400. The sliding knob 400 comprises a finger rest 401 and a claw 402 which are integral with each other. The finger rest 401 is exposed at the lower surface of the bottom wall 5a of a bottom case 5. The claw 402 couples the finger rest 401 to the engagement member 348. The claw 402 projects into the bottom case 5 via a through hole 403 made in the bottom wall 5a. The finger rest 401 is located on the left of the outer cover 345. A user of the computer 1 may slide the knob 400 toward and away from the outer cover 345, with a finger tip placed on the finger rest 401.

With the second embodiment, to open the outer cover 345, the user puts a finger tip on the finger rest 401 exposed at the lower surface of the bottom wall 5a and slides the knob 400 away from the lower edge of the outer cover 345. The pushing projection 349 of the engagement member 345 leaves the pushing surface 347a of an engagement projection 347. A force is no longer applied on the outer cover 345 to hold the cover 345 in the closed position. The outer cover 345 rotates downwards due to its own weight, around shafts 346a and 346b, whereby the second opening 356 is opened.

At this time the user can rotate the outer cover 345 from the right side of the computer 1, by placing a finger tip on the finger rest 401, with the finger cushion pressed onto the lower edge of the outer cover 345, and then by sliding the finger rest 401 with the finger cushion away from the outer cover 345, as is illustrated in FIG. 52. Namely, the moment the outer cover 345 is unlocked, a force is exerted on the cover 345 to rotate the same into the open position. Thus, the outer cover 345 can be easily opened.

To close the outer cover 345, the user rotates the cover 345 upwards with a finger tip. The cover 345 keeps rotating, with the cam surface 347*b* of the engagement projection 347 remaining in contact with the pushing projection 349. When the cam surface 347*b* leaves the projection 349, arms 350*a* and 350*b* pushes the pushing projection 349 onto the pushing surface 347*a*, whereby the engagement projection 347 is moved downward, holding the outer cover 345 in the closed position.

The present invention is not limited to the embodiments described above. Various changes and modifications can be made within the scope of the invention.

For instance, the frame of the circuit unit is not be restricted to an injection-molded one made of synthetic resin. The frame can be a die-cast one made of an electrically conductive metal such as magnesium.

The number of circuit boards used is not limited to two. Three or more circuit boards may be incorporated in the portable computer.

Furthermore, the portable electronic apparatus according to the present invention is not limited to a notebook-type computer only. Rather, the invention can be applied to any other portable apparatus such as a portable word processor.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable electronic apparatus comprising:

a box-shaped housing made of synthetic resin, and having a flat bottom;

a frame incorporated in said housing;

first and second circuit boards supported by said frame, said circuit boards being aligned and spaced apart in the vertical direction of said housing, located parallel to the bottom of said housing and facing each other, and each of the circuit boards having circuit parts which generate noise while operating;

first and second auxiliary shields supported by said first and second circuit boards and extending in the vertical direction of said housing; and first and second shield plates supported by said frame, the first shield plate being arranged on a lower side of said frame, the second shield plate being arranged on an upper side of said frame, and the first and second shield plates cooperating with said first and second auxiliary shields to enclose said frame and said first and second circuit boards.

2. The portable electronic apparatus according to claim 1, wherein each of said first and second circuit boards has edges, said frame has a support wall which encloses said first and second circuit boards, and said support wall has a first recessed portion for engaging with the edges of said first circuit board and a second recessed portion for engaging with the edges of said second circuit board.

3. The portable electronic apparatus according to claim 2, wherein said frame is made of an electrically non-conductive synthetic resin, an electrically conductive layer is plated on at least the first and second recessed portions of said frame, and said first and second circuit boards have wiring patterns which contact said electrically conductive layer as long as said first and second circuit boards remain held by the first and second recessed portions of said frame.

4. The portable electronic apparatus according to claim 3, wherein said first and second shield plates have tongues which contact said wiring patterns and which are fastened to said frame by screws penetrating said first and second circuit boards.

5. The portable electronic apparatus according to claim 4, wherein the bottom of said housing has bosses which receive said screws and are covered with an electrically conductive layer, said bottom being also covered with the conductive layer, and said first shield plate and said conductive layer are set in plane-contact with each other.

6. The portable electronic apparatus according to claim 1, wherein said housing has a rear side having connector-exposing openings, said frame has a cut aligned with the connector-exposing openings, said first circuit board has connectors extending through the cut and exposed through one of said connector-exposing openings, which are aligned with said cut, a junction between said connectors and said first circuit board which is covered with said first auxiliary shield, wherein said second circuit board has a connector exposed through one of said connector-exposing openings, and wherein a junction between said connectors and said second circuit board is covered with said second auxiliary shield.

7. The portable electronic apparatus according to claim 6, wherein said first and second auxiliary shields are arranged side by side, along a rear side of said housing, and contact said first shield plate and said second shield plate, respectively, as long as said first and second circuit boards are secured to said frame.

8. The portable electronic apparatus according to claim 7, wherein said first auxiliary shield has a flange at an end adjacent to said second auxiliary shield, and said second auxiliary shield has a flange at an end adjacent to said first auxiliary shield, and the flanges of said first and second auxiliary shields overlap each other and are set in plane-contact with contact each other.

9. The portable electronic apparatus according to claim 8, wherein said frame has a groove in which the flanges of said first and second auxiliary shields are fitted, such that the flanges overlap each other and remain in plane-contact with each other.

10. A portable electronic apparatus comprising:

a box-shaped conductive housing;

a circuit board incorporated in said housing, said circuit board having circuit parts which generate noise while operating, a ground wiring pattern and an auxiliary shield;

a frame made of an electrical non-conductive material, supporting said circuit board, having a support portion contacting said ground wiring pattern, and covered, at least at said support portion, with an electrically conductive layer; and a shield plate supported by said frame, the shield plate cooperating with said auxiliary shield to cover said frame and said circuit board and contacting said ground wiring pattern.

11. The portable electronic apparatus according to claim 10, wherein said housing has a bottom, said circuit board includes first and second circuit substrates, said circuit substrates offset and facing each other in a vertical direction of said housing, each parallel to said bottom, and wherein said auxiliary shield has a first section on said first circuit substrate and a second section on said second circuit substrate, said first and second sections extending in the vertical direction of said housing.

12. The portable electronic apparatus according to claim 11, wherein said housing has a rear side having connector-exposing openings, said frame has a cut aligned with the connector-exposing openings, said first circuit substrate has connectors extending through the cut and exposed through one of said connector-exposing openings which are aligned with said cut, a junction between said connectors and said first circuit substrate which is covered with said first section, wherein said second circuit substrate has a connector exposed through one of said connector-exposing openings, and a junction between said connectors and said second circuit substrate which is covered with said second section.

13. The portable electronic apparatus according to claim 12, wherein said first and second sections are arranged side by side, along a rear side of said housing, and contact said first shield plate and said second shield plate, respectively, as long as said first and second circuit substrates are secured to said frame.

14. The portable electronic apparatus according to claim 13, wherein said first section has a flange at an end adjacent to said second section, and said second section has a flange at an end adjacent to said first section, and the flanges of said first and second sections overlap each other and are set in plane-contact with contact each other.

15. The portable electronic apparatus according to claim 14, wherein said frame has a groove in which the flanges of said first and second sections are fitted, such that the flanges overlap each other and remain in plane-contact with each other.

16. A portable electronic apparatus comprising:
a box-shaped housing made of synthetic resin and having a flat bottom;
a plurality of circuit boards which are incorporated in said housing, the circuit boards being aligned and spaced apart in the vertical direction of said housing, located parallel to the bottom of said housing and facing one another, and the circuit boards being connected to each other with connectors located therebetween;
an auxiliary shield supported by at least one of the circuit boards, the auxiliary shield extending in the vertical direction of said housing; and
first and second shield plates incorporated in said frame, the first shield plate being arranged on a lower side of said frame, the second shield plate being arranged on an upper side of said frame, and the first and second shield plates cooperating with said auxiliary shield to enclose said circuit boards.

17. The portable electronic apparatus according to claim 16, further comprising;
a frame supporting said circuit boards and being incorporated in said housing.

18. A portable electronic apparatus comprising:
a box-shaped housing made of synthetic resin and having a flat bottom;
a frame incorporated in said housing;
a plurality of circuit boards supported by said frame, said circuit boards being aligned and spaced apart in the vertical direction of said housing, located parallel with the bottom of said housing and facing one another, and each of the circuit boards having circuit parts which generate noise while operating, and at least one of the circuit boards having an auxiliary shield which extends in the vertical direction of said housing; and
first and second shield plates supported by said frame, the first shield plate being arranged on a lower side of said frame, and the second shield plate being arranged on an upper side of said frame, the first and second shield plates cooperating with said auxiliary shield to enclose said frame and said circuit boards.

19. The portable electric apparatus according to claim 18, wherein each of said circuit boards has edges, said frame has a support wall which encloses the circuit boards and has recessed portions for engaging with the edges of said circuit boards.

20. The portable electronic apparatus according to claim 19, wherein said frame is made of an electrically non-conductive synthetic resin, an electrically conductive layer is plated on the recessed portions of said frame, and said circuit boards have wiring patterns which contact said electrically conductive layer as long as said circuit boards remain held by the recessed portions of said frame.

21. The portable electronic apparatus according to claim 20, wherein said first and second shield plates have tongues which contact said wiring patterns and which are fastened to said frame by screws penetrating said circuit boards.

22. The portable electronic apparatus according to claim 21, wherein the bottom of said housing has bosses receiving said screws and is covered with an electrically conductive layer, said bosses also covered with the conductive layer, and said first shield plate and said conductive layer are set in plane-contact with each other.

23. The portable electronic apparatus according to claim 18, wherein said frame has a partition between said circuit boards which are adjacent to each other.

24. A portable electronic apparatus comprising:
a box-shaped housing made of synthetic resin and having a flat bottom;
a circuit board incorporated in said housing and located parallel to the bottom of said housing, the circuit board having circuit parts which generate noise while operating;
first and second shield plates incorporated in said housing, said first shield being arranged on a lower side of said circuit board, said second shield plate being arranged on an upper side of said circuit board, and said first and second shield plates enclosing said circuit board; and
a card receptacle formed between said first and second shield plates and receiving an extension card, said card receptacle having a card connector for connecting said extension cards, and said card connector being supported by said circuit board.

25. The portable electronic apparatus according to claim 24, further comprising a frame supporting said circuit board and incorporated in said housing.

26. The portable electronic apparatus according to claim 25, wherein said circuit board includes first and second circuit substrates which are separated in a vertical direction of said housing and located parallel to the bottom of the housing, wherein said card receptacle has a first receptacle section between said first circuit substrate and first shield plate and a second receptacle section between said second circuit substrate and said second shield plate, said first and second receptacle sections being laid in said housing in the vertical direction, and said card connector has a first connector on the first receptacle section and a second connector on said second receptacle section, said first connector being supported by said first circuit substrate and said second connector being supported by said second circuit substrate.

27. The portable electronic apparatus according to claim 24, wherein said circuit board has an auxiliary shield which cooperates with said first and second shield plates to enclose said circuit board.

28. A portable electronic apparatus comprising:

a box-shaped housing made of synthetic resin;

a circuit unit incorporated in said housing and having a circuit board, a frame supporting the circuit board, and a shield formed of a metal plate and surrounding the circuit board, said circuit board having circuit parts mounted on said circuit board and generating noise while operating; and wherein said housing has a bottom, and said circuit board includes first and second circuit substrates each having edges, extending parallel to said bottom, supported one upon the other and spaced apart from said frame.

29. The portable electronic apparatus according to claim 28, wherein said frame has a support wall surrounding said first and second circuit substrates and having a first recessed portion holding the edges of said first circuit substrate and a second reassessed portion holding the edges of said second circuit substrate.

30. The portable electronic apparatus according to claim 28, wherein said shield includes a first shield plate supported by said frame, located beneath the lower one of said circuit substrates and covering the same, and a second shield plate supported by said frame, located above the upper one of said circuit substrates and covering the same.

31. The portable electronic apparatus according to claim 30, wherein said housing has a rear side having connector-exposing openings, said frame has a cut aligned with the connector-exposing openings, said first circuit substrate has connectors extending through the cut and exposed through one of said connector-exposing opening which are aligned with said cut and has a first connector shield for shielding the junctions between said connectors and said first circuit substrate, and said second circuit substrate has a connector exposed through one of said connector-exposing opening and has a second connector shield for shielding the junctions between said connector and said second circuit substrate.

32. The portable electronic apparatus according to claim 31, wherein said first and second connector shields cooperate with said first and second shield plates, thereby surrounding said frame and said first and second circuit substrate.

33. The portable electronic apparatus according to claim 32, wherein said first and second connector shields are arranged side by side, along a rear side of said housing, and contact said first shield plate and said second shield plate, respectively, as long as said first and second circuit substrates are secured to said frame.

34. The portable electronic apparatus according to claim 33, wherein said first connector shield has a flange at an end adjacent to said second connector shield, and said second connector shield has a flange at an end adjacent to said first connector shield, and the flanges of said first and second connector shields overlap each other and are set in plane-contact with each other.

35. The portable electronic apparatus according to claim 34, wherein said frame has a groove in which the flanges of said first and second connector shields are fitted, such that the flanges overlap each other and remain in plane-contact with each other.

36. The portable electronic apparatus according to claim 30, wherein said frame is made of an electrically non-conductive synthetic resin, an electrically conductive layer is plated on at least the first and second recessed portions of said frame, and said first and second circuit substrates have wiring patterns which contact said electrically conductive layer as long as said first and second circuit substrates remain held by the first and second recessed portions of said frame.

37. The portable electronic apparatus according to claim 36, wherein said first and second shield plates have tongues which contact said wiring patterns and which are fastened to said frame by screws penetrating said first and second circuit substrates.

38. The portable electronic apparatus according to claim 37, wherein the bottom of said housing has bosses receiving said screws and is covered with an electrically conductive layer, said bosses also covered with the conductive layer, and said first shield plate are set in plane-contact with each other.

39. The portable electronic apparatus according to claim 28, wherein said frame has a partition located between said first circuit substrate and said second circuit substrate.

40. A portable electronic apparatus comprising:

a housing made of an electrically conductive material;

a circuit board incorporated in said housing and having circuit parts which generate noise while operating and also having a ground wiring pattern;

a frame made of an electrical non-conductive material, supporting said circuit board, having a support portion contacting said ground wiring pattern, and covered, at least at said support portion, with an electrically conductive layer;

a shield secured to said frame, covering said circuit board, and contacting said ground wiring pattern and said housing; and wherein said housing has a bottom, and said circuit board includes first and second circuit substrates, extending parallel to said bottom, supported one upon the other and spaced apart from said frame.

41. The portable electronic apparatus according to claim 40, wherein said housing has a rear side having connector-exposing openings, said frame has a cut aligned with the connector-exposing openings, said first circuit substrate has connectors extending through the cut and exposed through one of said connector-exposing openings which are aligned with said cut and has a first connector shield for shielding the junctions between said connectors and said first circuit substrate, and said second circuit substrate has a connector exposed through one of said connector-exposing openings and has a second connector shield for shielding the junctions between said connector and said second circuit substrate.

42. The portable electronic apparatus according to claim 41, wherein said first and second connector shields are arranged side by side, along a rear side of said housing, and contact said first shield plate and said second shield plate, respectively, as long as said first and second circuit substrates are secured to said frame.

43. The portable electronic apparatus according to claim 42, wherein said first connector shield has a flange at an end adjacent to said second connector shield, and said second connector shield has a flange at an end adjacent to said first connector shield, and the flanges of said first and second connector shields overlap each other and are set in plane-contact with contact each other.

44. The portable electronic apparatus according to claim 43, wherein said frame has a groove in which the flanges of said first and second connector shields are fitted, such that the flanges overlap each other and remain in plane-contact with each other.

* * * * *